United States Patent
Van Belle

(10) Patent No.: US 10,848,708 B2
(45) Date of Patent: Nov. 24, 2020

(54) METHOD AND PROCESSOR FOR STREAMING VIDEO PROCESSING

(71) Applicant: Barco N.V., Kortrijk (BE)

(72) Inventor: Ronny Van Belle, Lendelede (BE)

(73) Assignee: BARCO N.V., Kortrijk (BE)

( * ) Notice: Subject to any disclaimer, the term of this patent is extended or adjusted under 35 U.S.C. 154(b) by 379 days.

(21) Appl. No.: 14/901,927

(22) PCT Filed: Jul. 1, 2014

(86) PCT No.: PCT/EP2014/063992
§ 371 (c)(1),
(2) Date: Dec. 29, 2015

(87) PCT Pub. No.: WO2015/000919
PCT Pub. Date: Jan. 8, 2015

(65) Prior Publication Data
US 2016/0295158 A1    Oct. 6, 2016

(30) Foreign Application Priority Data

Jul. 1, 2013   (GB) .................................. 1311753.6

(51) Int. Cl.
*H04N 7/01* (2006.01)
*G06T 3/40* (2006.01)
(Continued)

(52) U.S. Cl.
CPC .......... *H04N 7/0117* (2013.01); *G06T 3/4007* (2013.01); *G06T 5/20* (2013.01); *H04N 9/646* (2013.01)

(58) Field of Classification Search
CPC ........... H04N 19/86; H04N 7/01; H04N 7/012
See application file for complete search history.

(56) References Cited

U.S. PATENT DOCUMENTS 6,339,428 B1 * 1/2002 Fowler .................... G06T 15/04
                                                       345/582
7,733,419 B1 * 6/2010 Lew ......................... H04N 7/01
                                                       348/441
(Continued)

FOREIGN PATENT DOCUMENTS

CN        101911704 A    12/2010
WO    WO2009091521 A2     7/2009

OTHER PUBLICATIONS

Filtering and Convolutions, Jack Xin (Lecture) and J. Ernie Esser, Nov. 26, 2010.*
(Continued)

*Primary Examiner* — Ming Wu
(74) *Attorney, Agent, or Firm* — Renner, Otto, Boisselle & Sklar, LLP

(57) ABSTRACT

The invention provides methods of video processing in an efficient and/or low latency fashion and suitable for use in a streaming environment. Therefore the present invention relates to a system for video processing, a video image processor or a method of generating an output image by performing processing on an input image, wherein the processing is characterized in that it achieves the effect of a plurality of first unit image process steps, the method comprising the steps of performing sequentially one or a plurality of second image process filtering steps on said input image to generate said output image, wherein at least one of said second image process filtering steps achieves the effect of at least two, three, four, or five of said first image process steps.

18 Claims, 37 Drawing Sheets

(51) Int. Cl.
*H04N 9/64* (2006.01)
*G06T 5/20* (2006.01)

(56) References Cited

U.S. PATENT DOCUMENTS

| | | | |
|---|---|---|---|
| 2004/0150732 A1* | 8/2004 | Yamanaka | H04N 9/045 348/272 |
| 2005/0031199 A1* | 2/2005 | Ben-Chorin | G09G 5/02 382/162 |
| 2005/0196072 A1 | 9/2005 | Zhong | |
| 2005/0243109 A1* | 11/2005 | Stevens | G06T 3/4007 345/694 |
| 2011/0080519 A1 | 4/2011 | Chowdhry et al. | |
| 2011/0200269 A1* | 8/2011 | Das Gupta | G06T 5/002 382/260 |
| 2012/0057074 A1* | 3/2012 | Yu | H04N 5/142 348/441 |
| 2012/0081580 A1* | 4/2012 | Cote | H04N 5/335 348/231.99 |

OTHER PUBLICATIONS

International Search Report for corresponding patent application No. PCT/IB2012/002829 dated Apr. 19, 2013.

Lina J Karam et al., "Digital Filtering" In: "The Digital Signal Processing Handbook", Jan. 1, 2009, CRC Press.

Jaspers, E.G.T., et al., "Flexible Heterogeneous Video Processor System for Television Applications", IEEE Transactions on Consumer Electronics, IEEE Service Center, New York, NY.

International Telecommunication Union: "Recommendation ITU-R BT.709-5, Parameter Values for the HDTV Stadards for Production and International Programme Exchange", Jan. 1, 2009, XP055165136, Retrieved from the Internet: URL: http://www.itu.int/dms_pubrec/itu-r/rec/bt/R-REC-BT.709-5-200204-IIIPDF-E.pdf, [retrieved on Jan. 27, 2015].

Office action dated Apr. 4, 2018 in corresponding Chinese application No. 201480048293.9.

Office Action dated Jan. 31, 2019 issued in related Chinese patent application 201480048293.9 (and English summary of Office Action).

Examination Report dated Dec. 4, 2019 for corresponding Chinese Application No. 201480048293.9.

Office Action dated Sep. 3, 2019 issued in related European patent application 14741221.7.

Final Office Action dated Jul. 8, 2019 issued in related Chinese patent application 201480048293.9 (and English summary of Final Office Action).

Examination Report dated Oct. 21, 2019 for corresponding GB Application No. GB 1311753.6.

\* cited by examiner

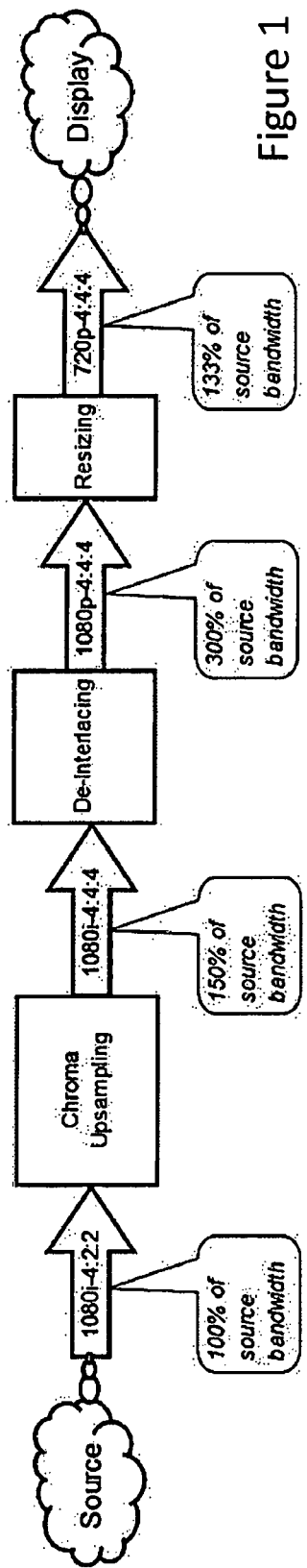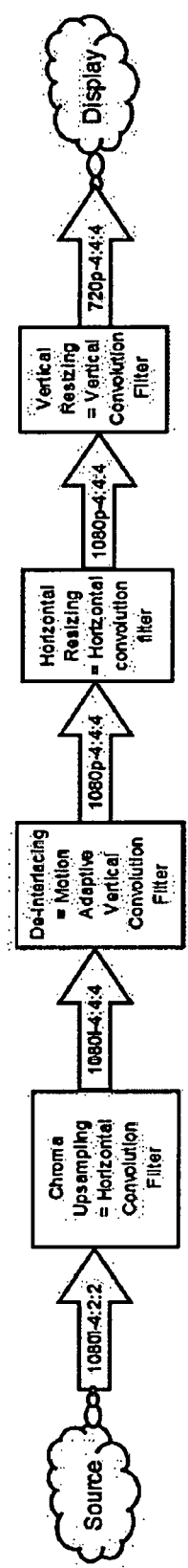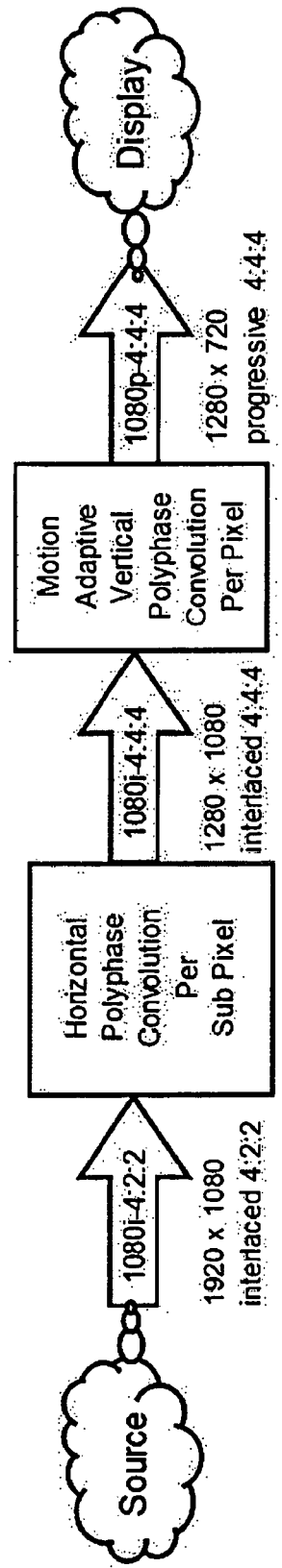
Figure 1
Figure 2
Figure 3

```
0   If model = "CatmullRomSpline" Then
1       a = -0.5
2   ElseIf model = "Rifman" Then
3       a = -1
4   End If
5   For Position = 0 To c_Half_IR_Size - 1
6       x = Position / c_Oversampling / c_DownScaleFactor
7       If x < 1 Then
8           IR(Position) = (a + 2) * x ^ 3 - (a + 3) * x ^ 2 + 1
9       ElseIf x < 2 Then
10          IR(Position) = a * x ^ 3 - 5 * a * x ^ 2 + 8 * a * x - 4 * a
11      Else
12          IR(Position) = 0
13      End If
14  Next Position
```

Figure 59

```
0   Function Sinc(x)
1       If x = 0 Then
2           Sinc = 1
3       Else
4           Sinc = Sin(x * Pi) / x / Pi
5       End If
6   End Function
```

Figure 60

```
0   For Position = 0 To c_Half_IR_Size - 1
1       x = posit / c_Oversampling / c_DownScaleFactor
2       If x < 3 Then
3           Window = Sinc(x / 3)
4       Else
5           Window = 0
6       End If
7       IR(Position) = Sinc(x) * Window
8   Next Position
```

Figure 61

```
0    For Position = 0 To c_Half_IR_Size - 1
1        x_win = Position / c_Half_IR_Size
2        Window = (1 + Cos(x_win * Pi)) / 2
3        x = Position / c_Oversampling / c_DownScaleFactor
4        IR(Position) = Sinc(x) * Window
5    Next Position
```

Figure 62

```
0    c_nTaps_DeInterlacing = 2 * c_LanczosOrder
1    Half_IR_Size_Resizer = c_LanczosOrder * c_DownScaleFactor / 2
2    Sum = 0
3    For tap = 0 To c_nTaps_DeInterlacing - 1
4        x = (tap - (c_nTaps_DeInterlacing - 1) / 2)
5        DI_FIR(tap) = Sinc(x) * Sinc(x / c_LanczosOrder)
6        Sum = Sum + DI_FIR(tap)
7    Next tap
8    For tap = 0 To c_nTaps_DeInterlacing - 1
9        DI_FIR(tap) = DI_FIR(tap) / Sum
10   Next tap
11   For Position = 0 To c_Half_IR_Size - 1
12       x = Position / c_Oversampling
13       IR(Position) = 0
14       For DI_Tap = 0 To c_nTaps_DeInterlacing - 1
15           InsertedPos = DI_Tap - (c_nTaps_DeInterlacing - 1) / 2
16           If x < Half_IR_Size_Resizer + InsertedPos Then
17               xx = 2 * (x - InsertedPos) / c_DownScaleFactor
18               Lanczos = Sinc(xx) * Sinc(xx / c_LanczosOrder)
19               IR(Position) = IR(Position) + DI_FIR(DI_Tap) * Lanczos
20           End If
21       Next DI_Tap
22       If x < Half_IR_Size_Resizer Then
23           xx = 2 * x / c_DownScaleFactor
24           IR(Position) = IR(Position) + Sinc(xx) * Sinc(xx / c_LanczosOrder)
25       End If
26   Next Position
```

Figure 63

```
1       For phase = 0 To c_Half_Oversampling
2           Sum_fp = 0
3           For tap = 0 To c_KernelSize - 1
4               half_posit = Abs(c_Half_IR_Size - phase - tap * c_Oversampling)
5               Sum_fp = Sum_fp + IR_fp(half_posit)
6           Next tap
7           Diffused_Error = 0.5
8           For tap = 0 To c_KernelSize - 1
9               half_posit = Abs(c_Half_IR_Size - phase - tap * c_Oversampling)
10              exact = IR_fp(half_posit) / Sum_fp * c_coef_denominator + Diffused_Error
11              IR_int(half_posit) = Int(exact)
12              Diffused_Error = exact - IR(half_posit)
13          Next tap
14      Next phase
```

Figure 64

```
0       c_start_frequency_APOT = -4
1       c_end_frequency_APOT = 4
2       c_nFreq_per_Octave = 12
3       c_nOctaves = c_end_frequency_APOT - c_start_frequency_APOT
4       c_nFreqsToAnalyze = c_nOctaves * c_nFreq_per_Octave
5       c_start_frequency = 2 ^ c_start_frequency_APOT / 2
6       IR_Surface = c_Oversampling * c_coef_denominator
7       For FreqIndex = 0 To c_nFreqsToAnalyze
8           Frequency = c_start_frequency * 2 ^ (FreqIndex / c_nFreq_per_Octave)
9           f = Frequency * 2 * Pi / DownScalefactor
10          MTF(FreqIndex) = 0
11          For position = 0 To IR_Size
12              half_position = Abs(IR_Size / 2 - position)
13              IR_Value = IR(half_position) / IR_Surface
14              P = half_position / c_Oversampling
15              MTF(FreqIndex) = MTF(FreqIndex) + Cos(P * f) * IR_Value
16          Next position
17      Next FreqIndex
```

Figure 65

```
0       c_start_frequency_APOT = -4
1       c_end_frequency_APOT = 4
2       c_nFreq_per_Octave = 12
3       c_nOctaves = c_end_frequency_APOT - c_start_frequency_APOT
4       c_nFreqsToAnalyze = c_nOctaves * c_nFreq_per_Octave
5       c_start_frequency = 2 ^ c_start_frequency_APOT / 2
6       For FreqIndex = 0 To c_nFreqsToAnalyze
7           Frequency(FreqIndex) = c_start_frequency * 2 ^ (FreqIndex / c_nFreq_per_Octave)
8       Next FreqIndex
```

Figure 66

```
0       IR_Surface = c_Oversampling * c_coef_denominator
1       For FreqIndex = 0 To c_nFreqsToAnalyze
2           f = Frequency(FreqIndex) * 2 * Pi / DownScalefactor
3           MTF(FreqIndex) = 0
4           For position = 0 To IR_Size
5               half_position = Abs(IR_Size / 2 - position)
6               IR_Value = IR(half_position) / IR_Surface
7               P = half_position / c_Oversampling
8               MTF(FreqIndex) = MTF(FreqIndex) + Cos(P * f) * IR_Value
9           Next position
10      Next FreqIndex
```

Figure 67

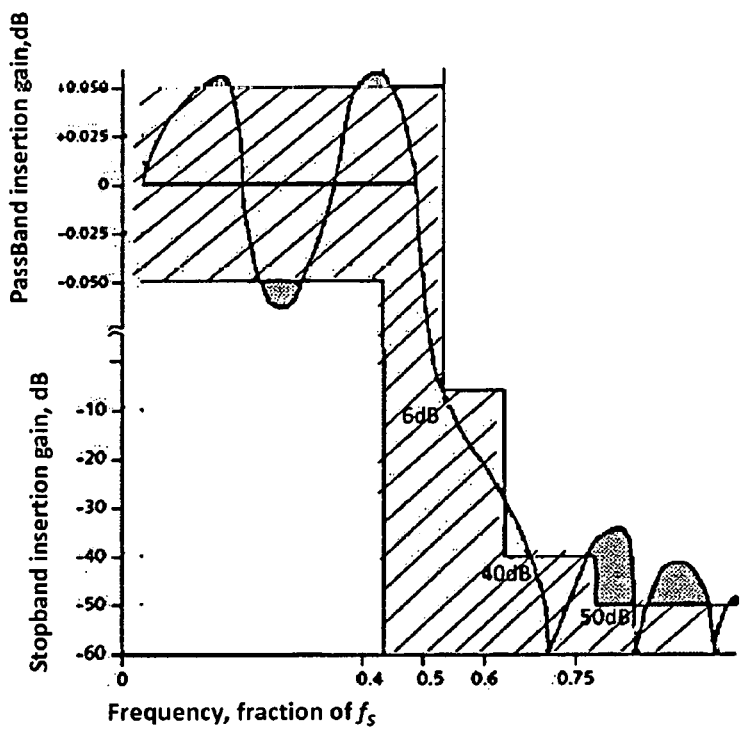

Figure 68

```
0    Function Decibel(x As Double)
1        Decibel = 10 ^ (x / 20)                    (^ = power function)
2    End Function
```

Figure 69

```
0    QualityLoss = 0
1    SpecTolerance_Rec709 = 0
2    For FreqIndex = 0 To c_nFreqsToAnalyse
3        If Frequency(FreqIndex) <= 0.4 Then
4            UpperValueLimit = Decibel(0.05)
5            LowerValueLimit = Decibel(-0.05)
6        ElseIf Frequency(FreqIndex) < 0.5 Then
7            UpperValueLimit = Decibel(0.05)
8            LowerValueLimit = -Decibel(-6)
9        ElseIf Frequency(FreqIndex) < 0.6 Then
10           UpperValueLimit = Decibel(-6)
11           LowerValueLimit = -Decibel(-6)
12       ElseIf Frequency(FreqIndex) < 0.75 Then
13           UpperValueLimit = Decibel(-40)
14           LowerValueLimit = -Decibel(-40)
15       Else
16           UpperValueLimit = Decibel(-50)
17           LowerValueLimit = -Decibel(-50)
18       End If
19       ValueLimit = Median(UpperValueLimit, MTF(FreqIndex), LowerValueLimit)
20       QualityLoss = QualityLoss + (MTF(FreqIndex) - ValueLimit) ^ 2
21       SpecTolerance_Rec709 = SpecTolerance_Rec709 + (UpperValueLimit - LowerValueLimit) ^

22   Next FreqIndex
23   Qloss_Rec709 = Sqr (Quality loss / SpecTolerance_Rec709)
```

Figure 70

METHOD AND PROCESSOR FOR STREAMING VIDEO PROCESSING

This application is a national phase of International Application No. PCT/EP2014/063992, filed Jul. 1, 2014, and published in the English language, which claims priority to Patent Application No. GB 1311753.6, filed on Jul. 1, 2013, all of which are hereby incorporated herein by reference.

FIELD OF THE INVENTION

The present invention relates to system, methods and video processors used in the field of video processing as well as software for carrying out the methods or implementing the video processors and signal storage media for storing the software.

BACKGROUND

Known processing chains in the field of video processing may include some or all of the following building blocks.

Chroma sub-sampling is performed on many video sources because of the nature of human visual perception. The human visual system can resolve finer details in the luminance channel than compared to the chrominance channel. During transmission of video signals the chroma sub sampling technique is often used because it reduces the amount of data significantly while almost preserving the full perceptual image quality. Although specific forms of the chroma sub sampling technique have been introduced initially in different television standards to reduce analog frequency band widths required by the television channels, today many high end digital systems still use chroma sub sampling for intermediate data transmission as it optimizes costs at almost no visual quality loss. As the human visual system contains 3 types of photo receptors which lead to the eventual perception of the 3 primary colors red, green and blue it is necessary to represent the human perceivable colors by 3 separate components as illustrated in FIG. 4 (in which the blue component is labelled "S" and is represented by a dashed line, the green component is labelled "M" and is represented by a solid line and the red component is represented by a dot-dashed line and is labelled "L") by the normalized responsivity spectra of the human cone cells. Many imagery sources use a RGB matrix to represent the data per picture element (pixel). The R, G and B values generated, captured, transmitted or displayed represent a luminance value per channel, according to a (usually fixed) law. This "law" can be a linear representation for the amount of red, green and blue photons, but often a perceptually more efficient coding method is used, often referred to as a "gamma" law and more generally described as an optoelectric transfer function. A typical example of this is the sRGB standard as illustrated in the plot in FIG. 5 of the sRGB intensities versus sRGB digital integer numerical values (lower dotted line curve), and this function's slope (which is the effective gamma at each point) in log-log space (upper solid line curve). Below a compressed value of 0.04045 or a linear intensity of 0.00313, the curve is linear so the gamma is 1. Behind the lower dotted curve a dashed black curve is drawn showing an exact gamma=2.2 power law A complete discussion of all possible non-linear color component encoding is outside the scope of this document. Things become more important when the R', G' and B' values are converted by a (3×3) matrix operator, for example into Y', Cb' and Cr' components as illustrated by the equations (in eq.1) below for 8 bit digital Y'Cb'Cr' values:

$$Y' = 16 + (65{,}481 \cdot R' + 128.553 \cdot G' + 24.966 \cdot B')$$

$$C_B = 128 + (-37.797 \cdot R' - 74.203 \cdot G' + 112.0 \cdot B')$$

$$C_R = 128 + (112.0 \cdot R' - 93{,}786 \cdot G' - 18.214 \cdot B')$$

Eq. 1 ITU-R BT.601 television standard conversion from RGB' to YCbCr'

The set of equations in eq.1 above are valid for ITU-R BT.601 television standard conversion. Note that the Y' value represents the luma channel and the Cb' and Cr' channels are the 2 components representing chroma. Because of the earlier described non-linear encoding, this is not the same as visual luminance and chrominance. The most common approach for implementing chroma sub-sampling is to maintain all samples and thus the full bandwidth for the luma channel. Luma is represented by 1 sample per pixel. A typical high end apparatus sub-samples the chroma channels by a factor of 2. The obtained chroma channel alternately represents Cr' for half of the pixels and Cb' for the other half so that each pixel pair is effectively represented by 2 luma values, 1 Cr' value and 1 Cb' value. Such a chroma sub-sampling scheme is often referred to as 4:2:2 sub sampling. Although many other sub-sampling schemes (such as 4:2:0, 4:1:1, Bayer pattern mosaic) have been proposed and implemented in multiple standards, it is not the purpose of this document to cover a complete discussion of all chroma sub sampling standards. Different chroma sub-sampling schemes are supported by applying a different overall resizing factor combination per chroma component. In order to retrieve all 3 color components per source pixel, often chroma upsampling by a power of 2 must be performed. In most cases this is implemented as a simple FIR (finite impulse response) filter, but more advanced implementations, including the usage of statistical filters, exist. Many state-of-the-art systems use elaborated FIR filters with a high number of filter taps, which means each retrieved chroma sample is calculated from many (for instance 48) received samples. The result of such a so-called mathematical convolution process attempts to reconstruct missing chroma samples from the non-missing surrounding sample values. When implemented this way the chroma upsampling process must be considered as a special case of resizing an image per color component, where the so-called scaling factor is an integer number like 2 (when for instance converting 4:2:2 into 4:4:4, see further). The scheme shown in FIG. 6 illustrates how the horizontal convolution could be performed by a FIR filter. The scheme in FIG. 6 does not contain pipelining information within the processing except from the delay line, which is required by the nature of the convolution filter. This discrete-time FIR filter of order 5 performs a convolution in horizontal dimension. The top part is a 6-stage delay line with 7 (6+1) taps. Each unit delay is a $Z^{-1}$ operator in Z-transform notation. Each tap is weighted by a corresponding coefficient $b_0$ to $b_6$. The weighed sum of the source sub pixels in x[n] provides the missing chroma values at the output y[n]. Note that the above circuit in FIG. 6 does not represent an optimized implementation but rather a general representation. In order to preserve the phase relations between the inputs signal frequencies, it is preferred to have symmetrical filter coefficients for chroma upsampling. Such a set of coefficients is illustrated in FIG. 7. The circuit above in FIG. 7 represents a practical example of an often used chroma upsampling filter where the filter coefficients are the result of the symmetric cubic convolution equation solved for the positions of the missing sub pixel samples. The input x[n] is oversampled in the above circuit. At any clock cycle half of the sample values inside the multi-stage delay line are zeros. This means that the filter's output in this example can be described alternately as:

a copy of the input value: FIR coefficients are 0, 1, 0 a FIR filter at half the output sample rate (with $Z^{-2}$ taps) with the following coefficients: −0.125, 0.625, 0.625, −0.125

In most implementations the above oversampled circuit is split in 2 streams in parallel, not as an alternating time sequential process. This is illustrated in FIG. 8. As the most "expensive" operations in digital signal processing are the multiplier operators, used here to apply a "weight" to each tap, it is often desirable to exploit the symmetry of the filter by grouping equally weighted taps or taps with weights which differ by a power of two (as this requires shifting the values before summation which requires no resources in case of a hardware implementation or just a simple shift instruction in case of a software embodiment). This DSP efficiency optimization step taking benefit of the symmetry properties of the impulse response is illustrated in FIG. 9. As can be noticed in FIG. 9, only 2 multiplicative operators are implemented, thereby greatly improving the implementation efficiency. Note that in this example 1 signal is attenuated 8 times and inverted (with coefficient−0.125) which can be optimized in practical implementations as a shift operation. A shift operator requires minimal computational operations by a software processor and even requires no hardware at all when implemented in FPGA devices, for instance as it must be considered as rewiring the bits. Although any suitable computational technique can be used in embodiments of the present invention such techniques are included with the scope of the present invention, i.e. all possible computational optimizations techniques, A further optimization technique is possible for any arbitrary number of taps. A 15-taps chroma upsampling filter which would require 14 $Z^{-1}$ elements in a 14-stage delay line, can be implemented with only 7 $Z^{-2}$ elements in a 7-stage delay line and due to the symmetry optimizations requires only 4 multiplication operations. FIG. 10 illustrates the circuit for such a 15-taps chroma upsampling filter. The sum of the coefficients (or pixel tap weights) in the scheme equals 1 as each of the coefficient values is applied to 2 input pixel values. The sum of the values in the scheme above=0.603−0.128+0.028−0.003=0.5. Each coefficient is applied twice, so the sum after applying the symmetry effective becomes 1. That indicates the FIR filter above is normalized. The chroma upsampling FIR filter has no impact on DC signals or very low frequencies. When this filter is implemented as an oversampling filter with single input and single output the resulting non-optimized equivalent circuit is illustrated in FIG. 11. Note that the sum of the coefficients in FIG. 11 becomes 2 as required for the oversampling: the output signal should reflect the same energies in the signal, but with twice as many samples per chroma component. Half of the output samples are aligned with the input samples while the other half is interpolated by the filter which applies a convolution process equivalent to one of the above described schemes. Most video standards use a so-called interleaved chroma subsampling technique which means that the chroma subsampling alternatively selects one of the 2 chroma components (Cb or Cr for instance). For instance the Cb value for the odd pixel columns can be rejected while the Cr value for the even pixel columns is rejected. The chroma upsampling filter arrangement for such video standards is illustrated in FIG. 12. The X-switch in this circuit toggles every pixel period in order to interweave copied chroma samples with interpolated samples (which were missing in the input chroma stream) for each of the 2 chroma streams.

Interlaced video is a technique of doubling the perceived frame rate without doubling the line pace (no extra bandwidth required) while preserving vertical resolution. An interlaced signal contains the two so-called "fields" of a video frame, often even captured at two different times in which case it enhances motion perception to the viewer, each field containing only an alternating half of the lines. It is customary to refer to these fields as "even" and "odd" fields, based on the corresponding lines within each field. The eye sees a virtually doubled refresh rate which reduces flicker by taking advantage of the persistence of vision effect. This results in an effective doubling of time resolution (also called temporal resolution) as compared with non-interlaced footage (for frame rates equal to field rates). Some display technologies such as CRT or Plasma displays can natively handle interlaced video formats, but before such sources can be displayed on LCD or DLP displays a process of de-interlacing must be performed.

De-interlacing is the technique to restore the missing lines and thus the process effectively doubles the line frequency and the corresponding required bandwidth when performed separately. It is important to notice that de-interlacing should be performed motion-adaptively to obtain good image quality. The missing lines can be restored based on the corresponding lines from previous fields, but this type of field weaving requires static imagery. Advanced algorithms exist to find the best possible matching area between the missing data in the current field and data in next or previous fields, usually based on some form of correlation measurements or recursive block matching techniques. All these methods share the same objective: the knowledge of where (missing) data is coming from and/or where it's going to. Often the result of such an analysis is referred to as a "motion vector". Once the motion vector is determined, future and/or past fields can be repositioned effectively using advanced poly phase filtering techniques, effectively converting a situation of continuous motion into the same static situation where field weaving can be used. Often this technique is referred to as "motion compensation". It is not the purpose of this document to discuss all known motion detection algorithms which can enhance image quality, sometimes in very specific situations, neither to discuss the need for a scene detection circuit when current field is completely uncorrelated with the previous field. Regardless of the complexity of the motion detection circuitry and the ability to convert continuous motion into static images (at least within an area of interest within the image), a de-interlacing circuit can be represented by the simplified circuit in FIG. 13: The scheme contains 4 functional blocks, although these don't have to be literally separated in practical implementations. However, the equivalent functionality of each of these 4 functions is necessary to obtain motion adaptive de-interlacing. The FW block performs a temporal insertion of the corresponding missing line from the previous field, the next field, or some (adaptive) combination or selection of the corresponding missing line from multiple fields. The FW block does not perform any spatial convolution processes at all. In most cases it can be considered as a pure repetition or duplication of existing data. Therefore it can be considered as a special case of spatial convolution: the unit transform, which is the equivalent of a convolution filter where all coefficients are zero except for one, in this case the center line, which has a coefficient equal to one. Sometimes the choice between inserting data from the next field or data from the previous field is performed adaptively by a statistical order filter, however this does not change the fact that the FW block can be considered as a vertical unit convolution. The IFI block always performs some form of spatial convolution filtering. This can be a simple fixed vertical FIR filter such as in equation 2 below.

$$Y[n]=-0.125*X[n-3]+0.625*X[n-1]+0.625*X[n+1]-0.125*X[n+3]$$

Eq. 2 Example of possible filter coefficients based on standard type of cubic convolution Where Y[n] is the filter output for the Nth line (which is missing in the current field) for a specific column and X[n−3] to X[n+3] are the values for the pixels within the surrounding source lines (present in the current field) for the same specific column. The filter coefficients in eq.2 are based on a cubic convolution and are here only for illustrative purposes. This is illustrated in FIG. 14. The same optimization technique is used here as was described earlier for the chroma upsampling circuit. Note that the Z-dimension represents the vertical image dimension. The Z transform represents image lines and not columns as for chroma upsampling: a single $Z^{-2}$ block therefore represents 2 video line delays and consumes the corresponding density of memory storage space. Many de-interlacing algorithms adapt the vertical convolution based on the best correlating direction in order to "follow" the edges of object boundaries. The direction of the vertical convolution can be different from the conventional orthogonal alignment of the 2 resizing dimensions. Often the term adaptive diagonal filtering is used to describe this technique. This technique performs the equivalent of an auto-correlation measurement within several (at least two) successive lines of video data. A simple example of this adaptive diagonal filtering method is obtained by executing the following steps:

1) Calculate the correlation values (or a good enough equivalent) of the information in the line on top of the current missing line at the current horizontal position (x) displaced by an offset (dx) with the information in the line below of the current missing line at the current horizontal position (x) displaced by the inverse offset (−dx). Correlation values can be approximated by recursive block matching techniques as well based on the (weighted) sum of absolute differences, for instance.
2) Find the maximum correlation value for all values of dx: Bdx. The accuracy of dx (amount of sub pixels per pixel) as well as the range of dx are chosen to be the best compromise between cost and performance. When the accuracy of dx is improved, the jaggedness of image details is reduced but the amount of calculations to be performed is increased. When the sweep range of dx is increased, the directional adaptivity of the diagonal filter is improved causing near horizontal objects edges to be restored more properly.
3) Capture (or resample) the best correlating video data indicated by the best dx value obtained by the previous step and apply the corresponding values to the same vertical convolution filter as would be used without adaptive diagonal filtering. In this simple case the first input equals the (resampled) value within the line on top the current missing line at position x+Bdx while the second input equals the (resampled) value within the line below the current missing line at position x−Bdx.
4) Apply the conventional (vertical) convolution filter. In this simplified case that filter uses only 2 lines and can be written as in eq.3:

$$Y[n,x]=0.5*X[n-1,x+Bdx]+0.5*X[n+1,x-Bdx]$$

Eq. 3 Linear interpolation used inside fields

Here Y[n,x] is the filter output for the $N^{th}$ line (which is missing in the current field) for a specific column (x) while X[n−1,x+best dx] and X[n−1,x−best dx] are the (resampled) values for the (sub-) pixel values within the surrounding source lines (present in the current field) at a column location obtained by the best correlation value. Similarly the solution for an adaptive diagonal cubic filtering can be written as follows in eq.4:

$$Y[n,x]=-0.125*X[n-3,x+3*Bdx]+0.625*X[n-1,x+Bdx]+0.625*X[n+1,x-Bdx]-0.125*X[n+3,x-3*Bdx]$$

Eq. 4 Adaptive diagonal cubic filtering used inside fields

It is important to note that such an adapted direction for the convolution operator is also applicable for the resizing process because this indicates the current invention can also be used with such techniques. The MAI block performs interpolation between the outputs of the previously described two blocks: the FW (field weaving) and the IFI (intra field interpolation). The interpolation coefficient depends on the output received from the MD (motion detection) block (see further). For a specific amount of motion, the MAI block can be considered as a 2 tap convolution process again. This consideration leads to an important conclusion when considering the combination of FW, IFI and MAI blocks. As the FW and IFI blocks are convolutions performed in parallel on the same input data and as their results are interpolated by the MAI convolution process, the entire schematic between the interlaced input and the progressive output is mathematically once again a (more complicated) convolution. This single motion adaptive convolution process can be illustrated by the scheme in FIG. 15. The circuit in FIG. 15 contains the following signals:

x[2n+1] represents the matching lines from a previous (or any surrounding) field that match the currently missing lines.

x[2n] represents the lines from the current field.

y_FW[2n+1] is the current video line recovered by the field weaving process.

y_IFI[2n+1] is the current video line calculated by the intra field interpolation process.

y_MAI[2n+1] is the current video line motion adaptively restored based on an interpolation between the intra field interpolation and the field weaving processes.

When analyzing the circuit in FIG. 15, it becomes clear that the final output uniquely depends on convolution processes as it is a linear combination of weighted input taps as illustrated by the circuit in FIG. 16. The 2 circuits above described in FIGS. 15 and 16 are equivalent to each other. A single vertical convolution FIR filter is required to perform the de-interlacing process, although the FIR coefficients are modulated by the MD value which is provided by the motion detector. Note that the coefficients are always normalized, regardless of the amount of motion in order not to alter locally constant colors, as DC levels and low frequencies pass unaffected through the circuit. The MD block controls the above described interpolation process by generating a value which represents the amount of motion detected by the circuit inside the block. It is not important to discuss all details and possibilities of the motion detection block. In general a motion detection circuit must calculate temporal differences per pixel location or per area based on information from at least 2 different fields or frames. It must contain some filtering to separate motion from noise and some (soft) threshold operator to determine when there's "enough" motion in the video data. The better the motion detector is implemented, the better the overall image quality becomes. Most motion detection algorithms contain a set of (automatically optimized) parameters and the best settings (optionally obtained by training or signal characterizing) can depend on the video source and the material.

Within the scope of this document the resizing process can be considered as 2 convolution filters: one in horizontal dimension, one in vertical dimension. Note that not all resizing algorithms or two dimensional convolution operators are separable. A two dimensional Gaussian filter is separable for instance, but a two dimensional difference of Gaussians (a so-called DOG filter) is not. However, most resizing methods use separable convolution resampling formulas, in order to comply with the so-called Nyquist resampling criteria when an orthogonally aligned sampling grid is used, as is the case for most pixel grids in digital (video) images. Popular separable resizing algorithms include bilinear interpolation, surface mapping, all types of cubic convolution including the popular Catmull-Rom spline, Lanczos3 and other windowed sinc filters. All of the above algorithms can be implemented as poly-phase FIR filters. The difference between standard FIR filters and poly-phase FIR filters is, as the name suggests, the amount of phases the filter can resolve. A standard FIR filter contains a single set of coefficients, as the output samples have a fixed phase relation to the input samples. This is the case for de-interlacing and chroma sub-sampling processing blocks as described earlier. In contrary a poly-phase filter applies the same type of convolution filtering, but for a variable output sample position. The electric circuit to implement this type of filter is very similar to the standard single-phase FIR implementation, with one important difference: the coefficients (or the weights) which define the convolution's impulse response are modulated by the output sample position. This is the case for the horizontal resizing filter where the IR coefficients are a function of the output pixel column within the output image. This is illustrated in FIG. 17 for an 8-tap poly phase filter. Note that input and output signals in FIG. 17 are indicated by separate index values ($n_i$ and $n_o$) as the amount and thus the pace of the samples is different for input and output because of the scaling or resizing process. Each of the 8 filter taps obtains an independent weight from its corresponding function $F_0(p)$-$F_7(p)$, where p represents the resampling phase. This resampling phase is commonly generated as a normalized (range from 0-1) sub pixel positioning measure. When p has a value near 0, the (center of the) output pixel is located close to the input pixel to its left. When p has a value near 1, the (center of the) output pixel is located close to the input pixel to its right. Similarly the vertical resizing filter coefficients are a function of the output pixel line position within the output image. As each output column index corresponds to a specific sub column position or phase (p) one can chose to calculate the functions $F_0(p)$-$F_7(p)$ also directly from the output column index $F_0(ci)$-$F_7(ci)$. Similarly as each output line index corresponds to a specific sub-line position, again called phase (p) one can again chose to calculate the functions $F_0(p)$-$F_7(p)$ also directly from the output line index $F_0(li)$-$F_0(li)$. For a given resizing process these weight functions are fixed, allowing the often complex functions to be pre calculated and stored in a LUT (look up table). Whether it is preferred to apply the (column or row) position index or the phase to address the corresponding function results for each tap within the LUT can depend on quality aspects and available signals. Naturally the applicability of the current invention is independent of this choice. For convenience reasons the circuits described in this document will contain the phase signal or value (p) per output (sub-) pixel as illustrated in FIG. 18, although a direct LUT addressing from column and line indexes is just as valid. The sub-pixel positioning $y[n_o]$ of output pixels in between the source pixels $x[n_i]$ depends on the phase signal p. Each output pixel has a corresponding phase $p[n_o]$ which can be calculated with any arbitrary precision, depending on the quality and computational cost requirements. In many practical implementations a byte represents the phase signal, thereby defining the phase by a precision of $1/256^{th}$ of a source pixel. Such a choice allows enlarging the image up to a factor of 256 with high quality while each output pixel will maintain a unique position. The LUT content depends on the chosen impulse response for the filter. The addresses represent the sub source pixel positioning of output pixels while the 6 stacked data partitions represent the weights per source pixel. The circuit in FIG. 18 is a 6-tap poly phase filter which is suitable for example to implement a popular Lanczos3 resizing intended for high quality enlargement. The Lancos3 algorithm is a type of windowed sinc filter where the window itself is defined by another sinc, but with a frequency 3 times lower than the resampling sinc. The Lanczos3 algorithm therefore requires 6 taps when symmetry is considered on top of the 3 windowed sinc lobes. Some popular combinations of processing blocks as found in existing state of the art image processing chains are listed in table 1.

TABLE 1

Some practical state of the art image processing chain combinations.

| example | Chroma Upsampling | De-Interlacing | Resizing |
| --- | --- | --- | --- |
| 1 | linear interpolation (2 taps) | linear interpolation (2 taps) | linear interpolation (2 taps) |
| 2 | Catmull-Rom spline (4 taps) | Cubic Convolution (4 taps) | Cubic Convolution (4 taps) |
| 3 | Hann windowed sinc (8 taps) | Lanczos2 (4 taps) | Lanczos3 (6 taps) |
| 4 | Hamming windowed sinc (24 taps) | Blackman windowed sinc (8 taps) | Hann windowed sinc (12 taps) |

A high quality image processing chain should preserve as much of the original source detail as possible without introducing artifacts such as aliasing or ringing. It should perform well on still images as well as on moving imagery. The best possible quality one can obtain with the current state of the art processing chains is limited, not by the limited quality of the individual blocks, but rather by the combination of them.

Now missing packet reconstruction, especially in streaming environments is discussed. Even in well dimensioned streaming environments it is impossible to completely eliminate the risk of packet loss. When using a real time transport protocol such as RTP, a typical network packet consists of about 1200 bytes, usually in the range between 800 and 1500, depending on the video source standard and the available network bandwidth, potentially reserved for that specific video stream. Thus in case of a RGB video source with 4:4:4 color encoding, a typical RTP packet corresponds to about 400 pixels. In the event of a packet loss for a conventionally scanned image source, from left top to right bottom, the video data of a horizontal line of about 400 pixel columns is missing. Without special attention the packet loss event causes a visual disturbance we refer to as a "hair". In a conventional image processing chain a packet loss event is often handled by a packet loss filter. In healthy network environments this filter can be kept as simple as a pure repetition of the source pixels from the line above the missing packet by duplicating them in the missing "hair" area. In general the missing pixels in the "hair" are reconstructed from the surrounding lines using a convolution filter, as illustrated by the 7-taps filter circuit in FIG. 19. The $Z^{-1}$ blocks in the circuit mentioned above in FIG. 19 represent unit delays in the vertical direction. The central tap between these line delays represents the currently evaluated line. In case of a packet loss event, the activated PLE value becomes one and the coefficients in the convolution filter correspond to the formulas in the Figure. In case of a PLE the missing pixels within the currently evaluated line are reconstructed from the corresponding horizontal pixel positions within the 3 lines above and below. In case no PLE is detected, the original pixels represented by the center tap, simply pass through the filter. Although this filter design might be capable of handling most packet loss events, it fails to reconstruct a missing packet in case at least one additional packet is lost within the implemented vertical kernel with overlapping corresponding horizontal positions. This risk could be minimized by implementing a filter as small as possible at the expense of lower reconstruction quality, as a lower number of filter taps is more likely to produce reconstruction artifacts and thus potentially visible disturbances in the imagery. An improved solution to recover video data from packet loss regardless of the spatial proximity of lost packet within the image is illustrated in FIG. 20. Here again the $Z^{-1}$ blocks represent line delays. The central tap between these line delays represents the currently evaluated line. In case of a combination of packet loss events affecting the currently evaluated pixel column, the PLE values corresponding to the affected lines become one. Before calculating a new output pixel, first the packet loss events within the convolution filter kernel are evaluated for the current horizontal pixel position. Within this example the convolution kernel uses 7 taps, 3 lines above and below the included current line. The result is the PLE[−3 . . . +3] bus value, which indicates per output column which of the 7 pixel values within the currently evaluated pixel column are valid and which pixels are part of a missing packet. For each combination of invalid pixels p, corresponding to lost packets, an optimal set of coefficients for the convolution filter is calculated and stored in the look up table (LUT). This way the above circuit provides optimal flexibility to recover missing pixels in the most appropriate way for any combination p of lost neighboring packets. Obviously the circuit could be further optimized to reduce the amount of resources, once the mathematical reconstruction formulas are fixed. Another potential optimization for large filter kernels could be to eliminate the packet loss event for the currently evaluated line PLE[0] from the LUT's address bus and instead simply bypass the filter when PLE[0] is inactive. This optimization halves the required density for the LUT.

Second some insights to postulate the quality issue with a state of the art chain are provided. Regardless of the quality of the image resizing, the poly-phase filter process will by its nature always reduce certain high frequencies. A video source with a specific sample rate or pixel clock can contain information up to half the sampling frequency. A dot on dot off (dodo) pattern can be considered as a set of samples taken from a sine wave at the critical sampling frequency. Whenever an image is (even only slightly) resized the dodo pattern completely disappears in some areas while it is preserved 100% in other areas, a phenomenon commonly known as beat patterns or undulations. This effect is demonstrated in FIG. 47. The hashed square markers at 100 and 0% in FIG. 47 show the original samples containing a dodo pattern. These samples alternate between 100% (considered as white for now) and 0% (considered as black for now). The dodo pattern (represented by the dotted line linking the square dots at 100 and 0%) in the source image is critically sampled, which means the amount of samples to represent the image pattern equals the absolute minimum according to the so-called Nyquist criteria. The solid square dot markers show the resampled dodo pattern (values generally not at 100 and 0%), but with a slightly lower sampling frequency. This is equivalent to slightly reducing the size of the original image. The resampled solid line shows the signal which can be reconstructed from these new samples. This reconstructed function shows a very obvious beat pattern. Some areas in the FIG. 47 show a remaining modulation depth near 100% of the original amplitude while some approach 0%. The average modulation of frequencies near half the resampling clock frequency is reduced by 50%. One might find this obvious because the original image is slightly reduced in size, so there must be some reduction of information. However when analyzing the situation for a slight image enlargement, this intuitive explanation turns out not to be sufficient as indicated in FIG. 48 which has the same meaning for points and lines as FIG. 47. Although the new series contains more samples than the original source image, the highest frequencies are lost in some areas again, similar and even exactly equivalent to what happened in FIG. 47. In practice it does not make a difference whether an image with 1920 pixels per line is resampled to 1921 pixels per line or 1919 pixels per line. The beat pattern, both its amplitude and its frequency, is exactly the same. This is an important conclusion as the consequence of this implies that whatever resampling convolution algorithm is used, there is always some inherent loss of data involved in the process. Applying two filters in series to a signal will introduce this effect twice, even with the best state of the art image processing blocks. Theoretically when the upsampling reconstruction filter contains a (nearly) complete sinc response with thousands of filter taps, the beat pattern in FIG. 48 can be removed before further processing is applied to the signal. However when a dodo pattern is resampled at the correct output pixel locations to be displayed with a slightly higher resolution, there's no way to avoid the beat pattern without additional sharpness loss, even when a 1000 taps resampling filter is used. A display pixel located exactly halfway a white and a black source pixel must become grey. Applying an anti-aliasing filter, either by pre-processing the source data or by lowering the cut-off frequency determined by the poly-phase filter's impulse response, can remove the disturbing beat patterns at the expense of even more sharpness loss: the modulation of the original dodo pattern must be reduced to 0% instead of 50% in average as described above. It has been clarified so far that a critically sampled frequency will always be attenuated when several processing steps are executed sequentially. A cascaded number of FIR circuits will therefore always attenuate the extreme frequencies more than a single FIR. However, this does not explain what happens at other (lower) frequencies. It will be demonstrated in a number of examples that the remaining modulation at high frequencies (but not critically sampled) depends on the filter quality. The FIG. 49 (same meaning of points and lines as FIG. 47) illustrates what could happen to a source signal which has only half of the critical frequency, so the signal has a frequency a quarter of the sampling frequency.

Thirdly some resampling filter examples are shown. Obviously the resampling algorithm and reconstruction filter applied in FIG. 49 is not optimal. The function reconstruction (a dashed line with solid black squares) of the original source signal (solid line with open squares) is based on a standard Catmull-Rom spline algorithm. As the above FIG. 49 suggests the remaining average modulation in the output signal is somewhere between 88% and 100%. By calculating the Fourier transform of the Catmull-Rom spline, one can indeed obtain the attenuation of 94% for half the Nyquist frequency. A Catmull-Rom spline is a special case of cubic convolution and its impulse response is determined by the following equations in Eq. 5.

$$\text{Impulse Response of a Catmull-Rom spline} \quad \text{Eq. 5}$$

$$IR(x) = \begin{cases} 1.5^*x^3 - 2.5^*x^2 + 1 & \text{when } 0 <= |x| < 1 \\ -0.5^*x^3 + 2.5^*x^2 - 4^*x + 2 & \text{when } 1 <= |x| < 2 \\ 0 & \text{when } 2 <= |x| \end{cases}$$

The impulse response in eq. 5 is determined by several small pieces or "splines", each having their own equation. The response is defined as an approximation of 2 lobes of a sinc function. Because of the symmetry (as indicated by the |x| in the ranges) this impulse response actually performs a third order interpolation using 4 successive source sample values: in this case that third order equation is constructed by a linear interpolation between 2 parabolas, the first parabola being the curve interconnecting the first 3 samples, the second parabola being the curve interconnecting the last 3 samples. The positive half of the resulting impulse response is visualized by the dashed curve in FIG. 52. Another popular convolution filter is Lanczos3 which is a type of windowed sinc filter. The impulse response is visualized by the solid line in FIG. 50. The Lanczos3 impulse response is defined by eq. 6.

$$\text{Eq. 6 Impulse Response of a Lanczos3 windowed sinc convolution filter} \quad \text{Eq. 6}$$

$$\begin{cases} IR(x) = \text{Sinc}(x^*\P)^*\text{Sinc}(x/3^*\P) & \text{when } 0 <= |x| < 3 \\ 0 & \text{when } 3 <= |x| \end{cases}$$

Because of the wider range ($0<=|x|<3$) and the symmetry (as indicated again by the |x| in the ranges) this impulse response actually performs an interpolation using 6 successive source sample values. Therefore the Lanczos3 filter is a better approximation of the ideal reconstruction filter, the sinc function, which requires an infinite number of source pixels to compute a single new output pixel at the target pixel location. As the Lanczos3 convolution requires 6 filter taps, compared to the Catmull-Rom spline which requires only 4 filter taps, such a filter should provide a better image quality.

Fourth the identification of the need for a metric to perform filter quality analysis is discussed. An important aspect of the filter performance is the ability to preserve as far as possible any modulation which exists in the original source signal. This ability can be analyzed by looking at the Fourier transform corresponding to the FIR's impulse response: the so-called modulation transfer function or MTF, as illustrated in FIG. 51. The markers in the vertical axis indicate the attenuation or gain value performed by the filter. That value corresponds to the remaining modulation depth in the output signal when the original input signal contains 100% modulation for a given frequency (on the horizontal axis). The markers in the logarithmically plotted horizontal axis indicate the power of two compared to the Nyquist frequency. A value of 0 corresponds to the Nyquist frequency determined by the output sample frequency, which is effectively equivalent to the desired cut off frequency. A value of −1 corresponds to the half the desired cut off frequency, −2 indicates a frequency of 2 octaves below the cut off frequency. In this frequency range the modulation in the source signal should ideally pass through the filter resulting in a target MTF value of 1. Values lower than 1 must be considered as a sharpness loss. Values above 1 can sometimes be acceptable and can perceptually enhance an image by emphasizing details, although such effects are undesirable for general purpose applications where the display device is not known or not fixed. A value of 1 corresponds to twice the desired cut off frequency, 2 indicates a frequency of 2 octaves above the cut off frequency. In this frequency range the modulation in the source signal should ideally be blocked completely by the filter resulting in a target MTF value of 0. Values different from 0 cause aliasing artifacts which tend to cause disturbing visible Moiré or interference patterns because these undesired frequencies are mirrored around the Nyquist frequency. As can be noticed when analyzing FIG. 51 the 6 taps Lanczos3 windowed sinc convolution (solid line) provides a much steeper transition from the pass band to the stop band compared to the 4 taps Catmull Rom spline (dashed line). Therefore it is obvious to say in this case, when comparing these two examples, that the Lanczos3 filter will provide an overall better image quality with less visible artifacts and better preservation of fine details compared to the Catmull-Rom spline technique. Unfortunately evaluating the filter quality is not always that obvious. In fact the optimal filter response may depend on multiple parameters:

Viewing distance and display resolution (the pixel size seen by the human eye)

Perceived image contrast (affected by the display and the environment)

Input source standard (standard or high definition video source or computer graphics) and its corresponding post filtering specifications Application (what is the observer looking for?)

Image content.

Embodiments of the present invention may make use of any suitable filtering operation and not all aspects affecting the perceptual image quality as influenced by a filtering operation such as resizing will be described. Many advanced quality analysis metrics have been proposed which are included within embodiments of the present invention, such as the structural similarity metric (SSIM), but here the discussion will be restricted to an objective filter spec compliancy analysis as an example of such a filtering operation. To illustrate the non-trivial quality aspects of a convolution filter we consider a special case of cubic convolution, which is referred to as the Rifman convolution. Its impulse response is determined by the following equations in Eq. 7.

Impulse Response of a *Rifman* convolution  Eq. 7

$$IR(x) = \begin{cases} x^3 - 2^*x^2 + 1 & \text{when } 0 <= |x| < 1 \\ -x^3 + 5^*x^2 - 8^*x + 4 & \text{when } 1 <= |x| < 2 \\ 0 & \text{when } 2 <= |x| \end{cases}$$

Compared to the earlier described Catmull-Rom spline, the Rifman convolution provides extra overshoot and higher impulse response steepness, as illustrated in FIG. 52 (Rifman represented by solid line, Catmull-Rom spline as dotted line). When comparing the two corresponding modulation transfer functions the difference in filtering characteristics become even more obvious as illustrated in FIG. 53 (Rifman represented by solid line, Catmull-Rom spline as dotted line). Although the differences between the 2 filtering characteristics are clearly visible, it is not obvious to determine which of both filters delivers best image quality. The Rifman cubic convolution provides an emphasis of some visible higher frequencies of about 5% as the chart indicates, but is such a high frequency emphasis feature indeed desirable? A second clear difference is the higher stop band ripple introduced by the Rifman cubic convolution compared to the Catmull-Rom spline, which could introduce visible aliasing artifacts, but how disturbing are these?

Aim of the Invention

It is an aim of embodiments of the present invention to provide methods of video processing (hence generating one or more output images) by performing processing on one or more input images in an efficient and/or low latency fashion, suitable for use in a streaming environment. The processing chains may contain building blocks. Further, in accordance with embodiments of the present invention various forms and optimizations of those building blocks are given. The present invention can be applicable to all those various forms and optimizations and can even benefit and/or enhance these. For example, an aim of embodiments of the present invention is computational optimizations techniques, which are always applicable and do not depend on "lucky" numbers. Embodiments of the present invention can have an aim to overcome quality limitations of processing chains comprising a plurality of individual blocks.

SUMMARY OF THE INVENTION

Embodiments of the present invention provide methods (and related software and video processors) of video processing (hence generating one or more output images) by performing processing on one or more input images (in a high quality image processing chain) in an efficient and/or low latency fashion, suitable for use in a streaming environment. Therefore embodiments of the present invention relate to a system for video processing, a video image processor or a method, e.g. as part of color video processing, of generating an output image by performing processing on an input image, wherein the processing is characterized in that it achieves the effect of a plurality of first unit image process steps, the method comprising the steps of performing sequentially one or a plurality of second image process filtering steps on said input image to generate said output image, wherein at least one of said second image process filtering steps achieves the effect of at least two, three, four, or five of said first image process steps (simultaneously).

Embodiments of the present invention relate to a system for video processing, a video image processor or a method, e.g. as part of color video processing, of generating an output image by performing processing on an input image, wherein the processing achieves the effect of a plurality of individual first image process filtering steps selected from up-sampling, de-interlacing, a resizing, a vertical and horizontal resizing; a packet loss reconstruction, or data padding or data interpolation techniques used in combination with resizing and/or packet loss reconstruction, the method comprising the steps of performing a single combined filter operation for sequential execution of one or a plurality of second image process steps on said input image to generate said output image, wherein at least one of said second image process steps achieves the effect of at least two, three, four, or five individual filtering steps selected from up-sampling, de-interlacing, a resizing, a vertical and horizontal resizing; a packet loss reconstruction, or data padding or data interpolation techniques used in combination with resizing and/or packet loss reconstruction.

The single combined filter operation can be performed by a single filter.

Hence, in a first aspect of the present invention a method of video processing for generating an output image by performing processing on an input image is provided, wherein the processing achieves the effect of a plurality of first image process steps selected from up-sampling, de-interlacing, a resizing, a vertical and horizontal resizing; a packet loss reconstruction, or data padding or data interpolation techniques used in combination with resizing and/or packet loss reconstruction, the method comprising the steps of performing sequentially one or a plurality of second image process steps on said input image to generate said output image, wherein at least one of said second image process steps achieves the effect of at least two, three, four, or five of said first image process steps.

In an embodiment thereof at least two of said second image process steps achieve the effect of at least two, three, four, or five of said first image process steps.

In an embodiment thereof said first image process steps comprise any of separable vertical and horizontal chroma up-sampling, motion adaptive de-interlacing, separable resizing, and preferably missing data reconstruction.

In a further embodiment thereof one of said second image process steps achieves the combined effect of chroma up-sampling and horizontal resizing; and/or another of said second image process steps achieves the combined effect of de-interlacing and vertical resizing.

Embodiments of the present invention are applicable to any type of resizing, including all windowed sinc filters such as the popular Lanczos3 algorithm. They even allow for any arbitrary combination of de-interlacing filter choice and resizing filter choice.

In yet another embodiment at least one or two of said second image process steps is implemented as a poly-phase filter, optionally clamped between the results of 2 other linear filters.

It should be noted that embodiments of the present invention work independently from any color component standards applied to the imagery as any standard (say R'G'B' values) can be easily converted into a desired signal encoding (say RGB values) by using look up tables. Embodiments of the present invention work with all currently known chroma sub-sampling schemes.

Embodiments of the present invention can be completely independent from the utilized method and algorithm for motion detection.

In yet another embodiment one or more of said second image process steps include filtering and the filter parameters and/or implementation of one or more of said second image process filtering steps improve any one of output image quality, latency, execution cost of the method and/or the performance of the method.

In accordance with embodiments of the present invention can include an efficiency optimization step, e.g. taking benefit of the symmetry properties of the impulse response is illustrated in FIG. 9. Embodiments of the present invention work just as well for coefficients 0.647 and −0.147 instead of the numbers in FIG. 9: 0.625 and −0.125.

In a further embodiment said one or more of said second image process steps is adapted for a processing engine (CPU, DSP, GPU, ASIC, FPGA or combinations thereof) on which the method is to be executed.

In an embodiment one or more of said first image process steps is selected as a convolution based filtering.

In an embodiment one or more of the following first image process steps of de-interlacing and resizing or vertical resizing is selected as an adaptive diagonal filtering method and/or based on methods only using linear operators.

In an embodiment the first image process step of packet loss reconstruction is selected as a packet reconstruction (filtering) method.

In an embodiment said second image process filtering steps achieves the combined effect of chroma up-sampling and horizontal resizing and is implemented as a number of parallel convolution filters, one per color component.

In an embodiment said second image process filtering steps achieve the combined effect of de-interlacing and vertical resizing and is implemented with two parallel resizing filters or alternatively with a single motion detector modulated resizing filter.

In an embodiment one of said second image process filtering steps achieves the combined effect of vertical chroma up-sampling, vertical resizing and de-interlacing.

In a further embodiment thereof said second image process filtering steps achieve the combined effect of vertical chroma up-sampling, vertical resizing and de-interlacing and is implemented as two poly phase filter paths, each comprising a number of parallel convolution filters, one per color component or alternatively with a single poly phase filter, one per color component.

In a further embodiment one of said second image process filtering steps achieves the combined effect of chroma up-sampling, resizing, de-interlacing and packet loss reconstruction, wherein optionally equal kernel sizes are used for two or more or all of the underlying first image processes.

In a further embodiment for one or more of said second image process steps at least part of the filter coefficients are stored in a Look Up Table, wherein optionally for the embodiment thereof being implemented by a plurality of parallel filters preferably at least part of their filter coefficients are stored in or derived from a same portion of a Look Up Table.

In a second aspect of the present invention a video processor (or system) is provided for generating an output image by performing processing on an input image, wherein the processor is adapted to achieve the effect of a plurality of first image process steps selected from up-sampling, de-interlacing, a resizing, a vertical and horizontal resizing; a packet loss reconstruction, or data padding or data interpolation techniques used in combination with resizing and/or packet loss reconstruction, the processor being adapted to perform sequentially one or a plurality of second image process steps on said input image to generate said output image, wherein at least one of said second image process steps achieves the effect of at least two, three, four, or five of said first image process steps. Preferably the processor is adapted to achieve the effect of at least one or more of the method embodiments as described in the first aspect of the invention.

In this aspect of the invention a video processor (or system) is provided for generating an output image by performing processing on an input image, wherein the the processor is adapted to achieve the effect of a plurality of individual first image process filtering steps selected from up-sampling, de-interlacing, a resizing, a vertical and horizontal resizing; a packet loss reconstruction, or data padding or data interpolation techniques used in combination with resizing and/or packet loss reconstruction, the processor being adapted to perform a single combined filter operation for sequential execution of one or a plurality of second image process steps on said input image to generate said output image, wherein at least one of said second image process steps achieves the effect of at least two, three, four, or five individual filtering steps selected from up-sampling, de-interlacing, a resizing, a vertical and horizontal resizing; a packet loss reconstruction, or data padding or data interpolation techniques used in combination with resizing and/or packet loss reconstruction.

The single combined filter operation can be performed by a single filter.

Said adaptation to the system may be hardware adaptations (ASIC or ASIP for the processor side (one or more processors arranged either in serial and/or in parallel) and/or adaptations on the memory system for storing the input, output or intermediate computed images) or being realized by providing processor readable code (stored in a one or more memories connected to the processor) realizing one or more or part of said methods are a combination thereof.

In an embodiment thereof the system comprises of one or more poly phase and/or convolution filters (optionally one or more thereof are arranged in parallel), and optionally other linear filters.

In an embodiment the processor comprises a processing engine and said one or more of said second image process steps is adapted for a processing engine (CPU, DSP, GPU, ASIC, FPGA or combinations thereof) on which the method is to be executed.

In an embodiment thereof the system is adapted so that said second image process filtering steps achieve the combined effect of de-interlacing and vertical resizing and is implemented with and hence comprise of two parallel resizing filters or alternatively with a single motion detector modulated resizing filter.

In an embodiment thereof the system is adapted so that said second image process filtering steps achieve the combined effect of vertical chroma up-sampling, vertical resizing and de-interlacing and is implemented as and hence comprise of two poly phase filter paths, each comprising a number of parallel convolution filters, one per color component or alternatively with a single poly phase filter, one per color component.

In an embodiment thereof the system is adapted so that for one or more of said second image process steps at least part of the filter coefficients are stored in a Look Up Table (and hence dedicated memory is provided therefore), wherein optionally for the embodiment thereof being implemented by a plurality of parallel filters preferably at least part of their filter coefficients are stored in or derived from a same portion of a Look Up Table.

In a third aspect of the invention a (computer-implemented) (semi-) automated method is provided for determining for one or a plurality of second image process steps (filter) parameters for use in a method in accordance with the first aspect of the invention, by comparing a reference set of inputs the respective performance of the original reference first image processing steps sequence and the second image process steps sequence; and iterate the performance is acceptably close.

In an embodiment thereof a method is provided to improve the quality/cost ratio comprising the following steps of 1) determine horizontal and vertical impulse responses for a reference by convoluting firstly chroma subsampling IR and horizontal resizing IR and secondly by convoluting de-interlacing IR and vertical resizing IR for a set of applicable input source standards and resizing factors (output resolution/input resolution ratio), 2) construct a single combined filter (based on sub pixel data in horizontal dimension, motion adaptive in vertical dimension) and calculate its horizontal and vertical impulse responses for the same set of applicable input source standards and resizing factors, 3) calculate the modulation transfer functions (MTF) for both implementations; 4) choose a set of quality analysis specs for graphical synthetic content or any advanced perceptually weighted quality analysis method, 5) analyze the obtained combination of quality improvements and/or implementation cost savings and, if necessary, reiterate from step 2 by picking another algorithm, adjust some of the available parameters or modify (some of) the functions determining the IR.

In a fourth aspect of the invention a computer program product, operable on a processing engine, for executing any of the method claims discussed and non-transitory machine readable storage medium storing the computer program products and/or (filter) parameters as determined by said methods and/or used in said video processor and/or systems as described, are provided.

The present invention also provides a controller for a video processor for generating an output image by performing processing on an input image, wherein the controller is adapted to achieve the effect of a plurality of first image process steps selected from up-sampling, de-interlacing, a resizing, a vertical and horizontal resizing; a packet loss reconstruction, or data padding or data interpolation techniques used in combination with resizing and/or packet loss reconstruction, the controller being adapted to perform sequentially one or a plurality of second image process steps on said input image to generate said output image, wherein at least one of said second image process steps achieves the effect of at least two, three, four, or five of said first image process steps.

In particular the controller may be adapted to perform a single combined filter operation for sequential execution of one or a plurality of second image process steps on said input image to generate said output image, wherein at least one of said second image process steps achieves the effect of at least two, three, four, or five individual filtering steps selected from up-sampling, de-interlacing, a resizing, a vertical and horizontal resizing; a packet loss reconstruction, or data padding or data interpolation techniques used in combination with resizing and/or packet loss reconstruction.

BRIEF DESCRIPTION OF THE DRAWINGS

FIG. 1 A typical state of the art image processing chain example

FIG. 2 Another possible state of the art separable image processing chain

FIG. 3 An example of the separable image processing chain in accordance with an embodiment of the present invention FIG. 4 Normalized responsivity spectra of the human cone cells FIG. 5 Opto electric transfer function for sRGB standard FIG. 6 Horizontal convolution performed by a FIR filter FIG. 7 Example of a symmetric horizontal convolution performed by a FIR filter FIG. 8 Split horizontal convolution performed by a FIR filter FIG. 9 Optimized split symmetrical horizontal convolution performed by a FIR filter FIG. 10 Symmetry-optimized horizontal convolution performed by a 15-taps FIR filter FIG. 11 Chroma upsampling by a non-optimized 15-taps FIR filter FIG. 12 Interleaved chroma upsampling by an optimized 15-taps FIR filter FIG. 13 Motion adaptive de-interlacing simplified block diagram FIG. 14 Example of intra field interpolation based on cubic convolution FIG. 15 Optimized single motion adaptive convolution process performing de-interlacing FIG. 16 Equivalent motion adaptive convolution process performing de-interlacing FIG. 17 Convolution by an 8-tap poly phase filter FIG. 18 A practical convolution example scheme by a 6-tap poly phase filter using a LUT FIG. 19 Lost packet reconstruction filter controlled by a packet loss event FIG. 20 Multiple lost packets reconstruction filter.

FIG. 64 Example BASIC program snippet normalizing the integer resizing impulse response.

FIG. 65 Example BASIC program snippet calculating the Modulation Transfer Function from the resizing impulse response.

FIG. 66 Example BASIC program snippet calculating the frequencies required by MTF and quality loss calculations.

FIG. 67 Example BASIC program snippet calculating the Modulation Transfer Function form the resizing convolution impulse response based on a pre calculated frequency sweep.

FIG. 68 Rec.709 Filtering specs violation (grey filled areas) compared to tolerated area (hatched areas).

FIG. 69 Example BASIC function calculating the linear gain from a specified gain in dB.

FIG. 70 Example BASIC program snippet calculating the Quality Loss based on the MTF and the filtering specs for the Video HD Rec.709 standard.

DETAILED DESCRIPTION OF EMBODIMENTS OF THE PRESENT INVENTION

Figure 4:
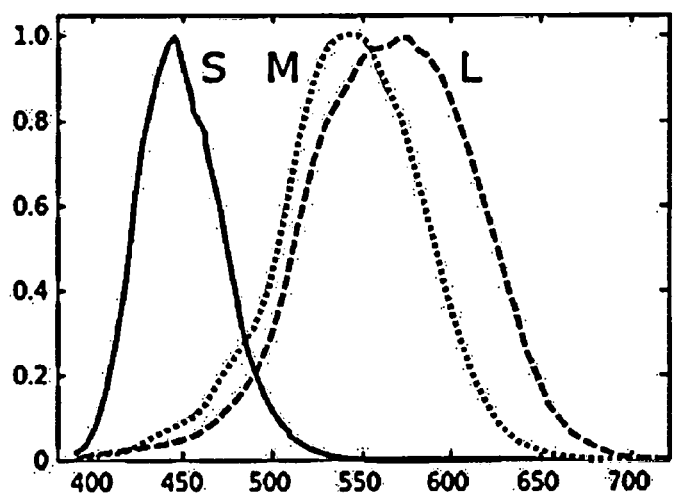
Figure 5:
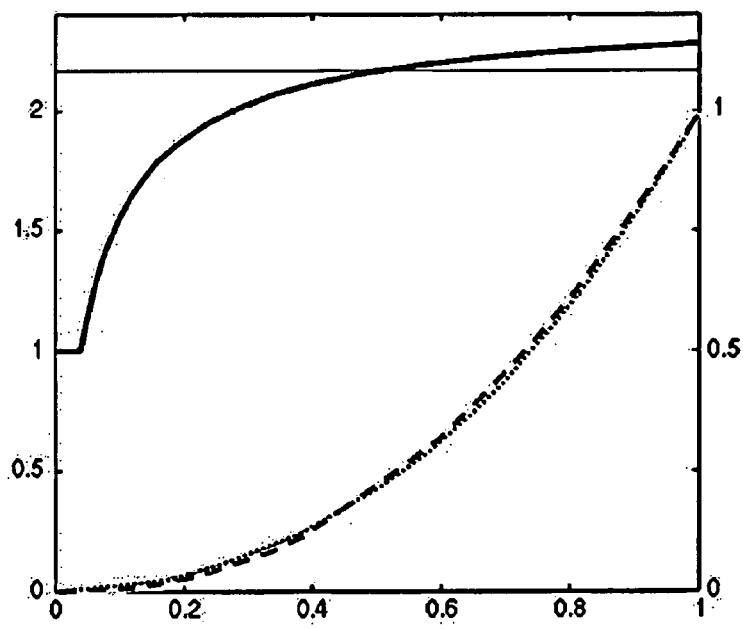
Figure 6:
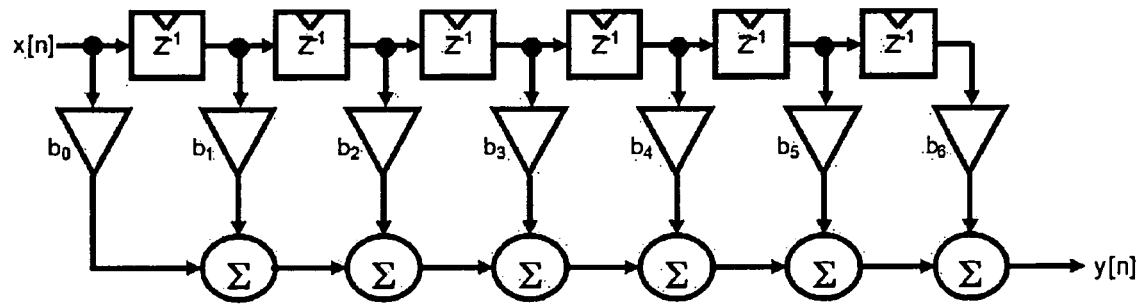
Figure 7:
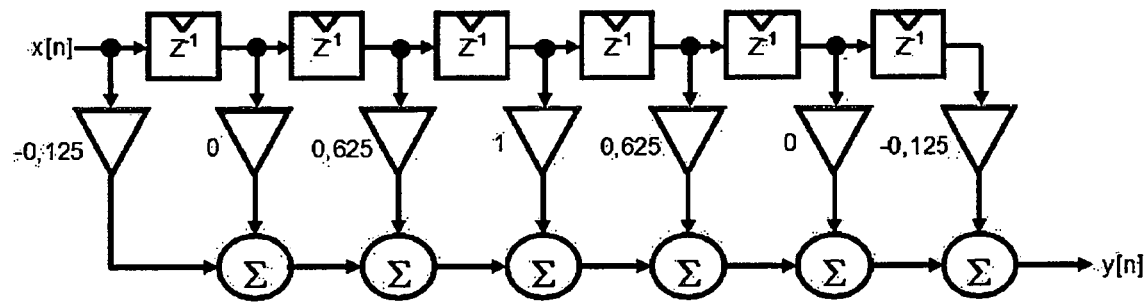
Figure 8:
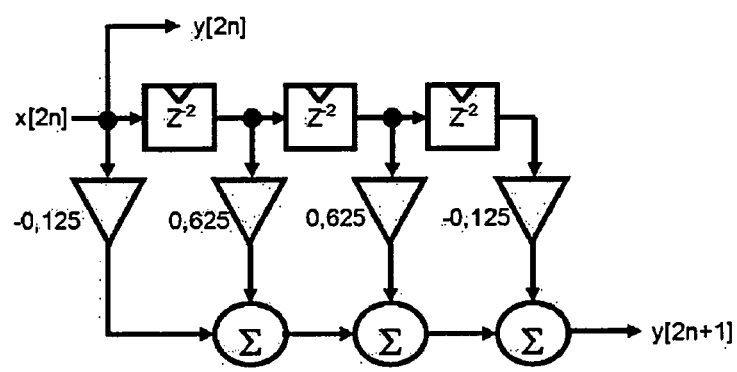
Figure 10:
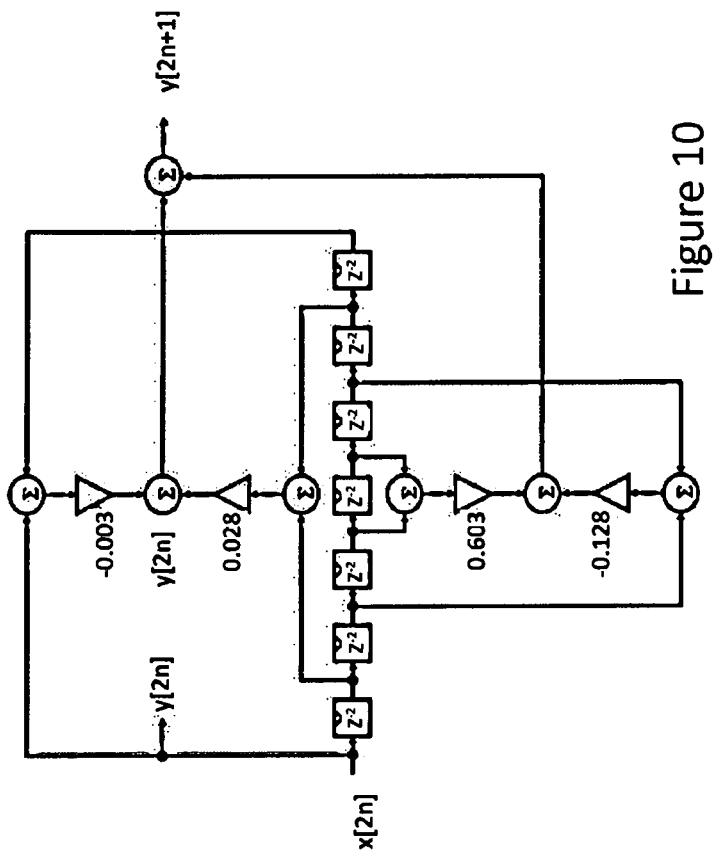
Figure 9:
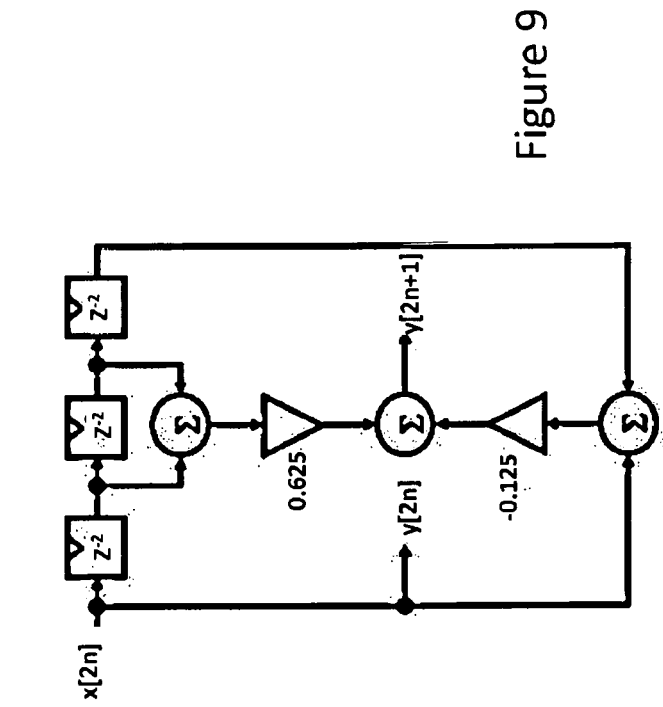
Figure 11:
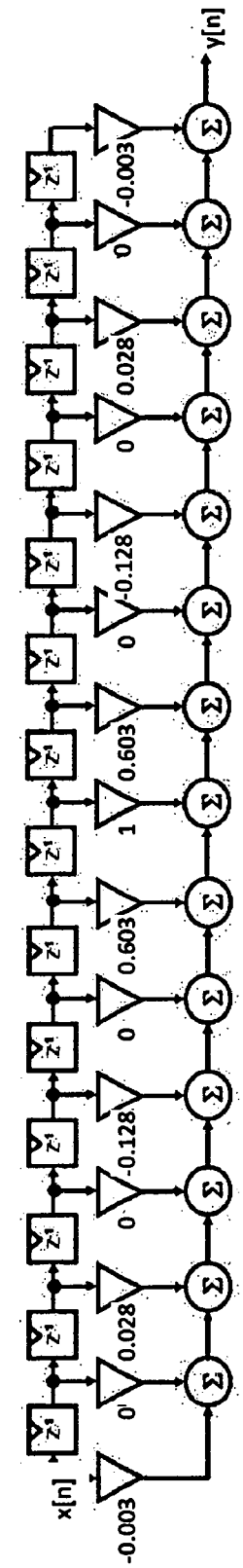

The present invention relates to (computer-implemented, meaning executed by or on an electronic apparatus or system as described further) methods and adapted apparatus or systems (computers, parts thereof like processors) to enhance the image quality in digital image processing systems wherein the processing chain has a plurality of distinct functions or first image processing steps, as an example where any form of resizing or resolution adaptation is a part in the processing chain. Sometimes the resizing process can be limited to a simple progressive resolution adaptation, for instance a notebook's desktop image which is resized to the larger display's native display resolution. However, often additional resizing steps are required as source images might be interlaced and/or chroma sub sampled. As most modern display technologies such as LCD and DLP require a progressive image representation with one sample value per color component and per pixel, often video sources require the combination of chroma upsampling, de-interlacing and resolution mapping. A typical state of the art image processing chain example is illustrated in FIG. 1. Here a broadcast standard interlaced full HD video source is applied as input to an image processing chain. A first processing block reconstructs the missing chroma samples, then a de-interlacing circuit recovers the missing lines and eventually the source resolution (1920×1080 pixels) is converted to the native display resolution (1280×720 pixels). As illustrated in FIG. 1 above the required bandwidth increases after chroma upsampling and it increases again after de-interlacing. The resizer needs to process 3 times the original amount of data received from the video source. In accordance with aspects pf the present invention, the processing blocks may be integrated into a processor or may be provided in a unit such as a controller.

Embodiments of the current invention can overcome this drawback by integrating all steps or at least part in a single processing step and thus helps to reduce the system cost. This integration process will be illustrated in more detail further in this document. The integration of multiple processing steps also helps to reduce the latency in practical implementations of a full image processing chain and when applied in a streaming environment it simplifies the handling of packet loss while preserving optimal image quality.

All (three) processing steps alter the video data by the equivalent of some form of a convolution. As a cascaded series of convolution functions results once again in a convolution, multiple serial convolution operators can be combined into one when the operators act in the same (physical) dimension. By replacing multiple cascaded filters with a single convolution step, the original image quality can be preserved better. Therefore the method proposed by the current invention provides improved image quality compared to the known state of the art implementations of the above described complete image processing chains.

The FIG. 2 illustrates another possible state of the art video processing path with separable resizing. The conventional approach is to separately implement each of these required conversion processes, as each processing block by nature has different unique complexities. The above image processing chain is a typical state of the art implementation found in many high end products as of today. The current invention reorganizes and thereby optimizes this image processing chain by exploring some beneficial properties of convolution operators, described further. The separate processing steps will be explained further in more detail, but at this point it is necessary to summarize the most important properties of the above processing blocks:

Chroma up sampling is performed by a separate horizontal convolution for each color component individually (per sub pixel) and is implemented as a standard FIR filter (finite impulse response) in the horizontal dimension.

De-interlacing is performed by a motion adaptive vertical convolution per pixel and is also implemented as a standard FIR filter in the vertical dimension.

Horizontal resizing is performed by a horizontal convolution per output pixel and is implemented as a so-called poly-phase FIR filter in the horizontal dimension.

Vertical resizing is performed by a vertical convolution per output pixel and is implemented as a so-called poly-phase FIR filter in the vertical dimension.

Note that all processing steps are convolutions, but with two important differences:

Some operate in vertical dimension, some in horizontal dimension

Some filters use a single phase, some are poly phase filters.

In accordance with aspects pf the present invention, the processing blocks may be integrated into a processor or may be provided in a unit such as a controller.

The difference between standard FIR filters and poly-phase FIR filters will be explained further in this document.

Obviously the use of a single combined filter or the step combination concept behind embodiments of the present invention with focus on system cost reduction, improved packet loss handling and/or image quality enhancement can be applied to any system for video processing organized as a chain of steps, operators or (convolution) filters, hence wherein the processing is characterized in that it achieves the effect of a plurality of first unit image process steps, the method comprising the steps of performing sequentially one or a plurality of second image process filtering steps on said input image to generate said output image, wherein at least one of said second image process filtering steps achieves the effect of at least two, three, four, or five up to all (essential) said first image process steps (simultaneously or at once).

Embodiments of the current invention combine multiple convolution steps into a single convolution step by exploiting the property of sequential convolution processes which become once again a combined convolution. When 2 FIR filters are applied sequentially to a signal, the result can be combined into a single FIR filter, regardless of the way the coefficients are calculated. A further innovative step is realized when the combined filter is not just the equivalent of both sequential filters, but when it is altered to enhance the image quality (better image sharpness, reduced aliasing artifacts, reduced ringing artifacts, improved color detail accuracy . . . ), lower the cost parameters (CPU calculations and processing time, DSP power, memory bandwidth and/or density requirements, power dissipation, fewer GPU parallel cores . . . ) or improve performance aspects (data throughput, latency). The quality/performance/cost benefits will be explained further in detail. An example of an image processing chain introduced in accordance with embodiments of the current invention is illustrated in FIG. 3, where the term display can mean any destination. The chroma sub sampling block and horizontal resizing block are integrated in the first processing block while the de-interlacing block and vertical resizing block are combined into the second processing block. Embodiments of the present invention include a practical implementation requiring limited resources that makes it suitable for both software and hardware based real time image processing including implementations in DSP, GPU or FPGA devices.

Obviously single combined filter or the step combination concept behind embodiments of the present invention applied to any system for video processing organized as a chain of steps, operators or (convolution) filters, requires careful selection of the steps to start off, understanding their function and combination properties and the effect on a careful selected combination on the cost parameters under concern. Hence the processing is characterized in that it achieves the effect of a plurality of first unit image process steps, the method comprising the steps of performing sequentially one or a plurality of second image process filtering steps on said input image to generate said output image, whereby one or more of said first unit image process steps are selected for the combination properties and the selection on which one to combine and how is in order to achieve an improvement of a least one of the selected cost parameters.

Recall that de-interlacing is the technique to restore the missing lines and thus the process effectively doubles the line frequency and the corresponding required bandwidth when performed separately. Embodiments of the present invention overcome this issue by combining the de-interlacing process with the resolution mapping step which is usually required as well as the target resolution in most image processing use cases is fixed and somehow determined by the display. The positive effect this integration has on image quality, implementation cost and latency will be explained further in this document. Recall that a high quality image processing chain should preserve as much of the original source detail as possible without introducing artifacts such as aliasing or ringing. It should perform well on still images as well as on moving imagery. The best possible quality one can obtain with the current state of the art processing chains is limited, not by the limited quality of the individual blocks, but rather by the combination of them. Embodiments of the present invention overcome this quality limitation by integrating (not just combining) multiple convolution steps into a single convolution. It will be demonstrated that every digital filter must have an attenuation of the highest frequencies inside an image because of the Nyquist criteria. It will elaborated in detail further why the integrated processing steps can offer higher quality (at lower cost) than the current state of the art processing chains consisting of the separate blocks described.

Recalling the description of the background in video image processing chains to which the invention applies, it is worth nothing that an aspect of the invention is to select the first image process steps in that combinability is ensured, and preferably an optimized version is used as starting basis also. Such selection includes selecting a process step writable as a convolution filter and/or given the 2D character of the (image) data being separable in the two dimensions.

An embodiment of the present invention will now be illustrated by discussing the integration of the 4:2:2 chroma upsampling and sizing but is obviously applicable to all types of (chroma) upsampling and sizing and equivalent type of operators. In accordance with aspects of the present invention, the processing blocks may be integrated into a processor or may be provided in a unit such as a controller.

As chroma upsampling and horizontal resizing are both convolution processes acting in the same domain, as described earlier, they can be combined into a single convolution step, thus eliminating the quality restrictions with conventional image processing chains caused by cascading multiple filtering steps, as discussed further in this document in more detail.

Figure 21:
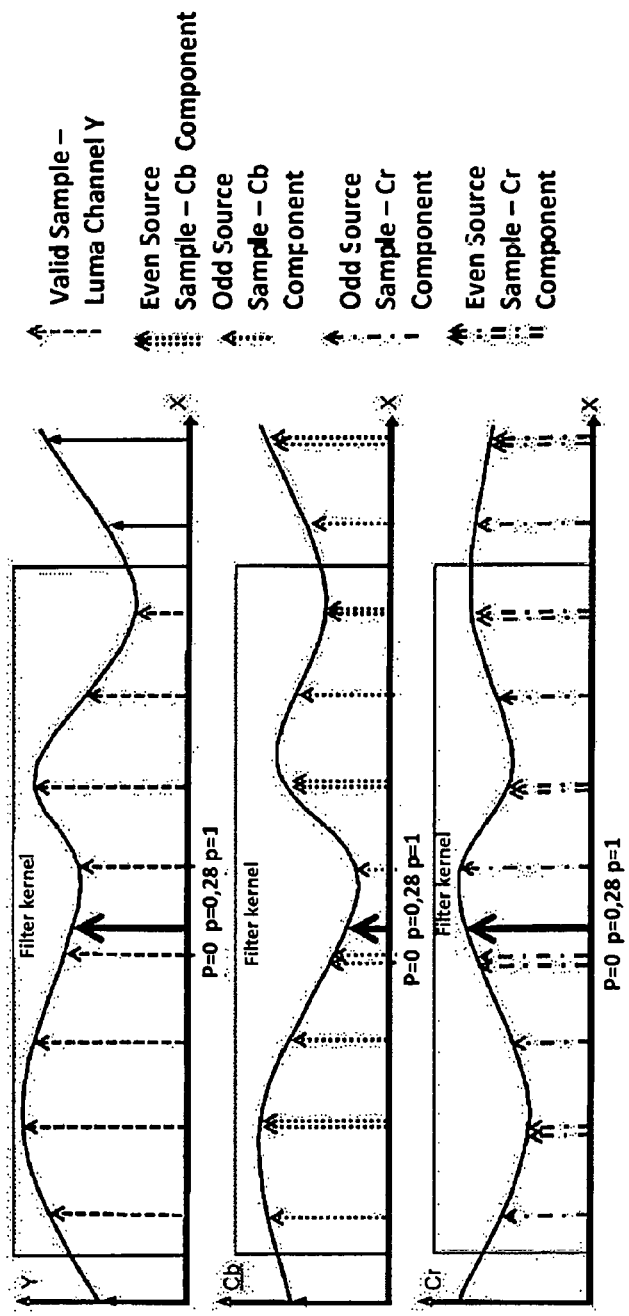
FIG. 21 Combined horizontal pixel resizing and chroma upsampling chart

Two practical embodiments for this integration process are possible. A first approach is illustrated in FIG. 21 for a 4:2:2 chroma sub sampled input.

Figure 22:
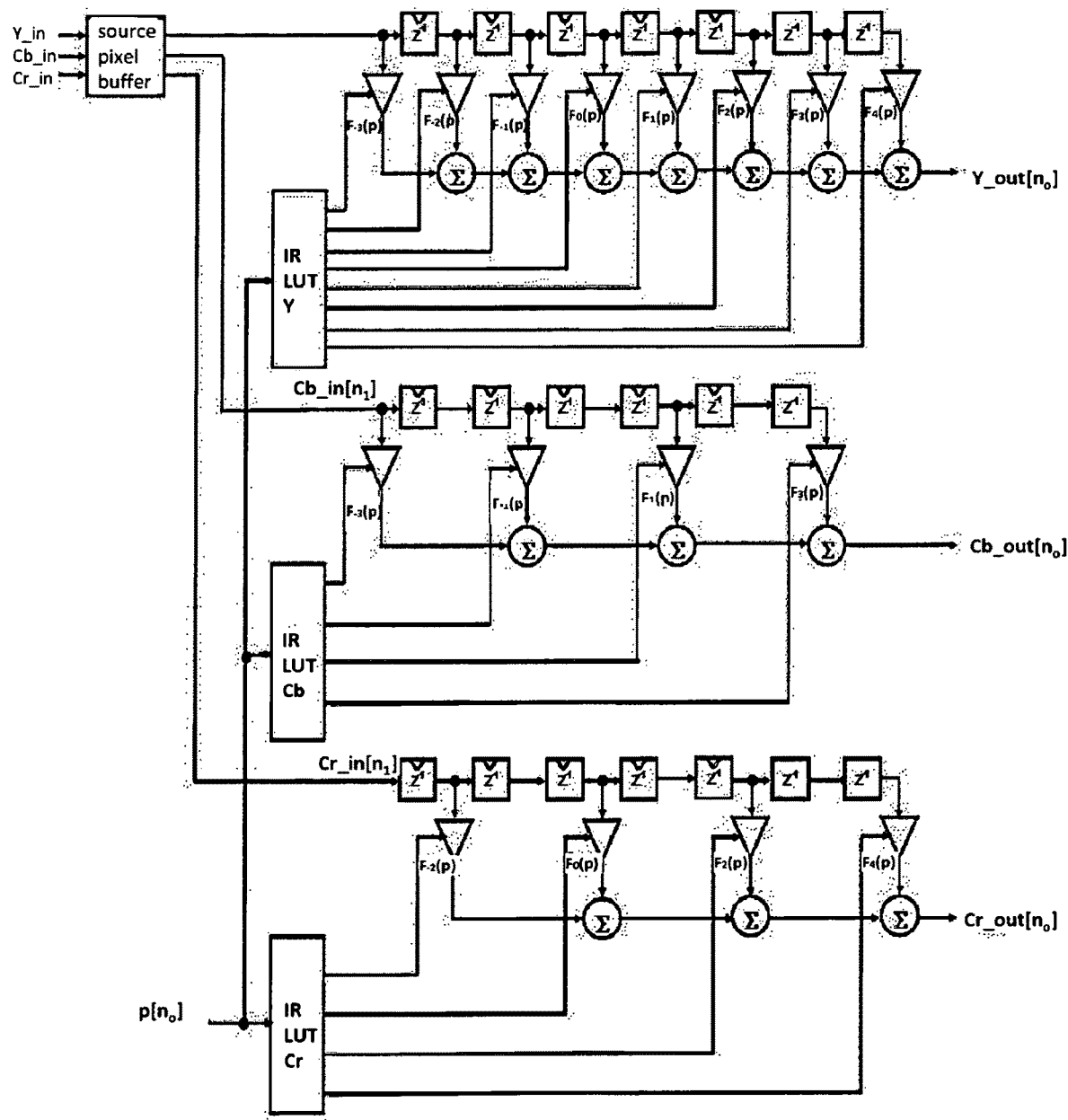
FIG. 22 Combined horizontal pixel resizing and chroma upsampling scheme.

The 3 color components Y, Cb and Cr share the same kernel dimension (8 taps) and sub-pixel positioning per output pixel as indicated by a rectangular box indicating the filter kernel. The luma channel Y is resampled using all 8 valid samples in the kernel, indicated by the dashed line sample positions of the source pixels. For the chroma channels the situation is different as 4 out of the 8 samples within the kernel buffer are invalid. The Cb component must be resampled based on the even source samples, indicated by the double dotted sample magnitude lines, as the odd source samples, indicated by the single dotted sample magnitude lines, are missing. Similarly the Cr component must be resampled based on the odd source samples, indicated by the single dot-dash sample magnitude lines, as the even source samples, indicated by the double dot-dash sample magnitude lines, are missing. The sub pixel positioning (p=0.28), which range is normalized between two successive pixels, is the same for all 3 color components (indicated by a thick solid line at this position). An optimized embodiment for this first approach is illustrated in FIG. 22. Not all 3 source color components are received simultaneously in this scheme. For every source pixel a Y value is received and written into the filter kernel buffer, but the signals Cb and Cr are valid alternately. The buffer in this scheme is organized as a pixel buffer, which means there's a fixed location per pixel, not per sub pixel. Therefore any missing content, which is half of the chroma samples, must be considered as corrupt content in the buffer. The scheme provides 3 convolution filters, one per color component, which use only the known valid sub pixel data. Each of the 3 convolution filters uses a unique set of coefficients, because the combination of valid source pixel positions within the kernel area is unique for each color component.

A second practical embodiment method to combine horizontal resizing and chroma upsampling is illustrated in FIG. 23, again for a 4:2:2 chroma sub-sampled input to clearly illustrate the difference between both methods. Note however, that the proposed methods for combined horizontal resizing and chroma upsampling are not restricted to a specific chroma sub sampling scheme, such as 4:2:2 chroma-sub sampling. It can be used just as well for 4:2:0 or 4:1:0, for instance. Although possible with this method, but no longer necessary, in this illustration the 3 color components Y, Cb and Cr don't share the same kernel dimension, 8 taps for luma versus 4 taps for chroma channels. The 3 components all have different sub pixel positioning per output pixel as indicated by a rectangular box indicating the filter kernel. The luma channel Y is resampled using 8 valid samples in the kernel, indicated by the sample positions of the source pixels in the upper of the three images. For the chroma channels the situation is different as only 4 samples within the kernel buffer cover the same area, although this is not necessary for this approach. The sub pixel positioning is unique for all 3 color components. The Y channel is resampled based on a sub-pixel phase of p=0.28, the same as with the previous approach. However, the Cb component (samples shown in the middle image) is resampled based on a sub pixel phase of p=0.14 as is shown in the middle image of FIG. 23, as the relative position of the destination pixel between the source samples of Cb is different, as illustrated in the figure. The Cr component (samples shown in the lower image of FIG. 23) is resampled based on a sub pixel phase of p=0.64 as shown in the lower of the three images of FIG. 23, according to the unique relative position of the destination pixel between the source samples of the Cr channel.

Figure 23:
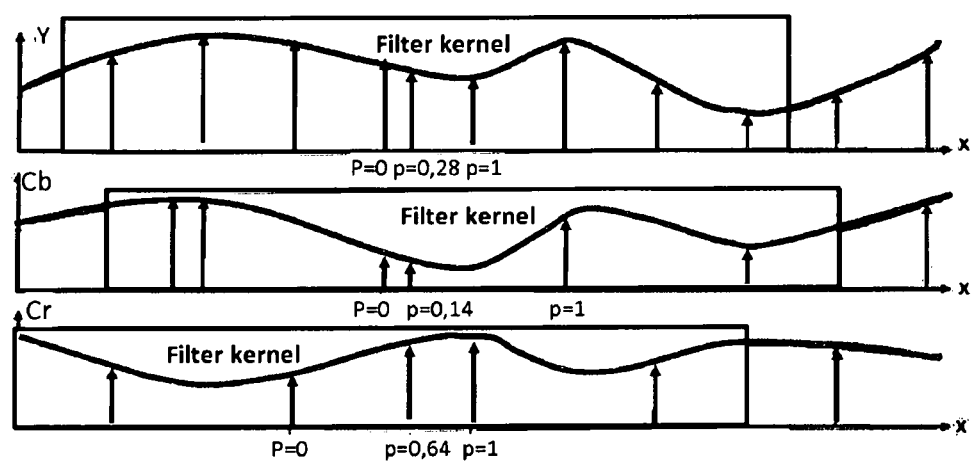
FIG. 23 Combined horizontal sub pixel resizing and chroma upsampling chart.
Figure 24:
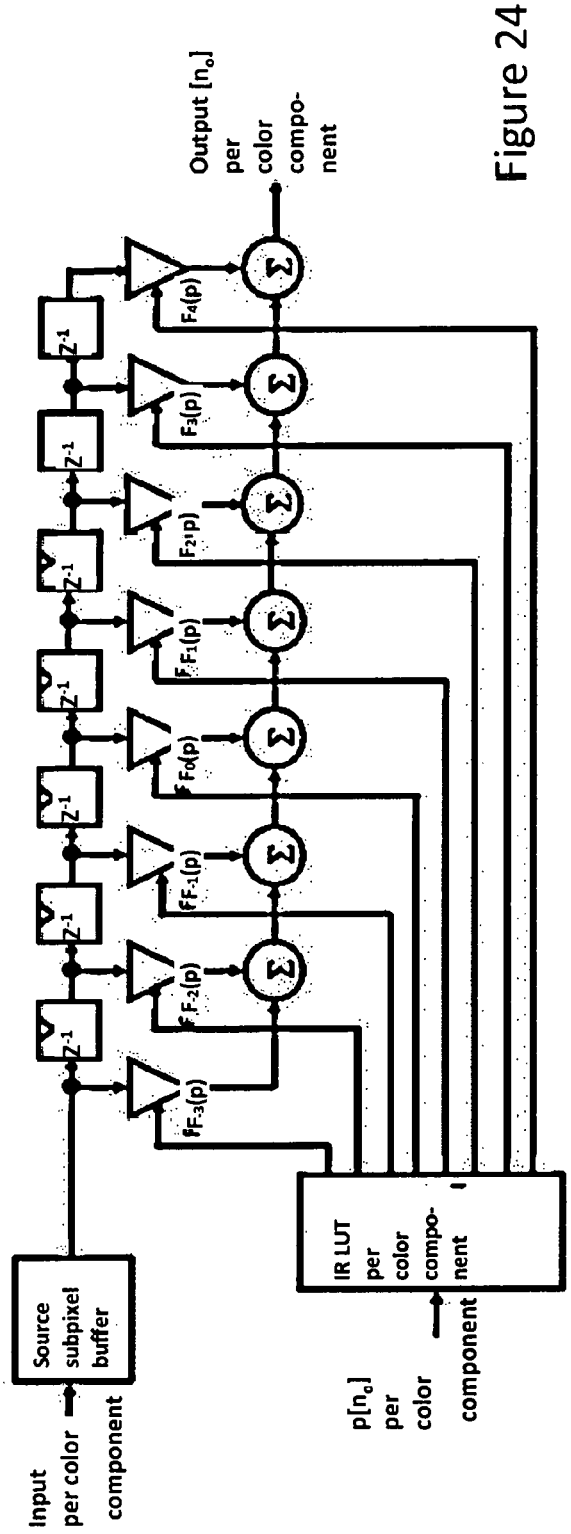
FIG. 24 Combined horizontal sub pixel resizing and chroma upsampling scheme.

A brute force approach embodiment for this second approach is illustrated in FIG. 24. The scheme in FIG. 24 could be further optimized by considering the fact that the sub-pixel positioning phase p for both chroma components always point to different halves of the LUT, in case Cr and Cb components are alternately sampled as illustrated in FIG. 23 before. Note also that the two chroma channel phases are not independent, so they don't require individual look up table access, as the difference between both phases p is always a half, as illustrated in FIG. 23. Furthermore the resizing factor which is required for both chroma channels is the same. The downscaling factor for the luma channel is twice as high as for the chroma channels, thus it requires unique filtering characteristics, such as the required cut off frequency. Both chroma channels require the same filter transfer function, including a common cut off frequency. These two properties can be exploited to eliminate one LUT in the scheme. Either the two chroma channels can share the same LUT, either they each use LUT with halved density. Mathematically these optimization techniques produce the same results, so the details about how the image processing environment affects the preferred implementation method can be considered outside the scope of this document.

Figure 12:
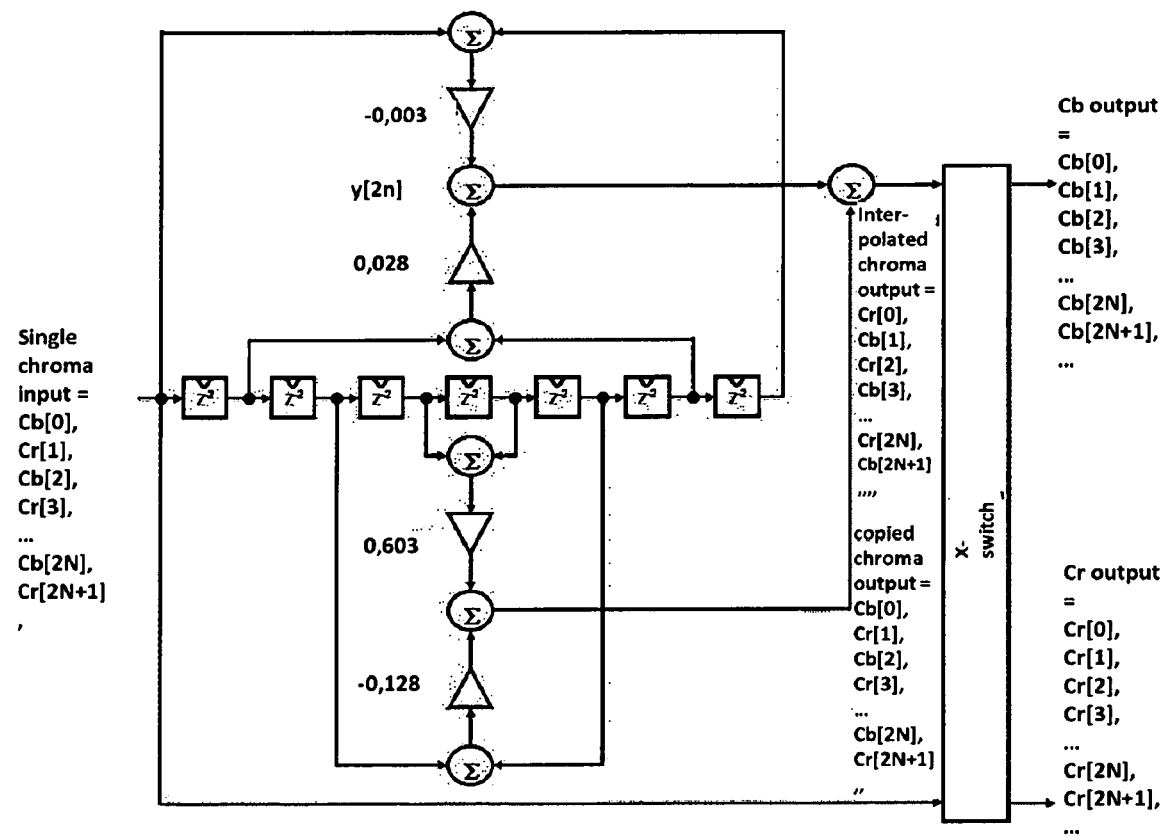
Figure 13:
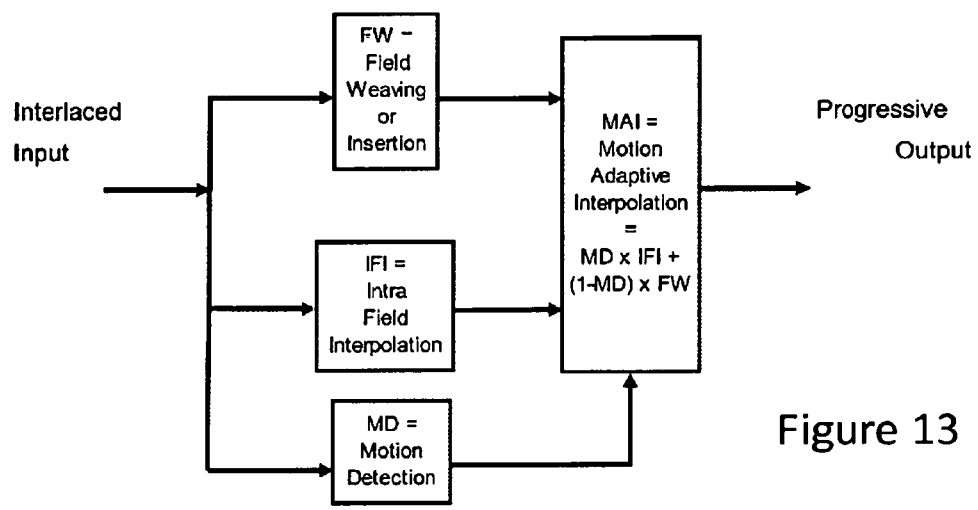
Figure 14:
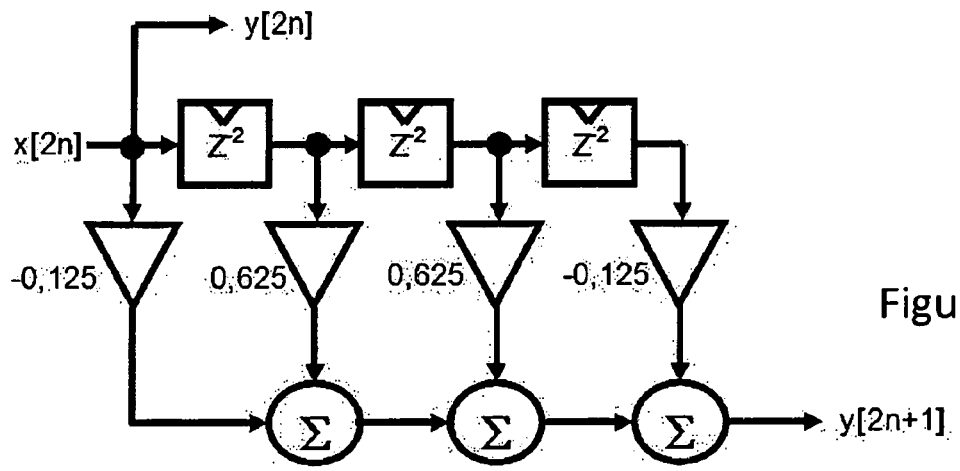
Figure 15:
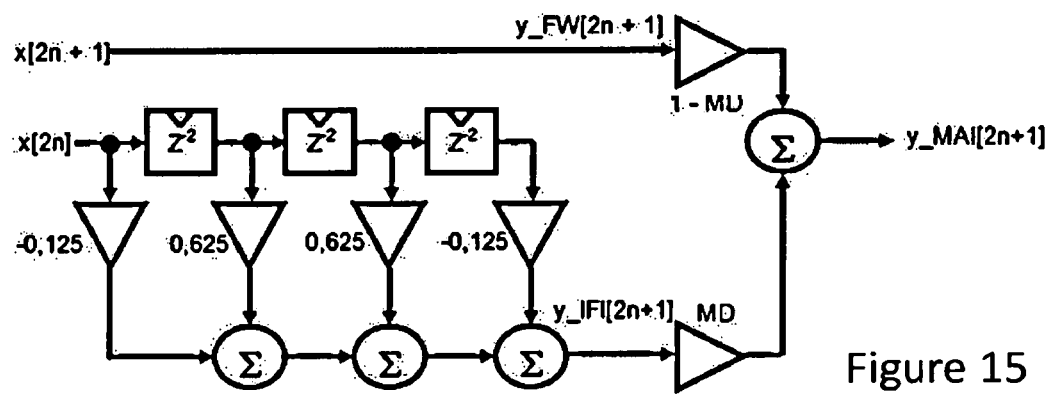
Figure 16:
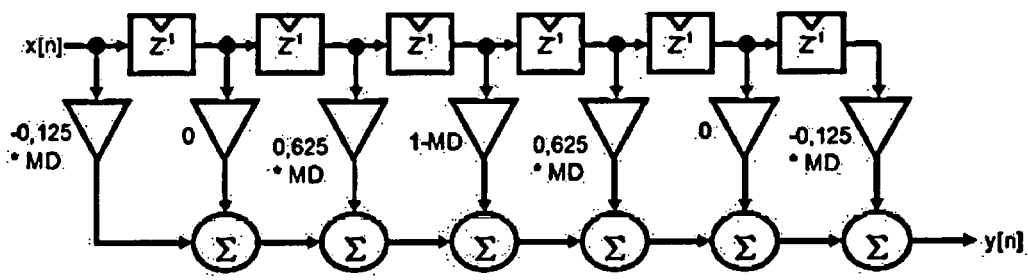
Figure 17:
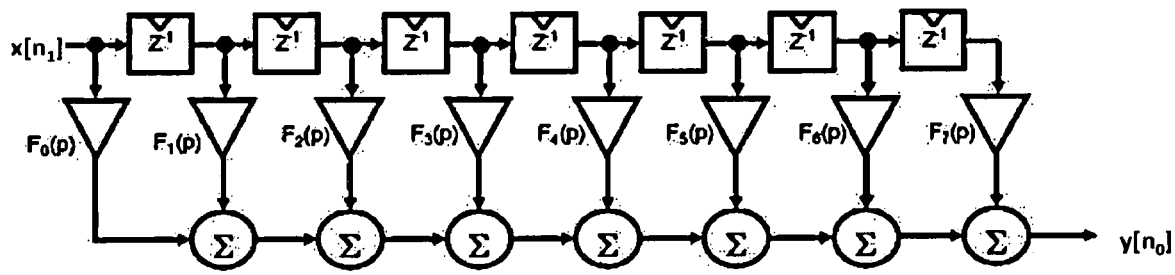
Figure 25:
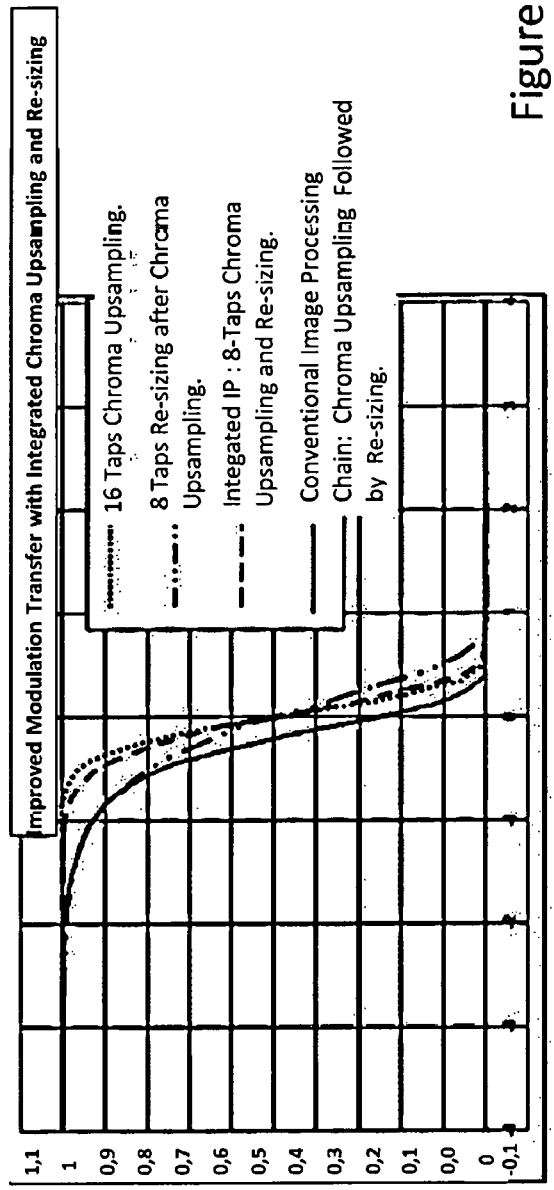
FIG. 25 Quality improvement with integrated horizontal resizing and chroma upsampling.
Figure 26:
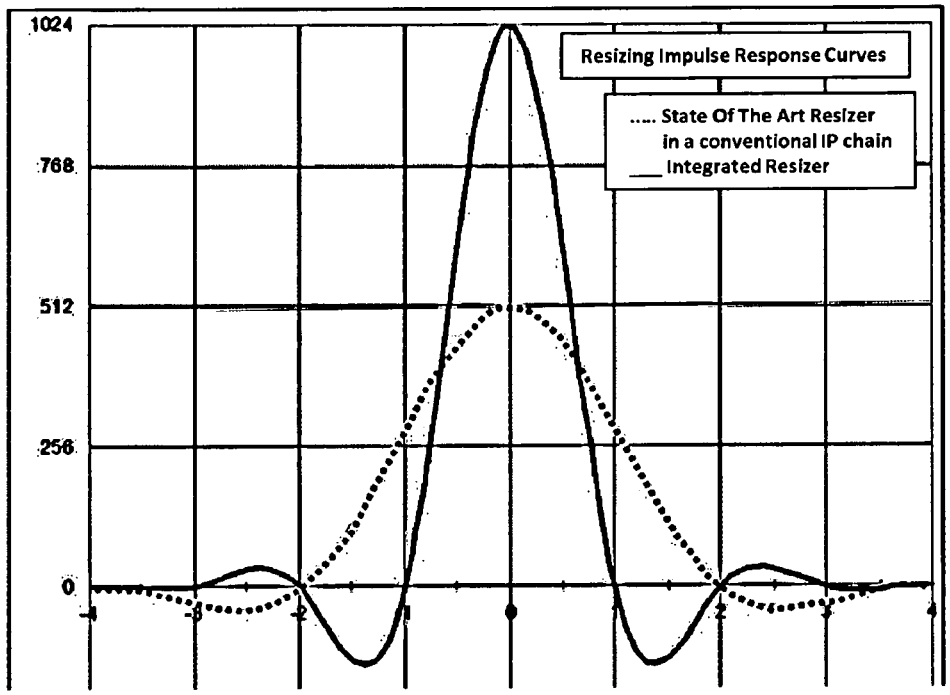
FIG. 26 Horizontal resizing impulse response stretching constraint by a fixed filter kernel, caused by an earlier chroma upsampling process and causing filter quality loss.

Although quality improvements will be discussed further in this document in more detail, it is interesting to see what happens to the overall filtering characteristics and how the current invention enables previously unachievable image quality. FIG. 25 illustrates the quality improvements with embodiments of the current invention for a realistic amount of resources compared with conventional processing (solid line). The chart in FIG. 25 is calculated for a 16-taps Hamming windowed sinc based chroma upsampling combined with an 8-taps multi sinc based resizing. The horizontal axis represents an exponential sweep starting 4 octaves below the Nyquist frequency (Fs/2) and ending 4 octaves above the same desired cut off frequency Fs/2. Note that all filters share the same cut off frequency within this figure. In reality the relation between the different cut off frequency targets depends on the resizing factor, which in its turn depends on the use case. The dotted line indicates the separate sub-optimized chroma upsampling filter response, which is the first part in the conventional image processing chain. This sub-optimized filter manages to preserve image detail fairly well, equivalent to the attenuation in the frequency range below Fs/2 while rejecting fairly well the non-displayable frequencies above Fs/2, keeping the undesirable aliasing artifacts under control. The dash-dot line indicates the separate sub-optimized horizontal pixel resizing polyphase convolution filter response, which is the next part in the conventional image processing chain. This filter does not manage to preserve image detail fairly well, as noticeable by the attenuation in the frequency range below Fs/2 and fails to completely reject the frequencies above Fs/2, failing to keep the undesirable aliasing artifacts under control. In this example the resizing quality was deliberately chosen to be lower than the chroma upsampling quality, as this reflect better the realistic implementations. Remember that the resizing process is performed by a polyphase filter, which requires significantly more resources than a standard FIR filter, as required by the chroma upsampling. Indeed the resizing filter needs to store coefficients for all possible sub pixel positions or phases, while for a chroma upsampling filter this phase is always fixed, and even more: that phase is exactly halfway in between original pixels, which causes a perfect symmetry in the filter's coefficients. This symmetry of static coefficients can be exploited to optimize resources, as illustrated before in FIG. 12. For that reason it is fair to compare a 16-taps standard FIR filter with an 8-taps polyphase FIR filter. For the same reason most state of the art image processing chains implement a chroma upsampling filter with a larger equivalent kernel size compared to the resizing kernel. Although the dash-dot line might seem to cause quality loss by itself, the main quality loss issue with conventional state of the art image processing chains only becomes clear when the chroma upsampling and the resizing process are cascaded, resulting in the solid line. Indeed, while both sub-optimized filters can perform at least reasonable well, the overall quality result is constrained by the cascading process itself, as the solid curve is the multiplied result of the dotted and dash-dot curves. The dashed line indicates the optimized integrated horizontal sub pixel resizing, implemented by the same filter size as was used to construct the dash-dot curve. In this case, using the same filter resources, the filter manages to preserve image detail far better, as can be seen by evaluating the attenuation in the frequency range below Fs/2 while it rejects much better the non-displayable frequencies above Fs/2, reducing the aliasing artifacts. The visibly better quality obtained by the dashed curve compared to the dash-dot curve can be understood when considering the target cut off frequency the resizing filter should deliver. In case a chroma upsampling process is performed on the original data, the source sample rate is doubled. However, when the overall use case is not changed, the required absolute cut off frequency remains unaffected when the incoming sample rate is doubled. However, relative to the incoming sample rate, the required cut off frequency is relatively halved. In order to half the cut off frequency of a filter, its impulse response must be stretched by a factor of 2. In order to preserve a normalized filter response, which leaves DC and other very low frequency components unaffected, the IR amplitude must be halved. This way the time-stretching and amplitude-reduction operation does not alter the integral function of the impulse response. Obviously, this time stretching operation doubles the amount of required filtering taps, in case the impulse response's shape is not altered, when keeping the filtering quality constant. In most practical implementations however, a constant filter kernel size with a fixed number of filtering taps is used. The fixed resizing kernel size can force the need to alter the impulse response when the cut off frequency relative to the new sample rate is changed. This event is illustrated in FIG. 26 for an 8-taps resizing convolution filter, starting from a multi-sinc impulse response. The solid line curve shows the impulse response needed to perform a function reconstruction in case the original sample rate, including chroma sub-sampling, is maintained. The oscillations indicated by the solid line curve are 2 times faster compared to those indicated by the dotted curve. This corresponds to a cut off frequency relatively twice as high compared to the sampling frequency, but as that sampling frequency is not doubled by an earlier chroma upsampling process, the absolute cut off frequency of the system remains unaltered. The dotted curve reflects the stretched impulse response needed to perform a down sampling operation in case the original chroma channel sample rate is doubled by the chroma upsampling process. Not only are the oscillations indicated by the dotted curve 2 times slower compared to those indicated by the solid line curve, but as the filter kernel size is constraint, the amount of oscillations is also reduced by a factor of two. This corresponds to a cut off frequency relatively twice as low compared to the sampling frequency, as desired, but also comes with a filter quality reduction, which is not desired. This phenomenon cannot be avoided in a conventional sub-optimized image processing chain. Even when the state of the art chroma upsampling is performed with extremely high quality, the resizing quality will degrade for a given amount of resources determined by the amount of filter taps and thus the implementation cost. That said, the integrated approach proposed by embodiments of the current invention will always improve image quality, though the amount of quality improvement depends on the processing power implemented to perform the resizing process, the source material and the use case. Embodiments of the current invention allow obtaining higher quality at a lower cost by integrating chroma up sampling and horizontal resizing in a single convolution step.

Figure 27:
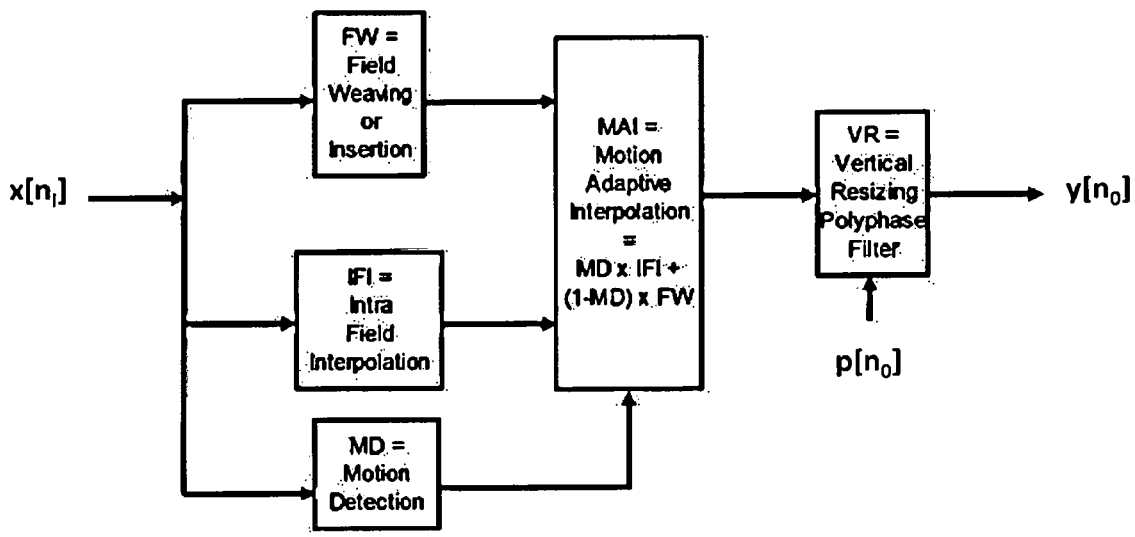
FIG. 27 Deinterlacing followed by (vertical) resizing in a conventional processing chain.
Figure 28:
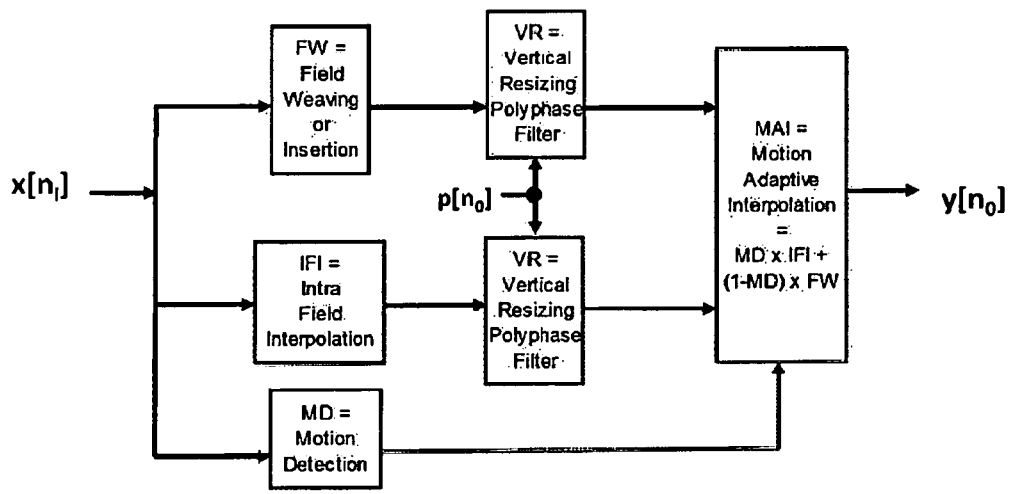
FIG. 28 Interweaved De-interlacing and vertical resizing equivalent to a conventional processing chain.
Figure 29:
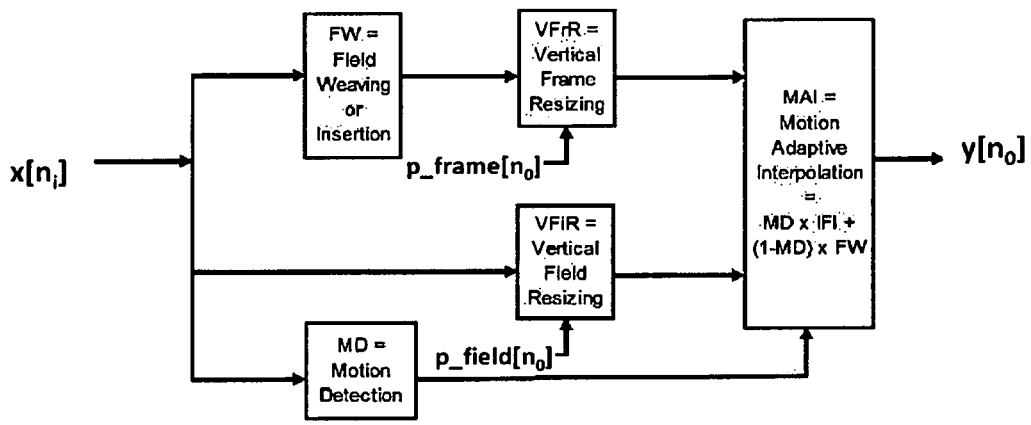
FIG. 29 Integrated de-interlacing and dual vertical resizing basic principal scheme.
Figure 30:
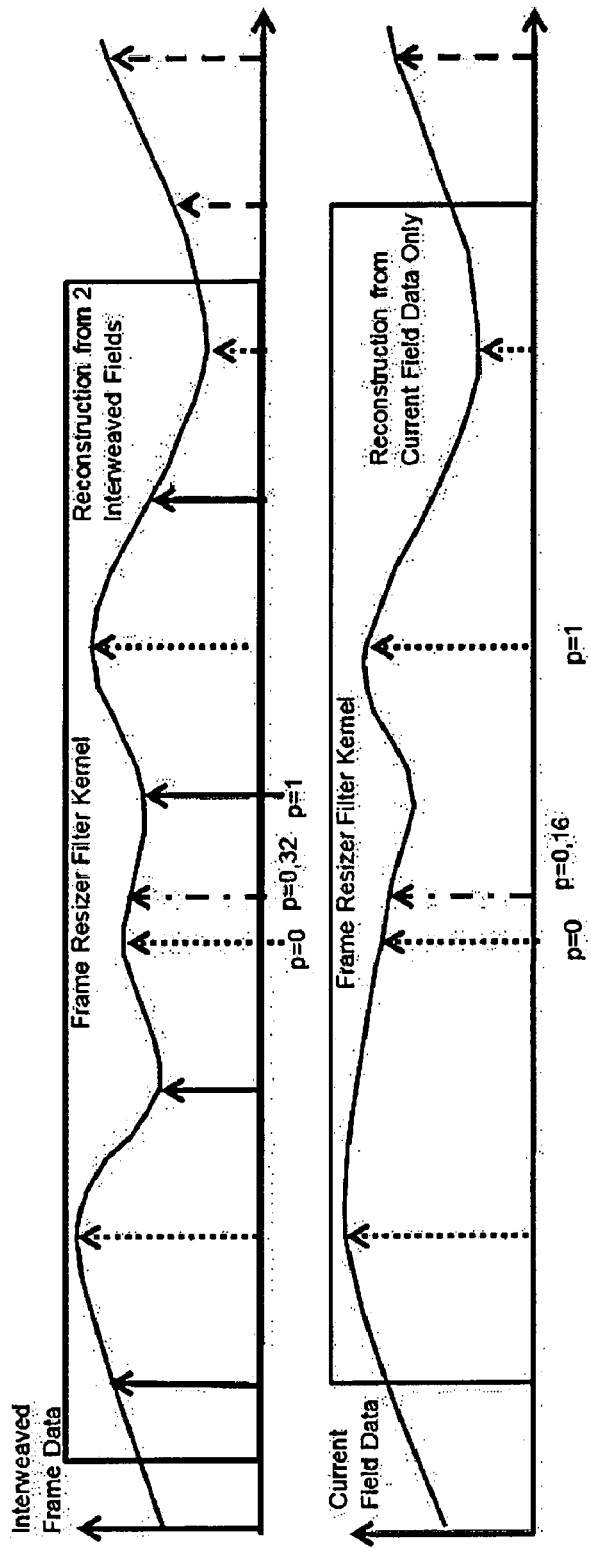
FIG. 30 Interweaved Fields Resizing (top) and Intra-Field Resing (bottom) example.
Figure 31:
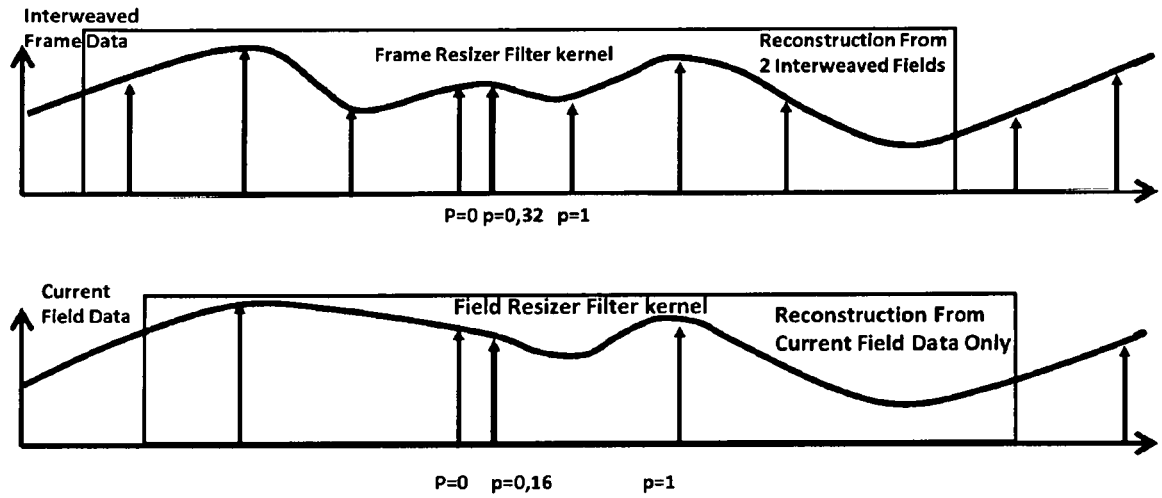
FIG. 31 Interweaved Fields Resizing (left) versus Intra-Field Resing (right) picture.
Figure 32:
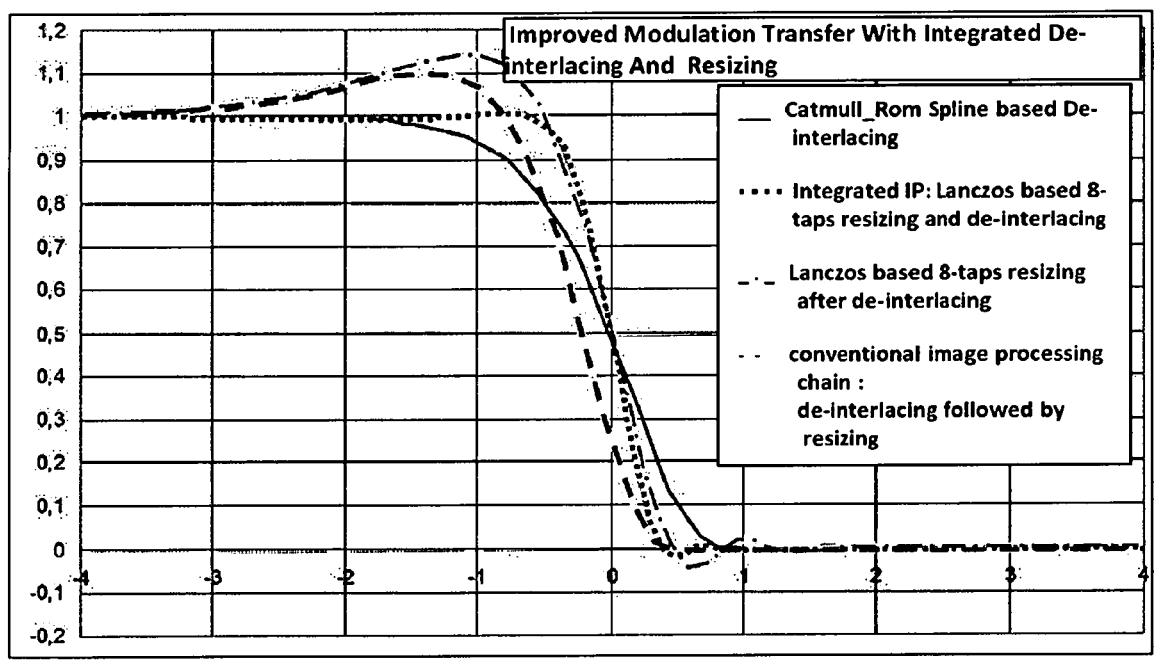
FIG. 32 Quality improvements with integrated vertical resizing and de-interlacing.
Figure 33:
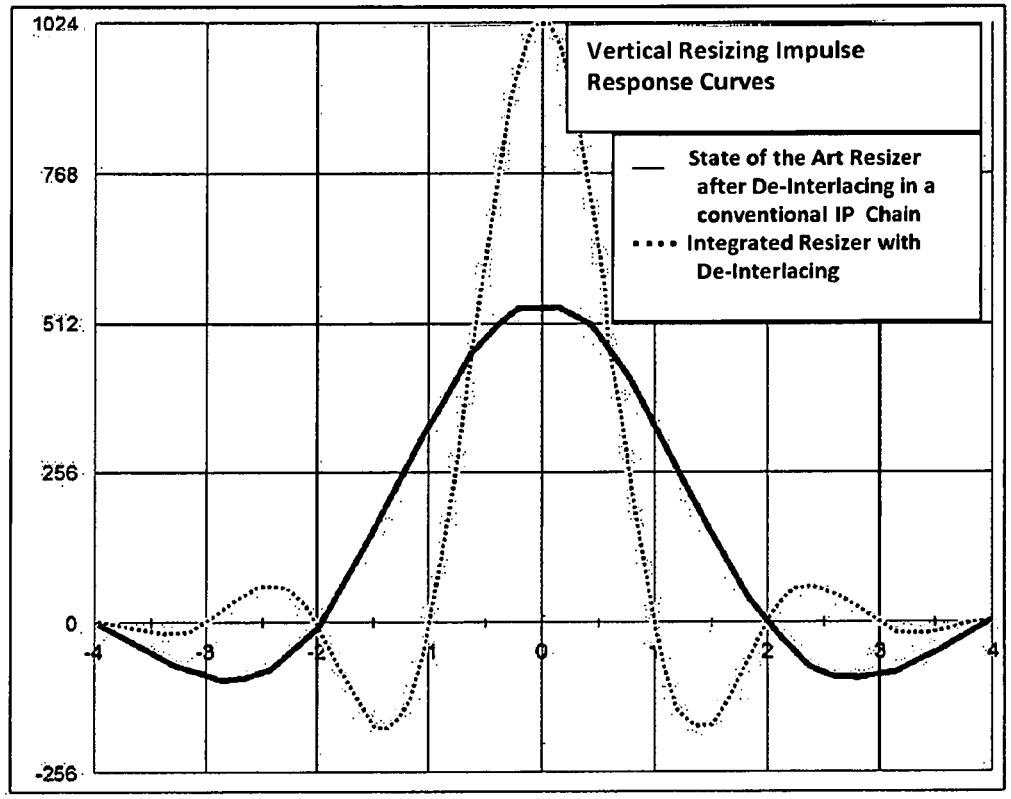
FIG. 33 Vertical resizing impulse response stretching constraint by a fixed filter kernel, caused by an earlier de-interlacing process.

Embodiments of the present invention will now be illustrated for yet another integration of steps, more in particular in an embodiment comprising the integration of de-interlacing and resizing. In accordance with aspects of the present invention, the processing blocks may be integrated into a processor or may be provided in a unit such as a controller. This integration can be combined with one or more of the concepts discussed above. As de-interlacing and vertical resizing are both convolution processes acting in the same domain, as described earlier, they can be combined into a single convolution step, thus once again eliminating the quality restrictions with a conventional image processing chain caused by cascading multiple filtering steps. It will be demonstrated that for moving imagery a similar quality improvement can be realized as was obtained by the integration of chroma up sampling and horizontal resizing, as here also the de-interlacing in a conventional image processing chain doubles the vertical sample frequency or line frequency, causing a resizing filter with fixed dimensions to perform with reduced quality. The block diagram in FIG. 27 illustrates how de-interlacing and (vertical) resizing are cascaded in a conventional state of the art sub-optimized image processing chain. The four blocks on the left of the figure form the de-interlacing functionality while the block on the far right of the figure represents the vertical resizing filter. Multiple practical embodiments for the integration process of de-interlacing and vertical resizing are possible, although within the scope of this document, we will not discuss the most elaborated cases in detail. Those implementations can contain adaptive diagonal filtering and advanced adaptive temporal selection of data extracted from the past or even the future, which causes the de-interlacing feature to have one or several fields of latency. A first step to explain the integration process of de-interlacing and vertical resizing is illustrated in FIG. 28. As all filtering blocks (FW, IFI, MAI and VR) between the input signal x and the output signal y are linear convolutions, changing their cascading does not change the result. FIGS. 27 and 28 will produce the same result. FIG. 28 now shows a direct cascade of the intra field interpolation filter (IFI) and the bottom vertical polyphase filter (VR). In the above described scheme both resizer blocks perform the same function, but they both deal process different input data. The top located VR block processes an input frame which is constructed from at least 2 successive fields of data, in the simplest case the current and the previous video field. Assume the resizer would be implemented as a 10-taps polyphase filter, then 5 input lines would come from the current field and 5 are inserted from the previous field. Obviously the result calculated by the top located vertical resizer block has a valid high quality when the image is not moving. In case of still video the quality of the upper VR block is optimal. The bottom located VR block processes an input frame which is reconstructed from a single field by an upsampling filter, similar to the chroma upsampling block. The only difference here is that the filter taps represent the vertical dimension instead of the horizontal dimension, thus the IFI block requires video line memories, not just registers. Assume again that the resizer would be implemented as a 10-taps polyphase filter, then 5 input lines would be original source lines while the other 5 are reconstructed by an intra-field filtering process. The result calculated by the bottom located vertical resizer block has a reasonable quality when the image is moving. Unfortunately the IFI block doubles the vertical sampling frequency which forces the relative vertical resizing filter cut off frequency to be halved. Due the earlier explained IR stretching process, as illustrated in FIG. 26, the resizing quality for the same resources is reduced. FIG. 29 demonstrates how the intra-field interpolation block, required to perform motion adaptive de-interlacing, has been absorbed by the vertical resizing polyphase convolution block. Note that the two parallel resizing blocks have different sub line positioning phase signals (p), as the distance between the intra field lines is twice the distance between the interweaved lines per frame, while the absolute positioning output line remains the same. That said, both resizing blocks need individual look up tables to store different sets of coefficients as the relative downscaling factors are different, but also the addressing of the LUT is different because of the different phase signals (p). The slightly shifted filter kernels of frame resizing and field resizing are illustrated in FIG. 30. The dotted line sample magnitude markers represent the lines in the currently evaluated field, which are used by the bottom resizer in FIG. 29. In the basic motion adaptive case, the solid line sample magnitude markers represent the lines in the previously evaluated field, which are inserted in between the currently evaluated field, after which the combination is used by the top resizer in FIG. 29. The dash-dot magnitude marker represents the calculated output sample corresponding to the currently calculated destination line position. Obviously, the continuous black envelope line at the top in the upper image which illustrates the reconstruction from 2 interweaved fields is not the same as the continuous black envelope line in the lower image which illustrates the reconstruction from a single field of video data, as they are both extracted from different sets of video data. As can be seen in the Figure, fine vertical details can be lost with intra-field resampling techniques. On the other hand, for static imagery the frame resizing process in the upper image optimal as the convolution filter uses all available relevant data. This is why motion adaptive reconstruction techniques are required, as sometimes the frame reconstruction is desirable and sometimes intra-field convolution filtering provides the best image quality. The different behaviour and the corresponding different artifacts of frame based and intra-field based convolution filtering is illustrated in FIG. 31. Note that the left image shows more detail, but also displays severe jaggedness, while the right image appears more blurred, but without the jaggy artifacts. Similar to the horizontal convolution filtering integration, we can see what happens to the overall filtering characteristics and how embodiments of the current invention improve image quality. FIG. 32 illustrates the quality improvements which are possible with the current invention using a realistic amount of resources. The chart is calculated for a Catmull-Rom spline based de-interlacing combined with an 8-taps Lanczos based resizing. The sample frequency Fs corresponds to the line pace. The horizontal axis represents an exponential sweep starting 4 octaves below the vertical Nyquist frequency (Fs/2) and ending 4 octaves above the same desired cut off frequency Fs/2. Note also that all filters share the same cut off frequency within this figure, although in reality the relation between the different cut off line frequencies depends on the vertical resizing factor. The solid line indicates the separate sub-optimized de-interlacing upsampling reconstruction filter response using a Catmull-Rom spline reconstruction technique. This is the first vertically processing part in the conventional image processing chain. This sub-optimized reconstruction filter manages to preserve image intra-field detail fairly well, equivalent to the attenuation in the frequency range below Fs/2 while rejecting fairly well the non-displayable frequencies above Fs/2, keeping the undesirable aliasing artifacts under control, as far as possible based on a single field of video data. The dash-dot line indicates the separate sub-optimized vertical resizing polyphase convolution filter response, which is the next part in the conventional image processing chain. This filter does not really manage to preserve most image detail, as noticeable by the attenuation in the frequency range below Fs/2 and fails to decently reject the frequencies above Fs/2, failing to keep the undesirable aliasing artifacts under control. The reduced resizing quality causes moving images to show more artifacts and to be blurred more than achievable with the current invention. In this processing chain example the resizing quality was deliberately chosen to comparable to the de-interlacing quality, as this reflect better the realistic implementations. Remember that both the vertical resizing process and the de-interlacing perform vertical filtering, which is often implemented using line buffering. In most cases the lines required by the convolution filter are stored in the internal cache or internal block ram features inside the processing device, such as a GPU or an FPGA. This makes the typical cost efficiency comparable of both processes, although the vertical resizing process is performed by a polyphase filter, which requires more resources than a standard FIR filter, as required by the de-interlacing. The vertical resizing filter needs to store coefficients for all possible sub line positions or phases, while for a de-interlacing filter this phase is always fixed halfway in between the decimated original lines in the current field. This causes a perfect symmetry in the static filter's coefficients, which can be exploited to optimize DSP resources, but which does not reduce the amount of required line buffers. In most systems the implementation cost is driven by the density of the addressable bandwidth required by the filter kernel. For that reason FIG. 32 provides a realistic and fair comparison. As many systems focus on image quality only when pictures are enlarged, rather than optimizing the quality of compressed imagery, most state of the art image processing chains implement a de-interlacing filter with a smaller equivalent kernel size compared to the vertical resizing kernel. This choice is also motivated by the fact that a de-interlacing filter should always have the highest possible cut off frequency, which is half the sample frequency. A small convolution filter kernel can indeed provide decent quality for high cut off frequencies, whereas lowering the cut off frequency would degrade the filter quality achievable by a small fixed filter kernel. Note that depending on the use cases, the vertical resizing might need to perform a much lower relative cut off frequency, which is why in many cases the kernel size is chosen larger than the de-interlacing filter kernel size. Here again, the dash-dot line might seem to cause quality loss by itself but the main quality loss issue with the conventional state of the art image processing chain only becomes visible when the de-interlacing and the vertical resizing process are cascaded, resulting in the dashed line. While both sub-optimized filters perform at least reasonably well, the overall image quality result is again constraint by the cascading process itself of the vertical processing blocks, as the dashed curve is the multiplied result of the solid and dash-dot curves. The dotted line indicates the globally optimized integrated vertical field resizing, implemented by the same filter size as was used to construct the dash-dot curve. In this case, using the same filter resources, the filter manages to preserve image detail far more naturally, without the artificial emphasis in certain frequency bands. This can be seen by evaluating the attenuation in the frequency range below Fs/2. The integrated filter also rejects much better the non-displayable frequencies above Fs/2, reducing the aliasing artifacts. The dash-dot curve indeed shows some undesirable oscillations in the stop band, causing aliasing artifacts. While the quality metrics will be explained further in detail, the better quality obtained by the dotted curve compared to the dash-dot curve is already clearly visible, without mathematical interpretation. Similar to the horizontal processing integration, this can be understood when considering the target cut off frequency the vertical field resizing filter should deliver. In case a de-interlacing is performed on the original field data, the vertical line rate is doubled. When the use case is not changed, the required absolute cut off line frequency remains unaffected when the incoming line frequency is doubled. Relative to this incoming sample rate, the required vertical cut off frequency is relatively halved, which means the vertical resizing impulse response must be stretched by a factor of 2 in time and IR amplitude must be halved. This process is similar to what happened in the horizontal dimension. The IR modulation is illustrated in FIG. 33 for an 8-taps Lanczos based vertical resizing convolution filter. The dotted curve shows the impulse response needed to perform a function reconstruction in case the original sample rate, including line sub sampling per field, is maintained. The oscillations indicated by the dotted curve are 2 times faster compared to those indicated by the solid line curve. This corresponds to a vertical cut off line frequency relatively twice as high compared to the sampling frequency, but as that sampling frequency is not doubled by an earlier de-interlacing process, the absolute cut off frequency of the system remains unaltered. The solid line curve reflects the stretched vertical impulse response needed to perform a down sampling operation in case the original field lines data is doubled by the de-interlacing process. Similar to what happened in the horizontal domain, the oscillations indicated by the solid line curve are 2 times slower compared to those indicated by the dotted curve and, as the filter kernel size is constraint, the amount of oscillations is also reduced by a factor of two. This corresponds to a vertical cut off line frequency relatively twice as low compared to the vertical sampling frequency but reduces the filter quality. This vertical detail quality reduction is unavoidable with a conventional sub-optimized image processing chain. Even when a state of the art de-interlacing is performed with extremely high filtering quality, the vertical resizing quality will degrade for a given fixed amount of resources which is determined by the amount of filter taps. The line buffers feeding these filter taps greatly contribute to the implementation cost. Here again, the integrated approach proposed by current invention will always improve image quality, though the amount of quality improvement depends on the processing power implemented to perform the resizing process, the source material and the use case. Embodiments of the current invention allow obtaining higher quality at a lower cost by integrating de-interlacing and vertical resizing in a single convolution step in case of moving imagery. Note that the accuracy of the motion detection system will also impact the eventual image quality. In cases where both resizing convolutions would produce an ideal image the importance of a good motion detector is reduced, so while the current invention greatly enhances the image quality when performing field resizing, it further reduces the technical requirements and complexity of the motion detection block. Nevertheless preferably a good motion detector is used which does not "hesitate" too often between motion and a still state.

Figure 34:
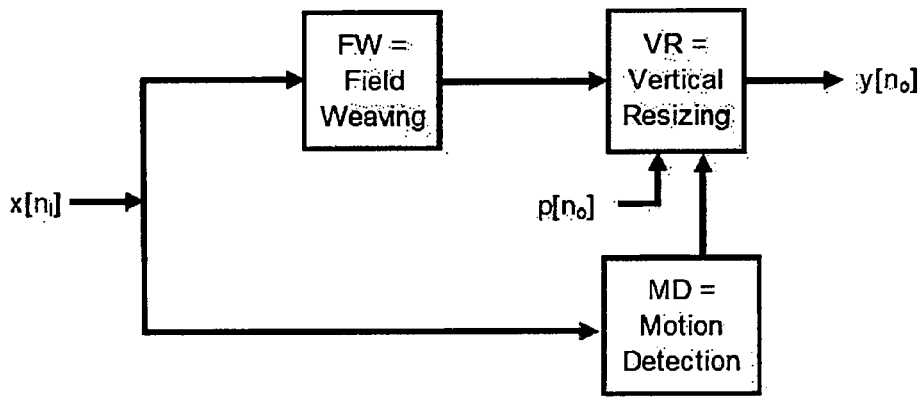
FIG. 34 Integrated De-interlacing and single vertical resizing optimized block scheme.
Figure 35:
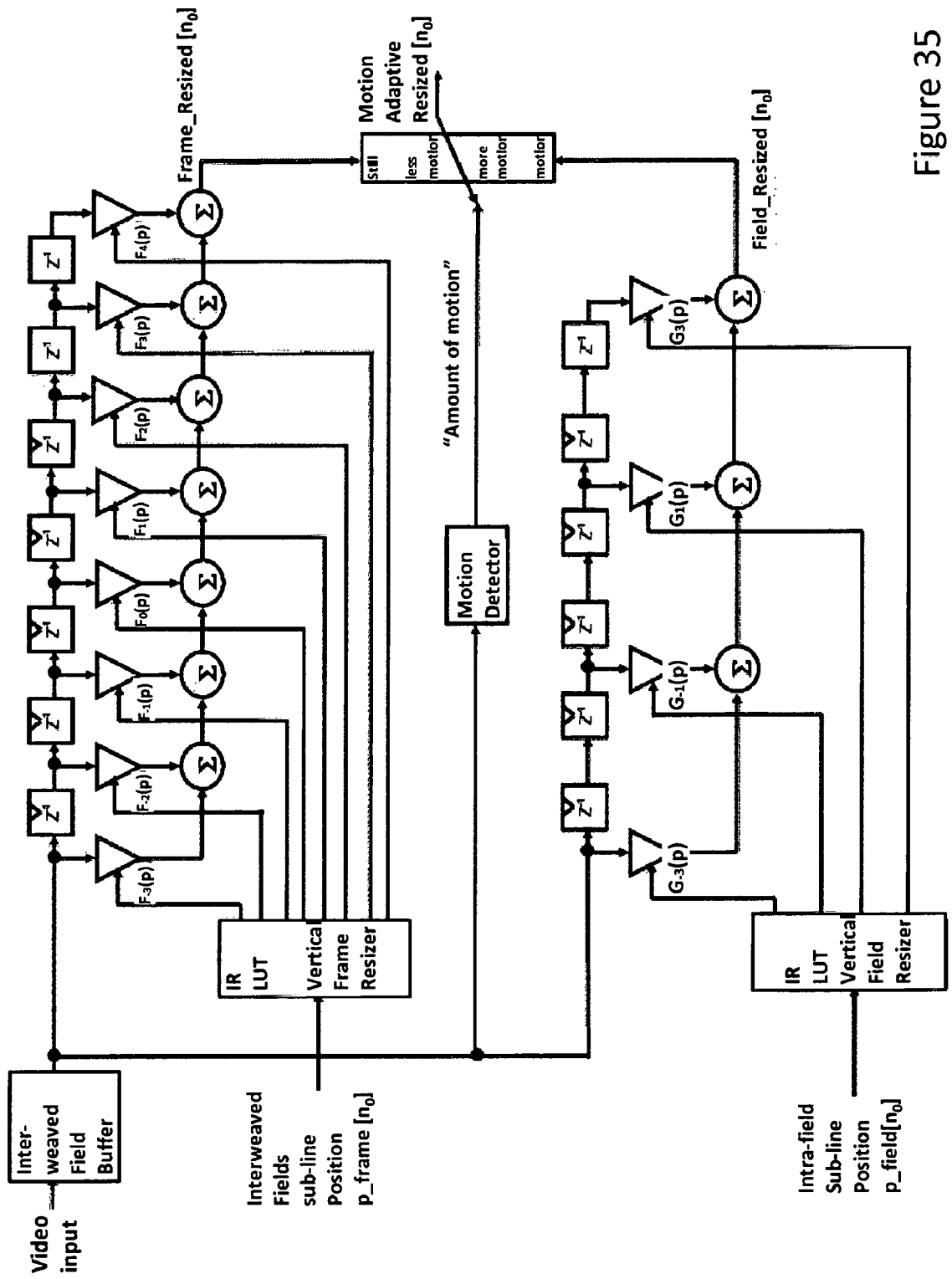
FIG. 35 Integrated de-interlacing with dual vertical resizing detailed scheme.

So far, we have discussed the quality improvement based on a non-optimized implementation with 2 parallel resizing blocks. Although mathematically this analysis is correct, it does not reflect yet the DSP power and cost efficiency. An even more optimized implementation is possible using a single, but modulated, resizing convolution filter as shown in FIG. 34. An optimized implementation of integrated de-interlacing and vertical resizing uses a single convolution filter, which is modulated by the motion detector. How this can be achieved is explained using a step by step approach, starting from a detailed functional diagram as in FIG. 35. The scheme in FIG. 35 contains 2 separated convolution filters. The upper one weights all video lines within the inter-weaved field buffer, while the bottom one processes the lines corresponding to the currently processed field only. Both filter outputs feed the final linear interpolation block, represented like a potentiometer, which is modulated by the motion detector. A number of optimizations are possible when evaluating this schematic. Once the intra-field sub line positioning is known, then also the inter weaved field sub line phase is determined within the frame. As a consequence, the addressing of the two look up tables, which contain the line weights as function of the target line phase, are not independent. Therefore, the two LUTs can be implemented as a single LUT delivering all coefficients. Obviously the data set of coefficients F for the upper frame filter remains different from the data set of coefficients G required by the lower intra-field filter. A second optimization can be found by observing the fact that only linear operators are applied to the video data within the parallel video data paths. The motion adaptively resized video output O(p) can be written for a given phase as a function of the input i by using the Z-transform (where $Z^{-1}$ represent a line delay) by the following set of equations:

$$O(p)=FrR(p)*(1-m)+FiR(p)*m$$

Where FrR is the frame resizer output, Fir is the field resizer output, m the motion detector output $$FrR(p)=F_{-3}(p)*i*Z^3+F_{-2}(p)*i*Z^2+F_{-1}(p)*i*Z+F_0(p)*I+F(p)*i*Z^{-1}+F_2(p)*i*Z^{-2}+F_3(p)*i*Z^{-3}+F_4(p)*i*Z^{-4}$$

$$FiR(p)=G_{-3}(p)*i*Z^3+G_{-1}(p)*i*Z+G_1(p)*i*Z^{-1}+G_3(p)*i*Z^{-3}+F_4(p)*i*Z^{-4}$$

Note that $G_{-2}$, $G_0$, $G_2$ and $G_4$ are all equal to zero.

Eq. 16 Equation for integrated de-interlacing with parallel vertical resizing

Equation 16 illustrates how the motion detector output m can possible control the interpolation process between frame based and field based convolution. This set of equations can be written more optimally by rearranging the linear terms as follows in equation 17:

$$O(p)=[F_{-3}(p)*(1-m)+G_{-3}(p)*m]*i*Z^3+[F_{-2}(p)*(1-m)+G_{-2}(p)*m]*i*Z^2+[F_{-1}(p)*(1-m)+G_{-1}(p)*m]*i*Z+[F_0(p)*(1-m)+G_0(p)*m]*i*Z^0+[F_1(p)*(1-m)+G_1(p)*m]*i*Z^{-1}+[F_2(p)*(1-m)+G_2(p)*m]*i*Z^{-2}+[F_3(p)*(1-m)+G_3(p)*m]*i*Z^{-3}+[F_4(p)*(1-m)+G_4(p)*m]*i*Z^{-4}$$

Eq. 17 Equivalent equation for Integrated de-interlacing and vertical resizing

We can now define a combined line weight function W(p,m) based on the sub line positioning phase and the amount of motion m for the convolution process as illustrated in equation 18 per interweaved source line L corresponding to the lines in the polyphase filter kernel:

$$W_{-L}(p,m)=F_{-L}(p)*(1-m)+G_{-L}(p)*m$$

Eq. 18 Motion adaptive convolution filter weight calculation for vertical resizing Substituting equation 18 for all source lines in equation 17 produces the result in equation 8.

$$O(p,m)=W_{-3}(p,m)*i*Z^3+W_{-2}(p,m)*i*Z^2+W_{-1}(p,m)*i*Z+W_0(p,m)*i+\ldots+W_3(p,m)*i*Z^{-3}+W_4(p,m)*i*Z^{-4}$$

Eq. 8 Optimized motion adaptive single convolution filter for vertical resizing

Figure 36:
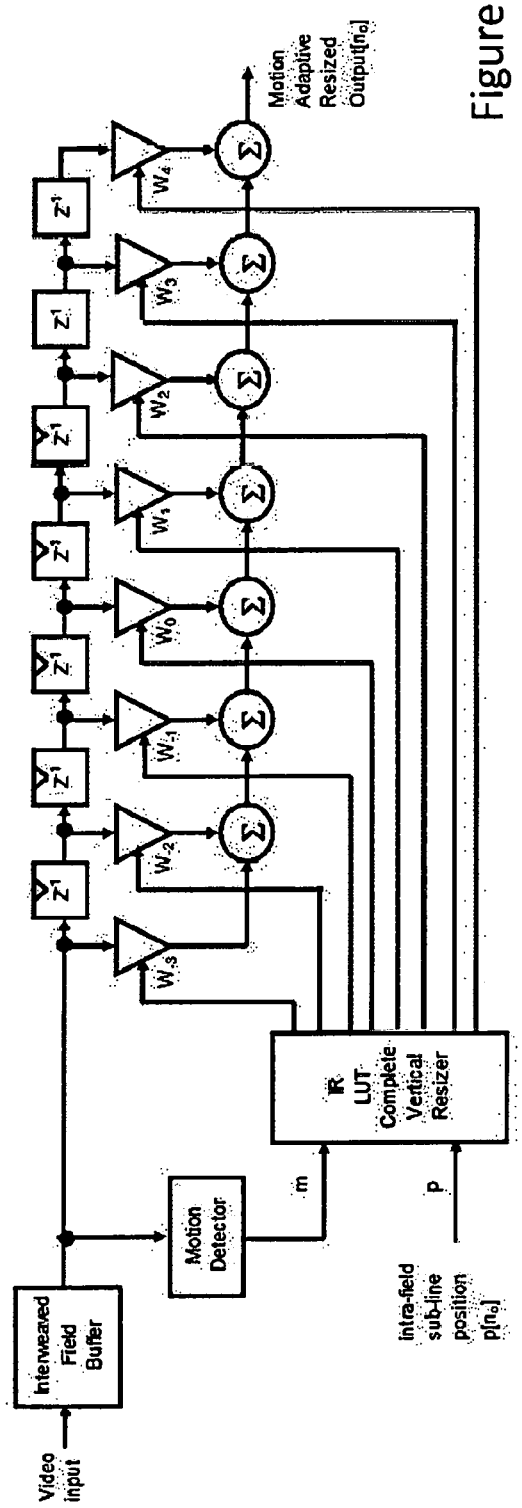
FIG. 36 Optimized integrated de-interlacing and vertical resizing detailed scheme.

The source line weights W(p,m) are represented as a two-dimensional function, which can be considered as an extension of the basic linear interpolation principle. In practice the two-dimensional LUT can be implemented using piece wise linear interpolation in both dimensions. Note that one can choose to store only 2 coefficients in de motion dimension m, which corresponds again to the schematic in FIG. 35. This means the detailed schematic in FIG. 36 is not just a resource optimization, but a superset of the original possibilities we optimized. The intra-field sub line position (p) is the same for all color components in case of a 4:4:4 or 4:2:2 chroma sub sampled video source. The motion value (m) obtained by the motion detector should be shared by all color components as well. It doesn't make sense to indicate that only the blue channel is moving, for instance. As the values m and p are in common for all color components, so are the derived LUT addresses. That automatically means the entire LUT functions can be shared, including the memory resources and the DSP power to perform (multi-dimensional) piece wise (linear) interpolations. This explains the resource optimizations steps performed from equations 16 to 18, as all the processing power within the video path, which is tripled in color systems, is reduced to an absolute minimum: a single convolution filter.

Figure 37:
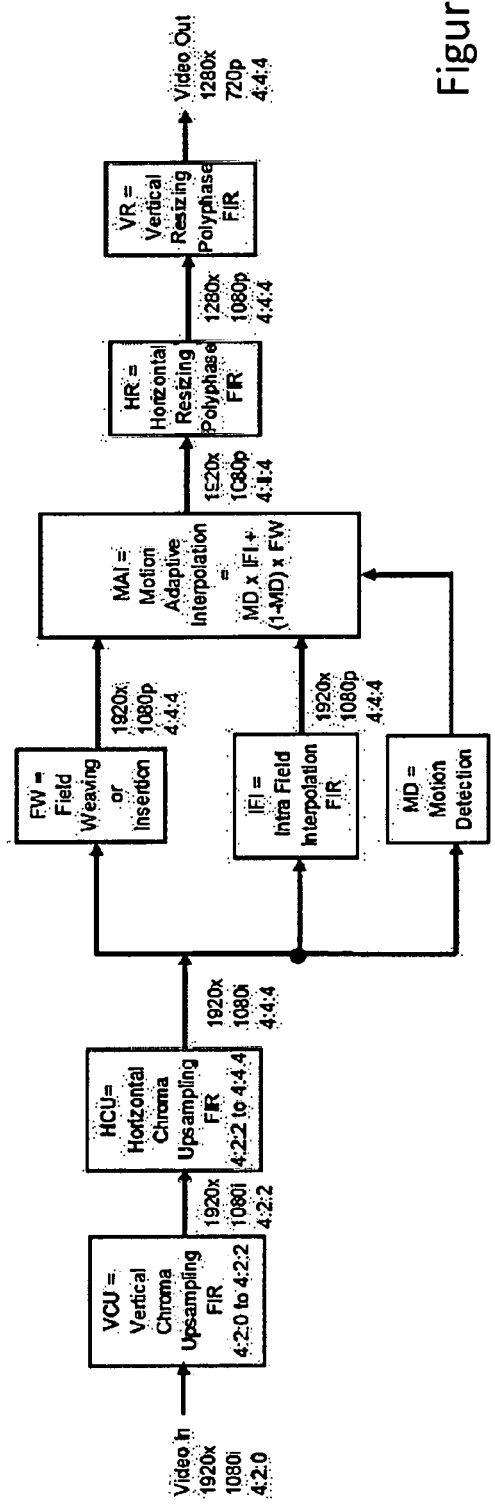
FIG. 37 A typical state of the art processing chain performing chroma up sampling, motion adaptive de-interlacing and resizing.
Figure 38:
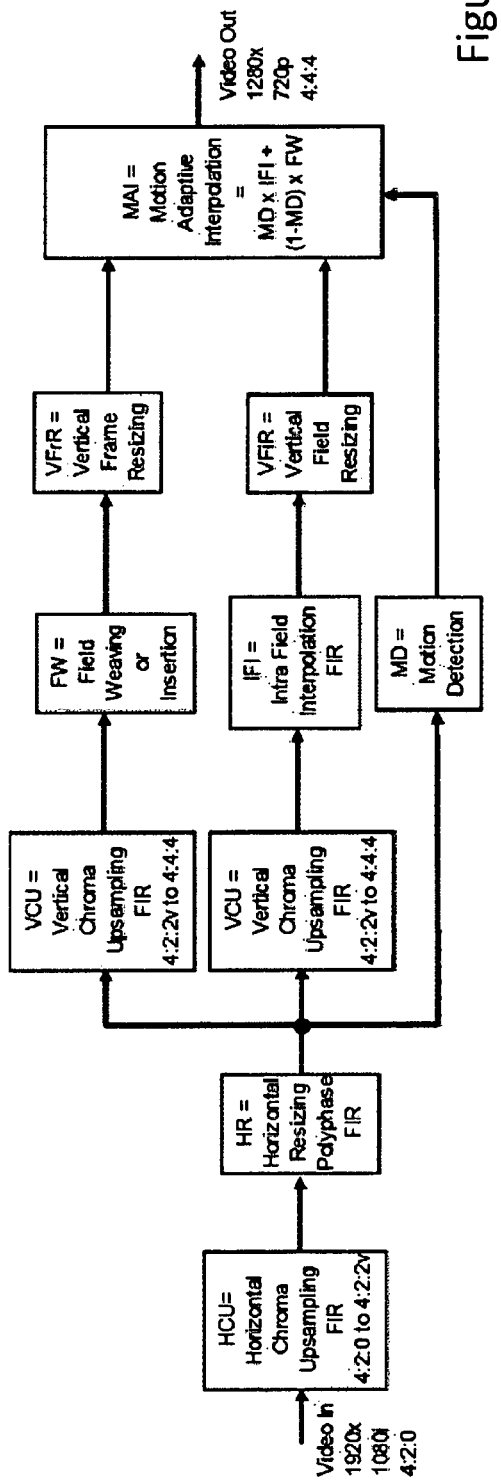
FIG. 38 Equivalent of a typical state of the art processing chain performing chroma up sampling, motion adaptive de-interlacing and resizing.
Figure 39:
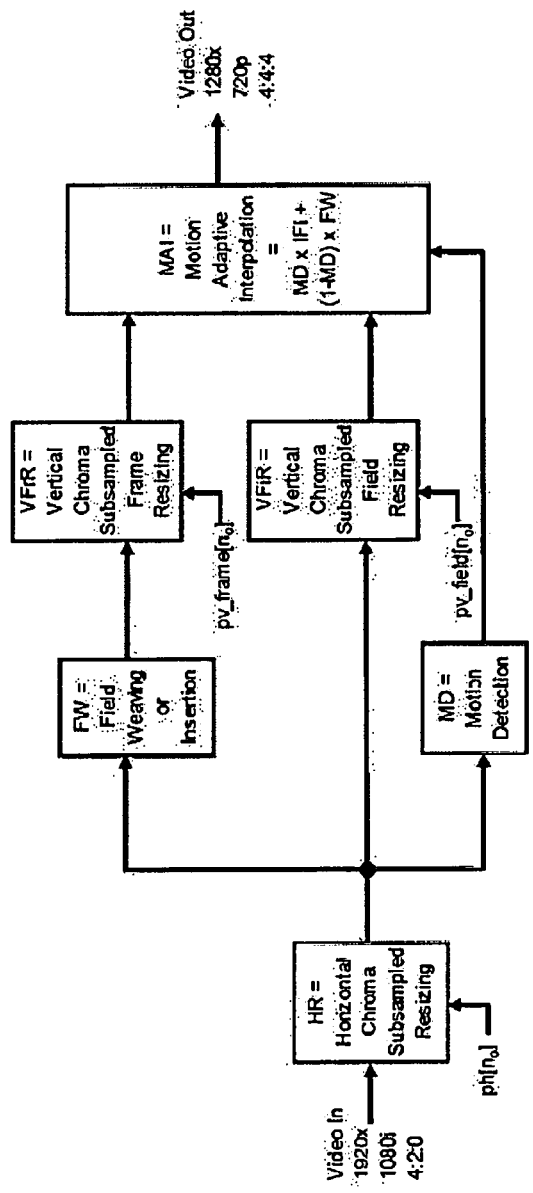
FIG. 39 Integrated chroma up sampling, motion adaptive de-interlacing and resizing using 2 vertical processing paths in parallel.
Figure 40:
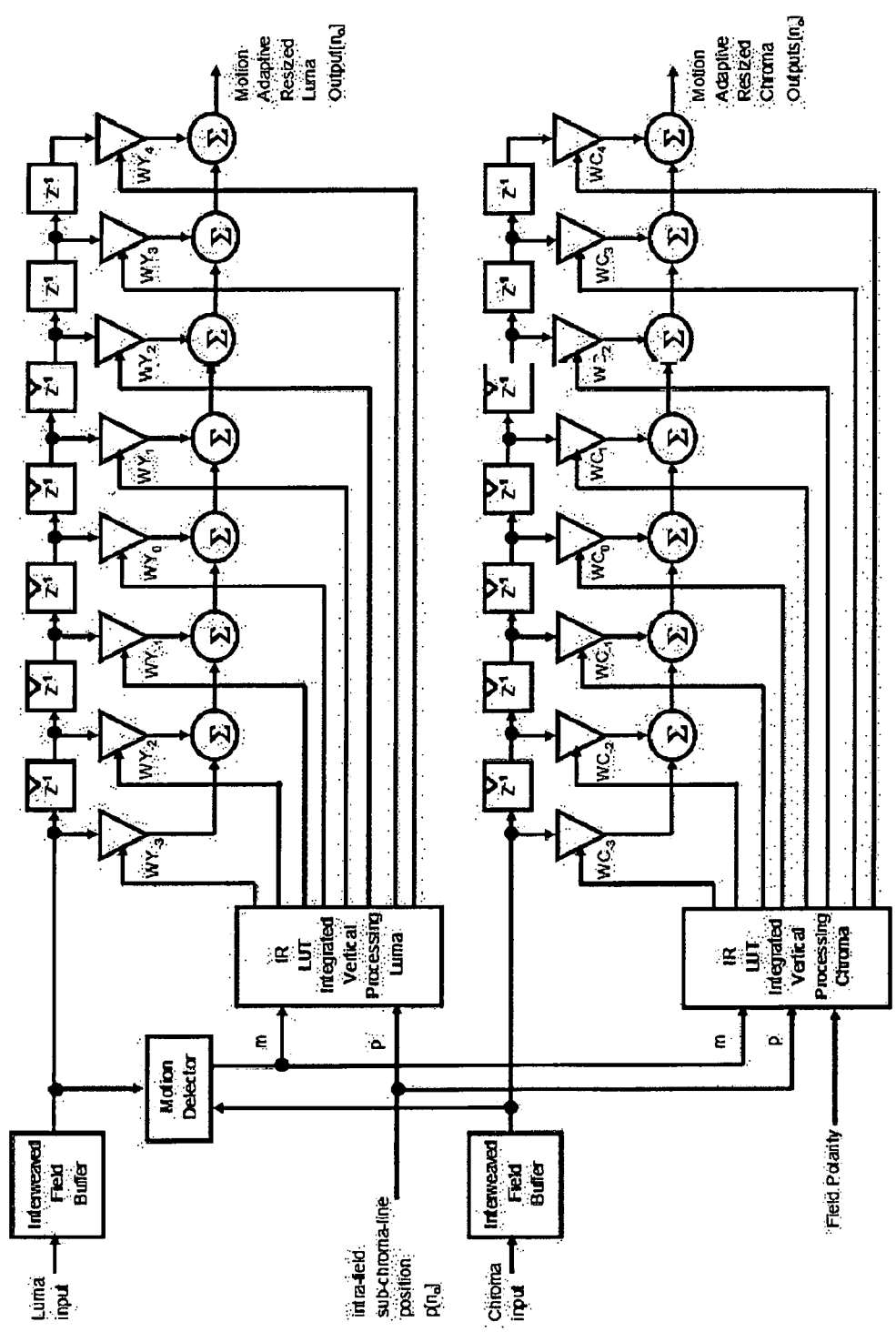
FIG. 40 Optimized integration of 4:2:2v chroma upsampling, motion adaptive de-interlacing and vertical resizing.
Figure 41:
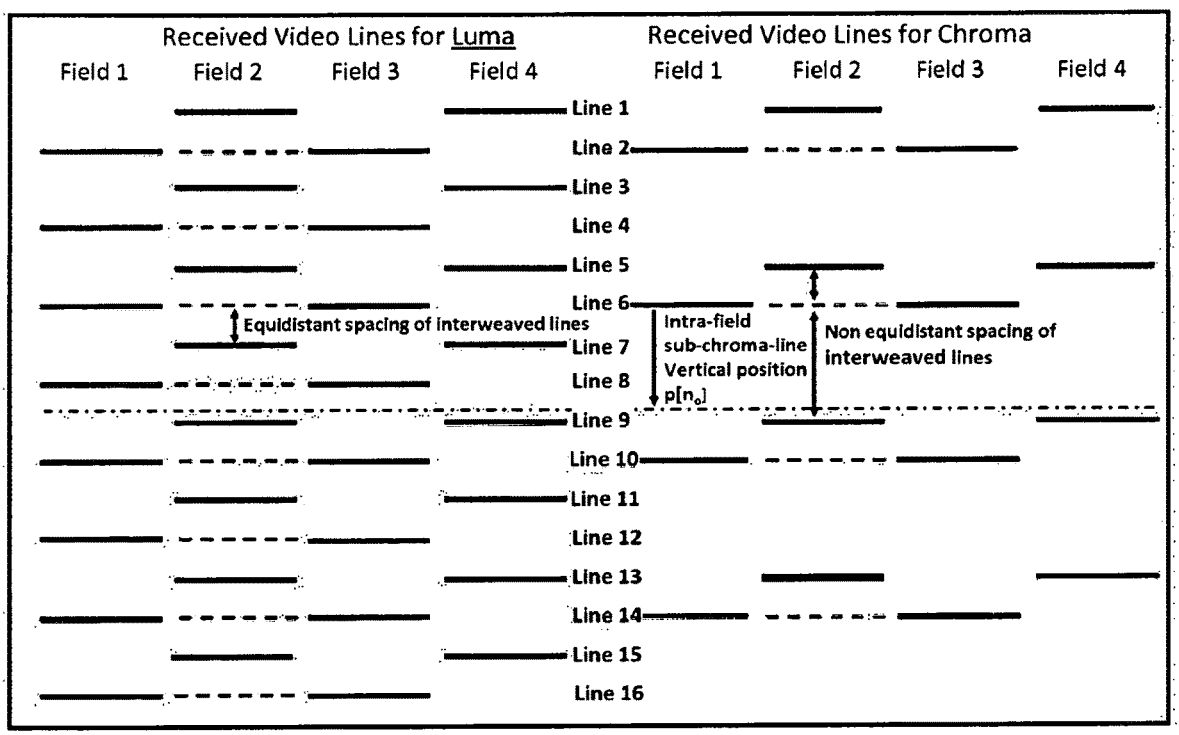
FIG. 41 Comparison of received video lines for luma and chroma channels in case of interlaced 4:2:0 chroma sub sampled video.

In another embodiment (as such or combined with aspects discussed before) (4:2:0) chroma up sampling, de-interlacing and resizing are integrated as an embodiment of the present invention. In accordance with aspects pf the present invention, the processing blocks may be integrated into a processor or may be provided in a unit such as a controller. In a 4:2:0 chroma sub-sampling scheme, the two chroma components Cr and Cb are sampled horizontally in the same way as with the 4:2:2 chroma sub-sampling scheme. However, in the 4:2:0 scheme they are only sampled on each alternate line. In other words: the sub-sampling rate is the same in both spatial dimensions. In order to convert 4:2:0 chroma sub-sampled video into 4:4:4 data, the chroma channels must be up scaled in both spatial dimensions by a factor of 2. In many cases state of the art image processing chains implement this by using 2 cascaded FIR filters, as the chroma up sampling feature can be chosen to be separable. For instance, a windowed sinc FIR filter convolution is often used in both dimensions independently. A typical state of the art image processing chain is illustrated in FIG. 37. Typically, the vertical chroma up sampling filter is implemented first in the video data path as this feature, when implemented with high quality, requires several video line buffers. As the required density of these buffers might contribute to the implementation cost, the lowest density is chosen by implementing the vertical chroma up sampling in front of the horizontal chroma sample rate doubling. Note however that mathematically this choice does not impact the image quality. One can chose to first up scale the horizontal chroma sub sampling rate and then perform the vertical up conversion process. As all blocks in the video data path are convolutions, this is true for the entire image processing chain. To illustrate this, the scheme in FIG. 37 is equivalent to the scheme in FIG. 38. Note that the vertically up converted 4:2:0 video signal is indicated as 4:2:2v, as it represents the same chroma sub sampling scheme as common 4:2:2 signals, except that the horizontal sub sampling dimension is replaced by the vertical dimension. The scheme now clearly indicates that there are two video paths processed in parallel. The top path handles video frames while the bottom path handles video fields. Both video paths represent a chain of convolution filters acting in the same vertical dimension. That means these filters can be replaced by a single filter, similar to the optimization step that was illustrated in FIG. 29. This optimization process is illustrated in FIG. 39. The scheme in FIG. 39 illustrates how two vertical polyphase filters placed in parallel can perform de-interlacing, chroma up sampling and resizing, all at the same time. Note that both filter paths are by themselves a parallelized set of 3 filters: one per color component Y, Cb and Cr. Although quality wise this integration step is already beneficial, it does not reflect the cost saving potential of this integration principle. While the horizontal part of the processing chain is optimized by this scheme, the 2 vertical paths need be integrated as a single convolution filter, similar to what was illustrated in FIG. 36. The detailed schematic in FIG. 40 illustrates how, chroma up sampling, de-interlacing and resizing with a single convolution filter per color component. Note that the bottom half of the schematic is implemented twice: once per chroma component Cr and Cb. For cost efficiency reasons the interweaved field buffer is implemented separately for luma (Y) and chroma (Cb and Cr) channels in order to save RAM density by avoiding storage space for missing chroma samples. As indicated by the scheme, the luma and chroma polyphase filters don't share the same coefficients. The weights for the chroma filters are indicated as WC, while the weights for the luma filter are indicated as WY. The reason for this is explained by FIG. 41. When 2 successive fields of video data are interwoven, the result is very different for luma and chroma channels, as the interweaving process illustrated in the second field suggests. While the interweaved field buffer for luma contains equidistant video lines, its chroma counterpart contains an irregular vertical sampling grid. Therefore a different set of weights for the filter taps is required for luma compared to chroma. A resampling function must be calculated based on an irregular sampling grid. The same impulse responses corresponding to filter types can be defined as with a regular sampling grid, but due to the reduced amount of impulse response sample points within the same IR area, different interpolation equations are obtained. Furthermore, the normalization process is defined independently for luma and chroma. As interweaved luma fields have equidistant line spacing, the intra field sub line positioning determines the relative position to all lines within an interweaved field, regardless of the so called polarity of the currently processed field. In FIG. 41 fields 1 and 3 have a polarity marked as top field, while fields 2 and 4 are indicated as bottom fields. The convolution filter weights are based on the value of the sub line position. However, as interweaved chroma fields have non equidistant line spacing, the intra field sub line positioning combined with the current field polarity determine the relative position to all lines within an interweaved field. Therefore the convolution filter weights are not uniquely based on the value of the sub line position, but are also influenced by the field polarity signal. This explains the need for the 1 bit field polarity input signal feeding address of the IR LUT of the integrated vertical processing for the chroma channel, as indicated in the schematic. Other optimizations and variations to implement the field polarity adaptivity are possible, but all or any of the embodiments can share the influence of the polyphase filter weights. Note that the scheme in FIG. 40 shows a set of equally sized convolution filters. However, filter kernels could be chosen independently for all color components. In many systems, it makes sense to implement the luma processing using a larger filter kernel than for the chroma channels. The current invention is not limited to a certain combination of filter kernel sizes. For instance a 10 taps polyphase filter could be used for luma while a 6 taps filter is used for the chroma channels.

Figure 20:
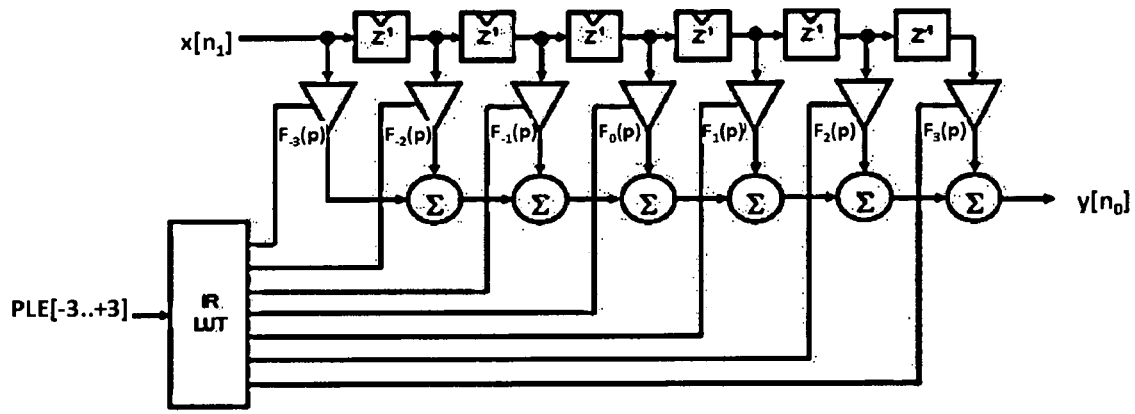
Figure 42:
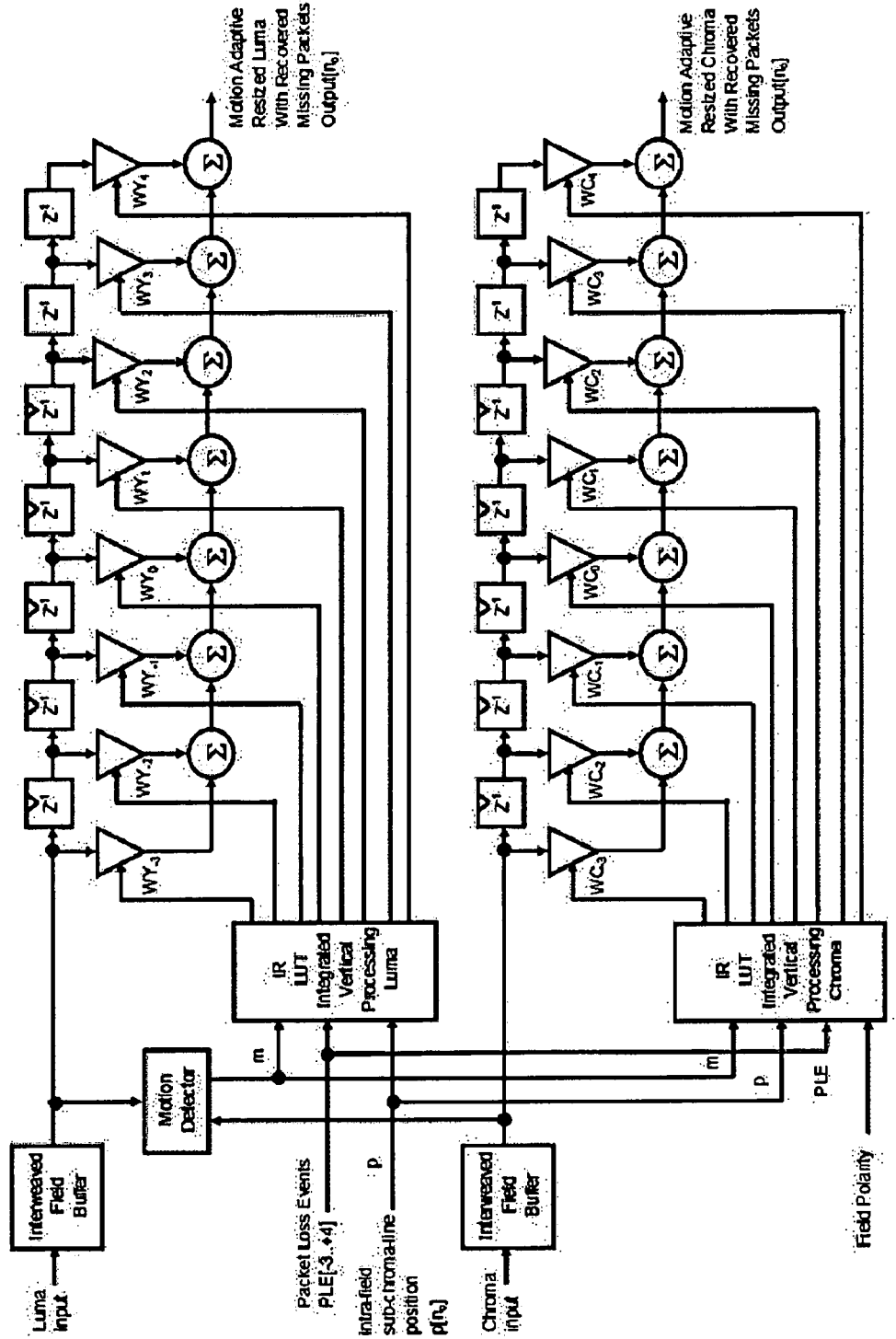
FIG. 42 Integration of 4:2:2v chroma upsampling, motion adaptive de-interlacing, vertical resizing and missing packet reconstruction filtering.

In yet another embodiment of the present invention integration, combination of missing packet reconstruction and resizing is provided. In accordance with aspects pf the present invention, the processing blocks may be integrated into a processor or may be provided in a unit such as a controller. Obviously this can be combined with the aspects discussed above also. Missing packets in raw video traffic over IP cause horizontal lines—so called "hairs"—within the image where corrupt, invalid or blanked or grayed-out data is displayed. This was discussed before. FIG. 20 illustrated a possible implementation based on a vertical FIR filter with weights controlled by a LUT. The LUT is addressed based on the combination of packet loss events within the filter kernel, represented as PLE[−3 . . . 0] in that example. Similar to the previous integration steps of separate cascaded convolution functions which appear in classic state of the art processing chains, the missing packet recovery convolution filter as described in FIG. 20 can be integrated with the combined vertical convolution filter from FIG. 40. This is similar to the integration of de-interlacing and vertical resizing. A first approach is by feeding the PLE bus combination for the combined filter kernel to the FIR weight LUT address, as illustrated in FIG. 42. Regardless of the chosen chroma up sampling filter type, the de-interlacing algorithm, the resizing formula and the missing packet recovery function the filter coefficient weights depend only the amount of motion m, the sub line position phase p and the combination of packet loss events within the current kernel PLE[−3 . . . +4].

Figure 43:
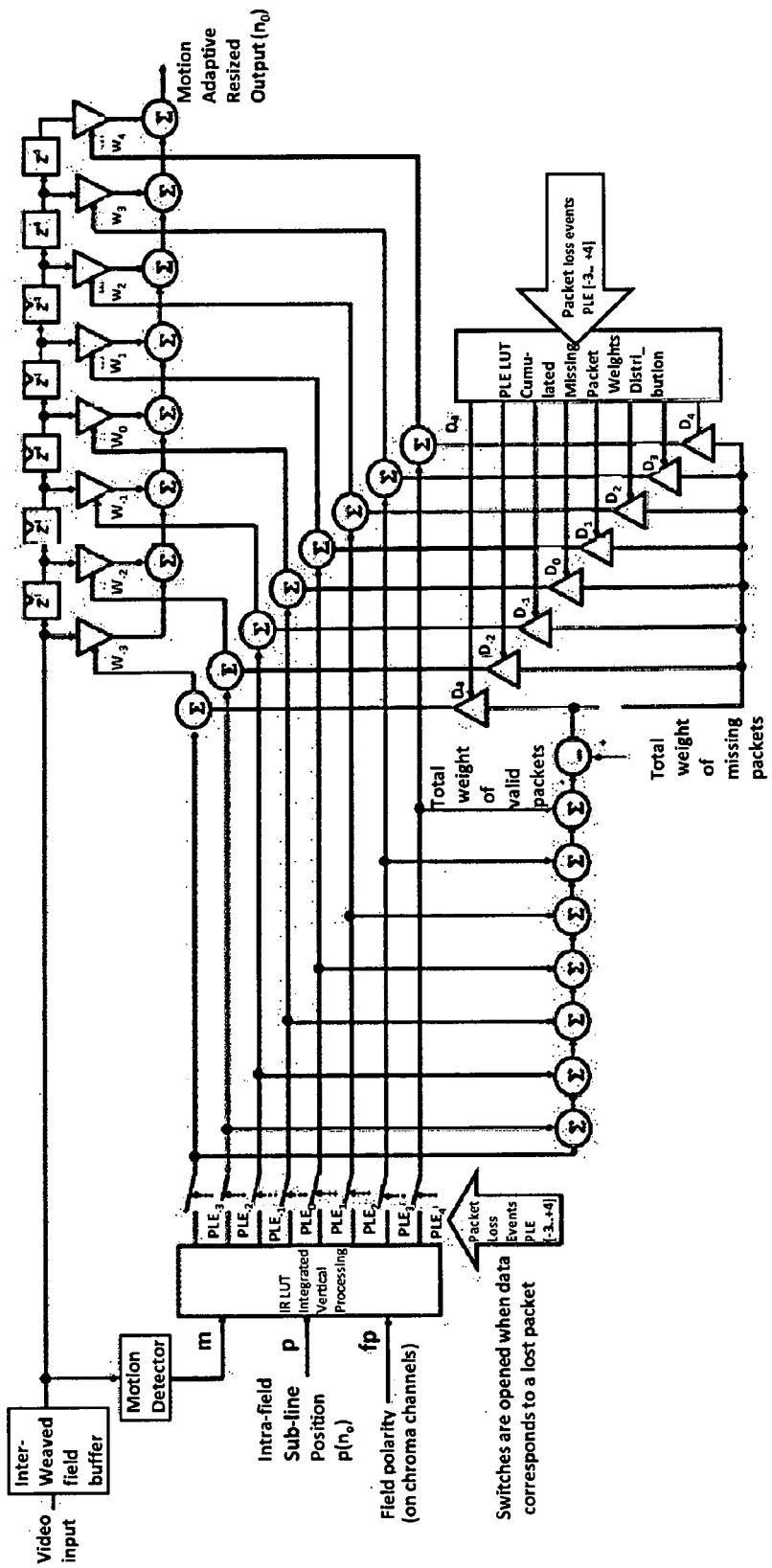
FIG. 43 Optimized practical integration of 4:2:2v chroma up sampling, motion adaptive de-interlacing, vertical resizing and missing packet reconstruction filtering with equal kernel sizes.
Figure 44:
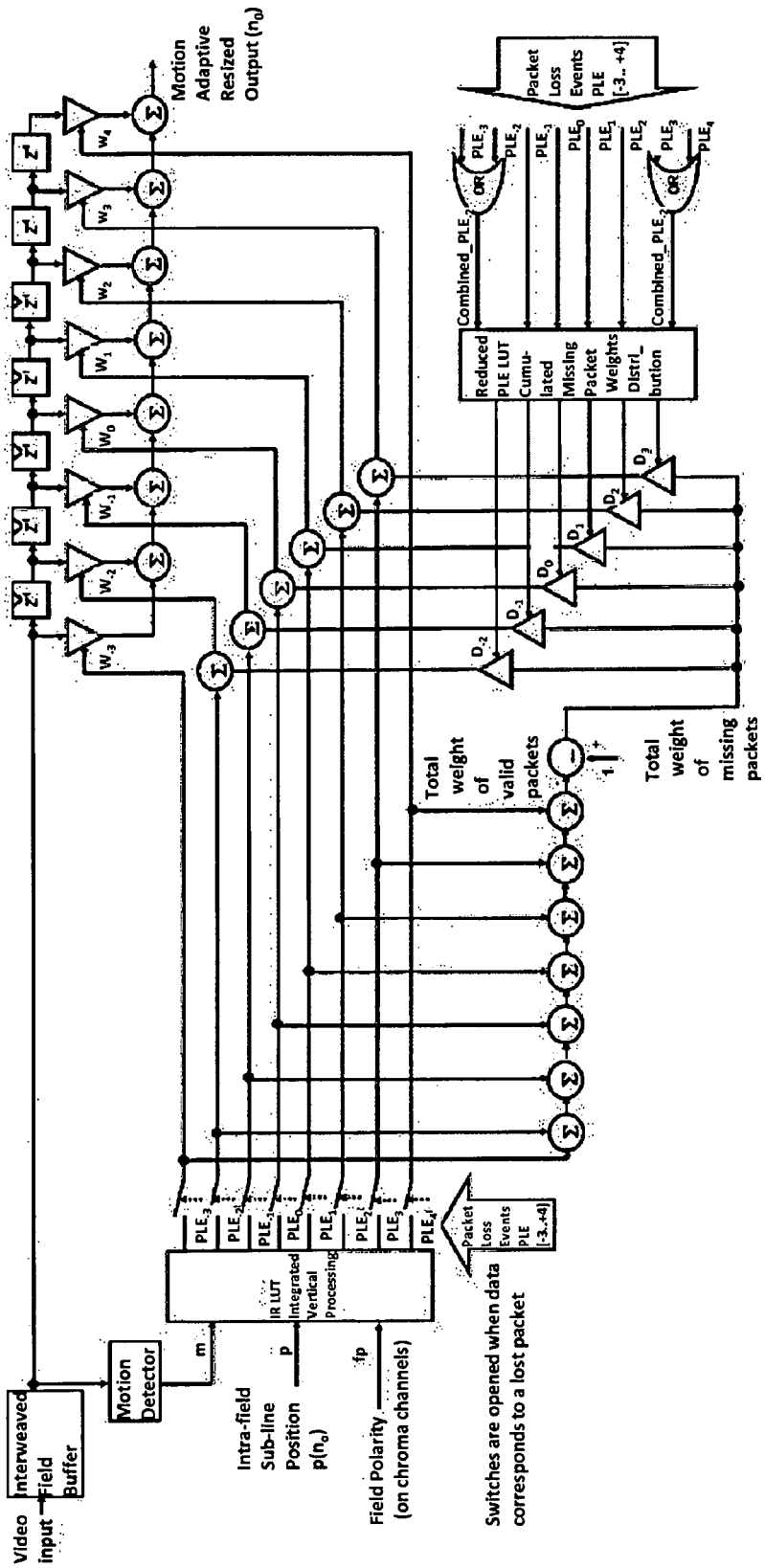
FIG. 44 Optimized practical integration of 4:2:2v chroma upsampling, motion adaptive de-interlacing, resizing and missing packet reconstruction filtering with independent kernel sizes.

The LUT functions in the block diagram represent look up table functions which can use piece wise linear interpolation for the motion and phase dimensions in order to save RAM density. As mentioned before it is possible to reduce the amount of sample points in the motion dimension to the minimum of 2. This corresponds to one set of filter coefficients for still images and one for moving images. The linear interpolation in between the two sets of coefficients is controlled by the motion detector in how it returns the value of m. Note that other than linear interpolations are possible in between the value sets stored in the LUT, such as a cubic convolution. In most cases however, the linear interpolation between sets of coefficient data provides an adequate approximation of the ideal filter when a reasonable amount of values is stored in the LUT, for instance 2 motion values and 32 sub line position phase values, depending on the chosen filter types for chroma upsampling, de-interlacing, resizing and missing packet recovery. The combination of packet loss events cannot be approximated by a (linear) interpolation process because the PLE value does not represent a dimension. In fact all combinations of PLE require totally independent polyphase filtering coefficients, although some limited optimizations due to symmetries are possible. Therefore a more practical implementation to integrate the missing packet recovery is suggested in FIG. 43, although the filtering quality obtained by the scheme in FIG. 42 can be idealized for any given combination of packet loss events, such as when a network glitch or spike occurs on the network, usually caused by bursty traffic generated by an independent IP stream. Compared to the first integration scheme in FIG. 42, the scheme in FIG. 43 splits the combined LUT into two much smaller LUTs. This reduction of required RAM density is possible thanks to a usually perfectly acceptable compromise. A first LUT provides polyphase filter coefficient weights without considering potential packet loss events. It also generates a coefficient weight for missing or corrupt video data in the kernel buffer. When a coefficient weight corresponds to a missing packet, its corresponding switch is opened in the schematic. The series of adders following these switches ensure that all coefficient weights corresponding to valid received packets are cumulated into a single value. By subtracting the total weight of valid packets from 1 the total weight of missing packets is obtained, as the sum of all coefficient weights provided by the first LUT equals one. That value is distributed using weights provided by a second LUT and added to all the original weights. The second LUT is addressed by the packet loss event combination PLE[−3 . . . +4]. Its role is to ensure a valid distribution D[−3 . . . +4] across coefficients corresponding to non-missing packets only, for any possible combination of lost packets PLE[−3 . . . +4]. The sum of these distribution coefficients D[−3 . . . +4] is equal to 1, as defined by the PLE LUT content. This guarantees that the final sum of polyphase filter weights W[−3 . . . +4] is equal to 1, a normalization condition which is necessary to guarantee a pass through of the lowest frequencies in the video. In case a single packet is missing, this optimized implementation does not compromise quality, as obviously the total weight of the missing packets equals the weight of the single lost packet. In case packets corresponding to a successive group of lines are missing, the proposed optimization can still provide an optimal result. However, in case a fragmented combination of packets is lost within the kernel, a compromised distribution must be calculated. Preferably that distribution is optimized for the missing packet(s) most central in the filter kernel. The above scheme has equal kernel sizes for all processes: the chosen chroma upsampling filter type, the de-interlacing algorithm, the resizing formula and the missing packet recovery filter. The current invention does not implicitly require equally sized filter kernels. It does not force one to implement an equal amount of coefficient weight for both look up tables. A possible implementation which reduced missing packet reconstruction kernel size compared to the resizing kernel size is illustrated in FIG. 44. The scheme in FIG. 44 represents an 8 taps polyphase filter kernel which is used for chroma upsampling, de-interlacing and resizing. The coefficient weights are stored in parallel in the first LUT as a function of the phase p and motion m signals, including also the field polarity for chroma filter coefficient weights. The second LUT stores distribution weights D[−2 . . . +3] only for the six centre lines in parallel. That means the weights corresponding to missing packets in any of the 8 lines currently in the filter kernel are always distributed to the reduced set of centre lines, in this case that kernel is chosen to be 6 lines in height. This set of reduced weight distribution coefficients data D[−2 . . . 3] also reduces the required LUT density. However the reduced number of addresses has a much more significant impact on the required RAM density to store the best reduced distribution based on a reduced set of combinations of packet loss events. This reduction is made possible by simply using the OR equation of the outer element in the missing packet recovery filter kernel and the element outside that kernel at each corresponding side. We can now provide an explanation to demonstrate how this filter works equivalently to a separate state of the art missing packet reconstruction filter. Equation 9 shows how a separate 5 taps missing packet recovery filter and an 8 taps resizing filter are cascaded.

Example of cascaded missing packet recovery and vertical resizing      Eq. 9

$$i^*Z^{-2} = R_{-2}^* i^* Z^0 + R_{-1}^* i^* Z^{-1} + R_1^* i^* Z^{-3} + R_2^* i^* Z^{-4}$$

$$O(p,m) = \begin{array}{l} W_{-3}(p,m)^* i^* Z^3 + W_{-2}(p,m)^* i^* Z^2 + \\ W_{-1}(p,m)^* i^* Z + W_0(p,m)^* i + \\ W_1(p,m)^* i^* Z^{-1} + W_2(p,m)^* \boxed{i^*Z^{-2}} + \\ W_3(p,m)^* i^* Z^{-3} + W_4(p,m)^* i^* Z^{-4} \end{array}$$

In this example equation the video data corresponding to the filter tap $i^*Z^{-2}$ is associated to a missing packet. The first line in eq. 9 represents a 5 taps FIR to recover the missing data by using a convolution. The centre tap, in this case $i^*Z^{-2}$, is replaced by a weighted sum determined by R[−2 . . . +2] of the video data in the surrounding neighbouring lines above and below the line represented by the $i^*Z^{-2}$ tap, which corresponds to a zero coefficient weight for the missing central line. Substituting the result for $i^*Z^{-2}$ in the equation for the video output O(p,m) in the second line of equation 9 leads to the result obtained in equation 10. Note that the coefficient for the (part of the) video line corresponding to the missing packet $W_m$ is equal to one minus the sum of the valid video lines. This means the entire term $W_2(p,m)^*$ $i^*Z^{-2}$ can be eliminated from the original equation, as demonstrated below.

Example of optimized cascaded missing packet recovery and vertical resizing      Eq. 10

$$W_m = 1 - \left( \begin{array}{c} W_{-3}(p,m) + W_{-2}(p,m) + W_{-1}(p,m) + W_0(p,m) + \\ W_1(p,m) + W_3(p,m) + W_4(p,m) \end{array} \right)$$

$$O(p,m) = \begin{array}{l} W_{-3}(p,m)^* i^* Z^3 + W_{-2}(p,m)^* i^* Z^2 + W_{-1}(p,m)^* i^* Z + \\ W_0(p,m)^* i + W_1(p,m)^* i^* Z^{-1} + \\ W_m^*(R_{-2}^* i^* Z^0 + R_{-1}^* i^* Z^{-1} + R_1^* i^* Z^{-3} + R_2^* i^* Z^{-4}) + \\ W_3(p,m)^* i^* Z^{-3} + W_4(p,m)^* i^* Z^{-4} \end{array}$$

$$O(p,m) = \begin{array}{l} W_{-3}(p,m)^* i^* Z^3 + W_{-2}(p,m)^* i^* Z^2 + W_{-1}(p,m)^* i^* Z + \\ (W_0(p,m) + W_m^* R_{-2})^* i + (W_1(p,m) + W_m^* R_{-1})^* i^* Z^{-1} + \\ (W_3(p,m)) + W_m^* R_1)^* i^* Z^{-3} + (W_4(p,m) + W_m^* R_2)^* i^* Z^{-4} \end{array}$$

The representation in eq.10 is exactly the equivalent of the scheme in FIG. 44, which proves this integration methodology can reproduce the exact same mathematical results compared to a separate missing packet reconstruction followed by resizing. Of course the integration does not restrict one to implementing the mathematical equivalent. Just as with the previous integration steps, a quality improvement is realized by integrating the mathematics as well. The scheme in FIG. 42 allows you to obtain the highest possible quality in all circumstances while FIG. 44 delivers a perfectly acceptable for handling these exceptional events, such as missing packets.

Figure 45:
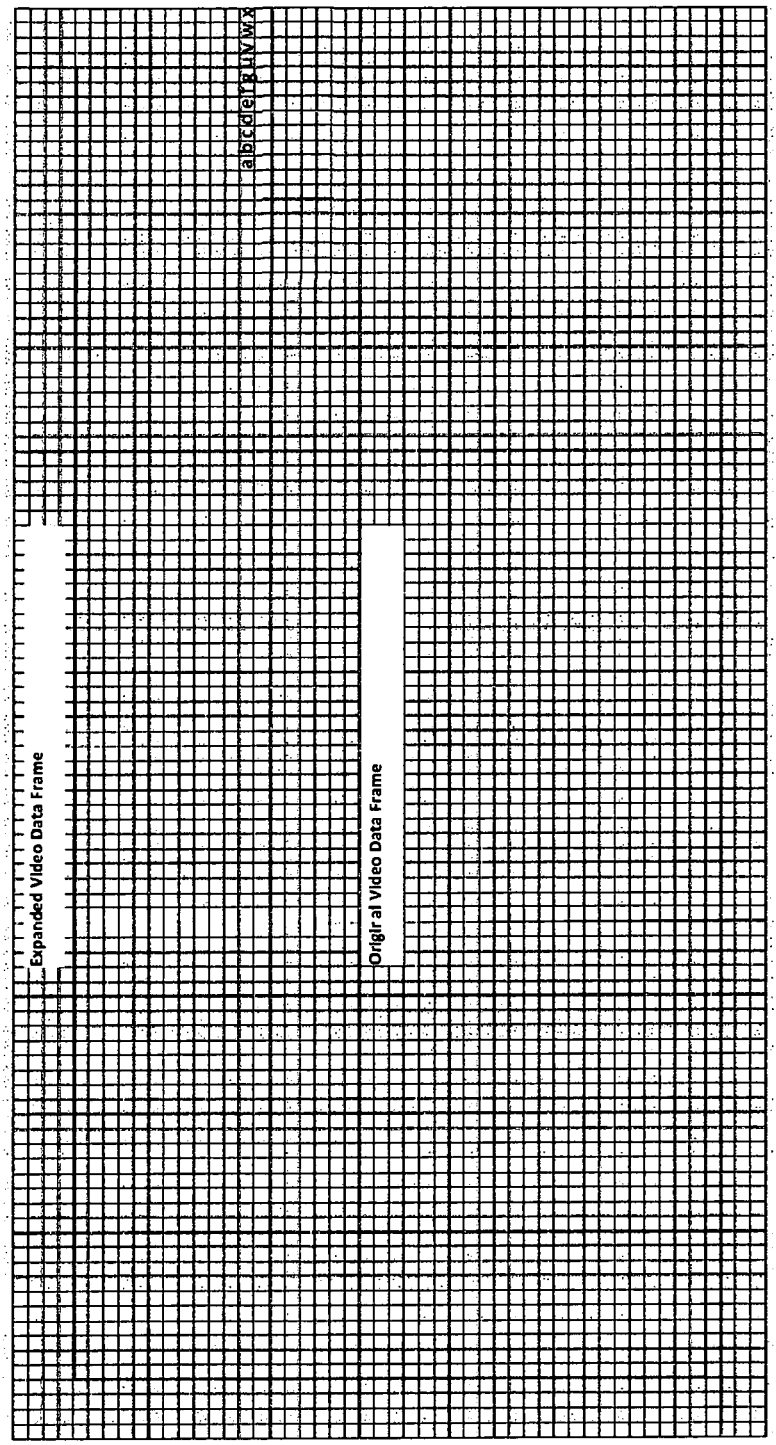
FIG. 45 Video Data Frame Expansion by so-called padding or data extrapolation.

All resizing algorithms and implementations have to deal with so-called boundary conditions. While a resizing convolution kernel is entirely defined for most part of the image, the kernel might be using video data virtually located just outside the video image. This means the resizing filter can require undefined video data when attempting to calculate the new output pixels. An often used technique is referred to as padding the video data to create virtual video data just outside the original image by repeating the first and last lines, as well as the first and last columns. A frame of new video data is added around the original image. More advanced techniques are sometimes used as well, such as a linear or higher extrapolation or a mirroring operation, which all serve the same: to estimate the missing video data just outside the original image. The advantage of adding an extra frame of video data around the original image can be easily understood as the resizing filter does not have to be altered near the boundaries of the original image, as all pixels required by the resizing filter are defined by the padding process. The expansion of the original video frame is illustrated in FIG. 45. In the example in FIG. 45 the original image is extended by 4 pixels in all direction, so 8 pixels per dimension. The seven last pixels in the illustrated row have respectively value a, b, c, d, e, f and g. The newly created pixels are indicated as u, v, w and x. Some typical examples to calculate these missing pixels are:
  Last pixel repetition: u=v=w=x=g
  Linear extrapolation: u=2*g−f, v=2*u−f, w=2*v−u, x=2*w−v
  Linear extrapolation with repetition: u=v=w=x=2*g−f Parabolic extrapolation with repetition: u=v=w=x=3*g−3*f+e Mirroring: u=g, v=f, w=e, x=d

...

Figure 46:
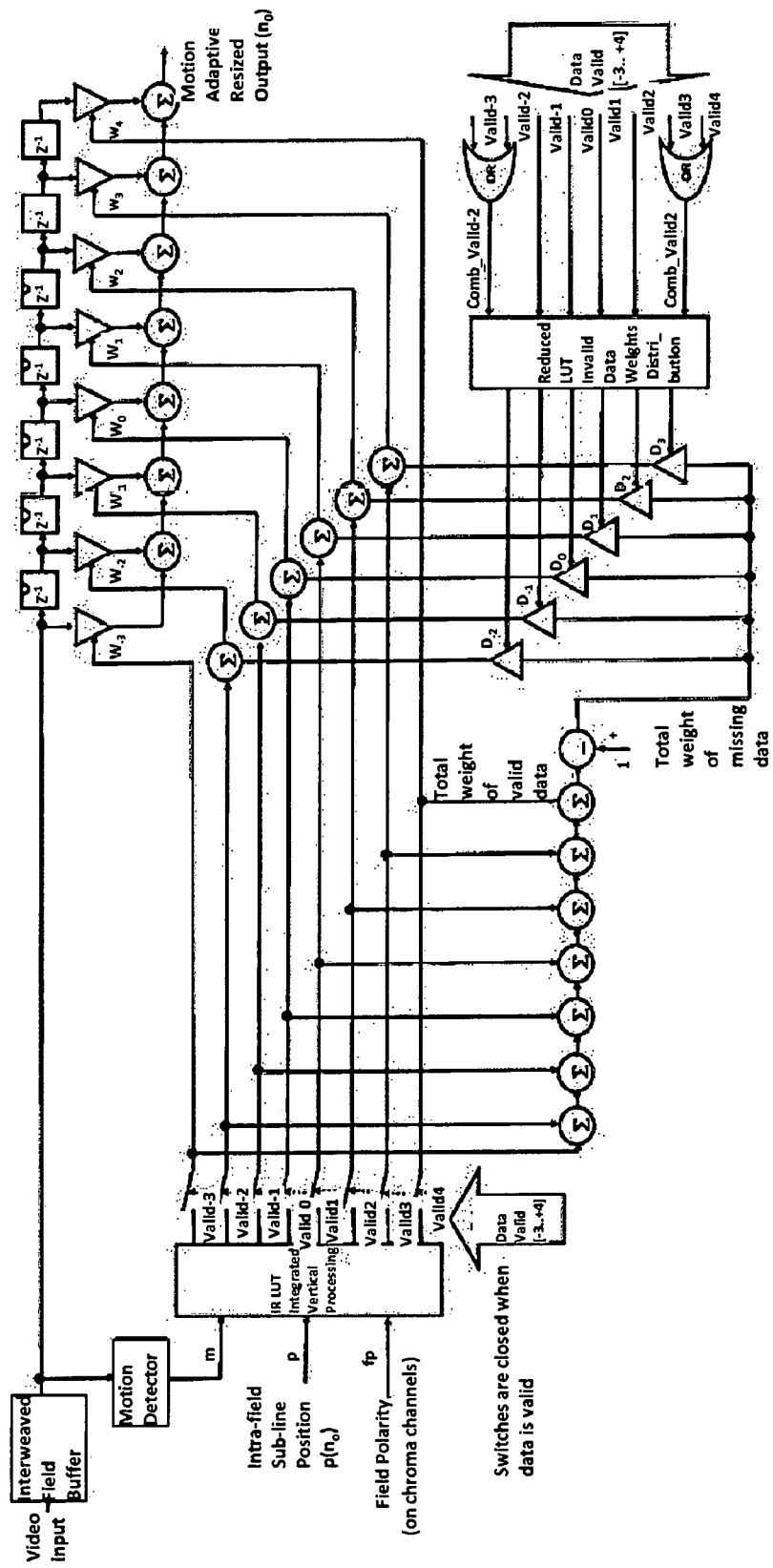
FIG. 46 Integration of chroma up sampling, motion adaptive de-interlacing, resizing and missing packet reconstruction filtering with boundary conditions FIG. 47 Beat pattern introduced by resampling critically high frequencies in an image FIG. 48 Beat pattern introduced by slightly enlarging an image FIG. 49 Beat pattern introduced by slightly resampling a lower frequency signal FIG. 50 Impulse response curves of Catmull-Rom spline and Lanczos3
Figure 47:
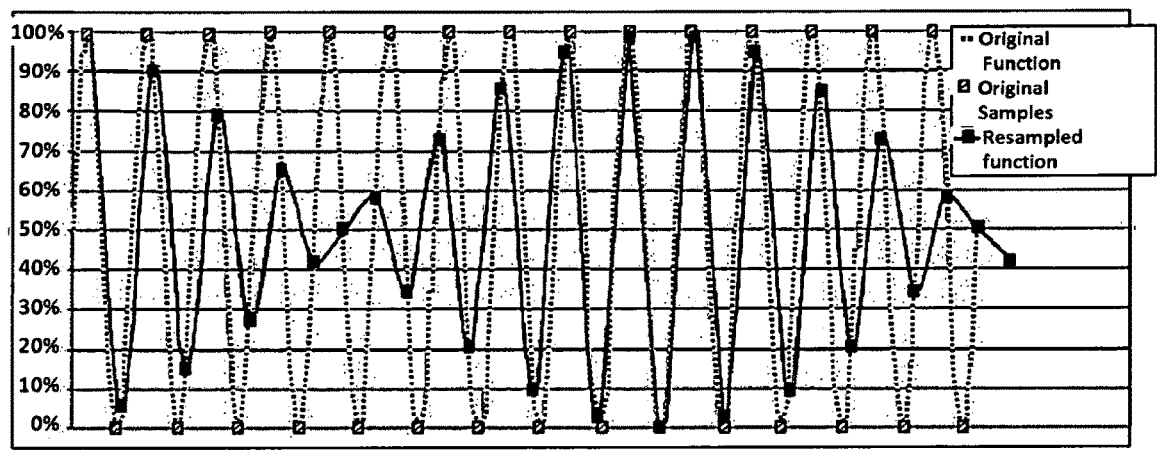
Figure 48:
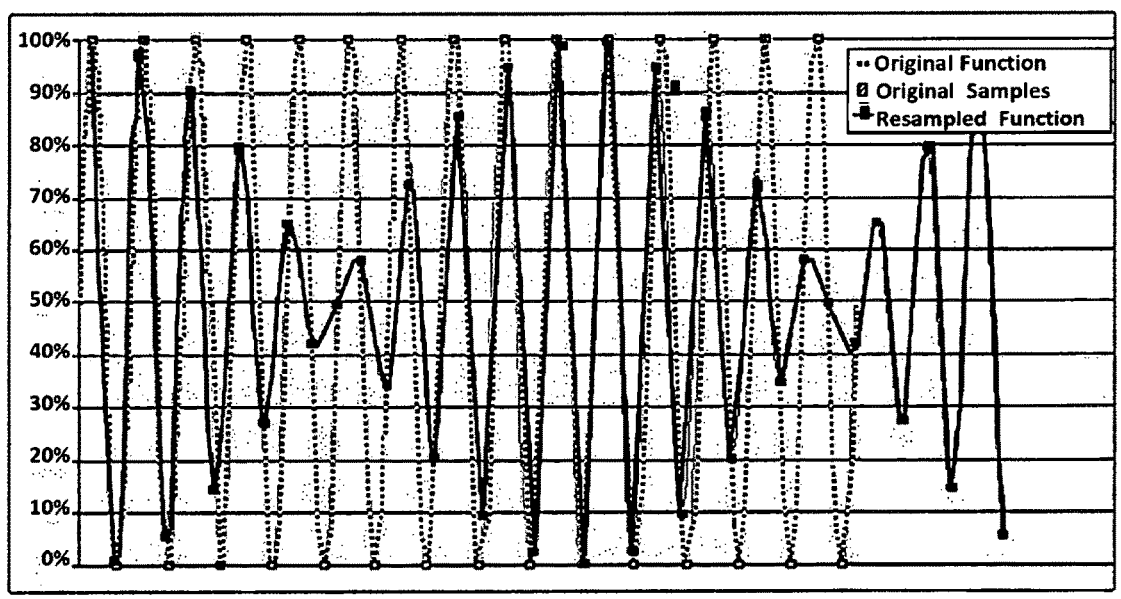
Figure 49:
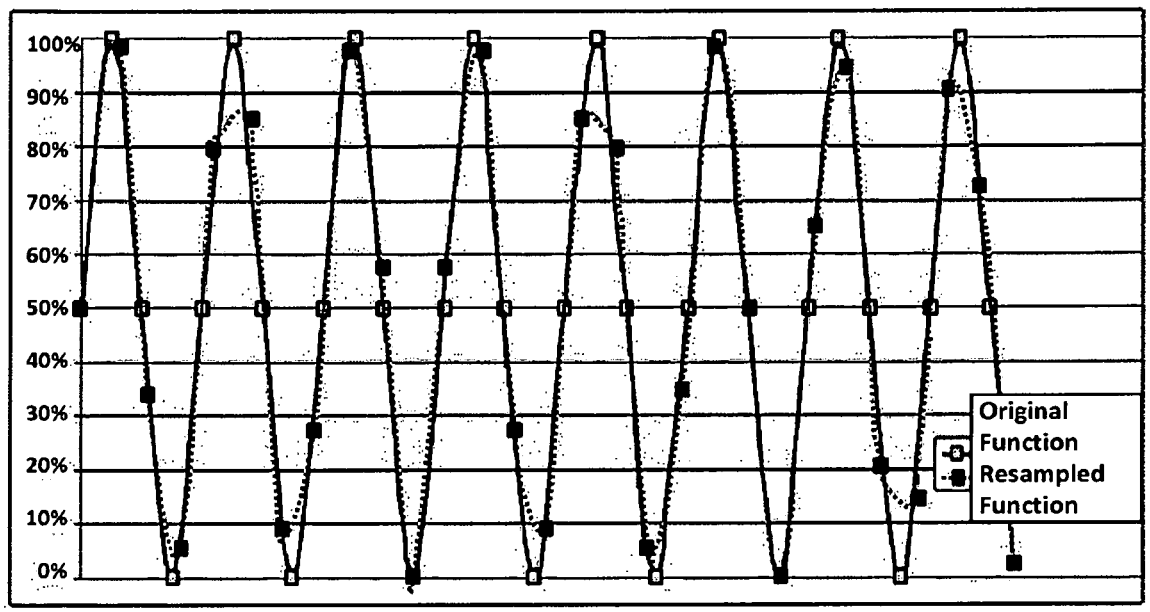

In all these boundary extension algorithms the new pixel values are based on a linear weighted sum of original pixel values. These filter processes are, again, effectively convolution processes. Therefore in accordance with embodiments of the invention it can be integrated in the integrated schematic in FIG. 44, which is yet another embodiment of the invention. The integration steps which were described to integrate a missing packet recovery filter can be used just as well to handle the boundary conditions for the resizing kernel. When resizing near the boundaries of the original image, one can treat the values just outside the video frame as missing values, just as with video data corresponding to missing packets. Instead of directly connecting the packet loss event bus to the LUT address, a more general data valid signal is used. This data valid signal is the result of the missing packet detection and the boundary condition. The integrated process is illustrated in FIG. 46. Each bit in the Data Valid bus is the result of a logical AND equation of a packet received event and a signal which indicates that the current pixel is part of the original image. So in case either the video data corresponds to a missing IP packet, either the required source pixel is located outside the original image, the corresponding valid bit becomes zero (invalid). This concludes the different integration steps proposed by the current invention. It has been demonstrated that a complete image processing chain can be implemented using a single convolution filter per dimension (x and y). This integration not only reduces the implementation cost, but it also optimizes image quality at the same time.

Figure 54:
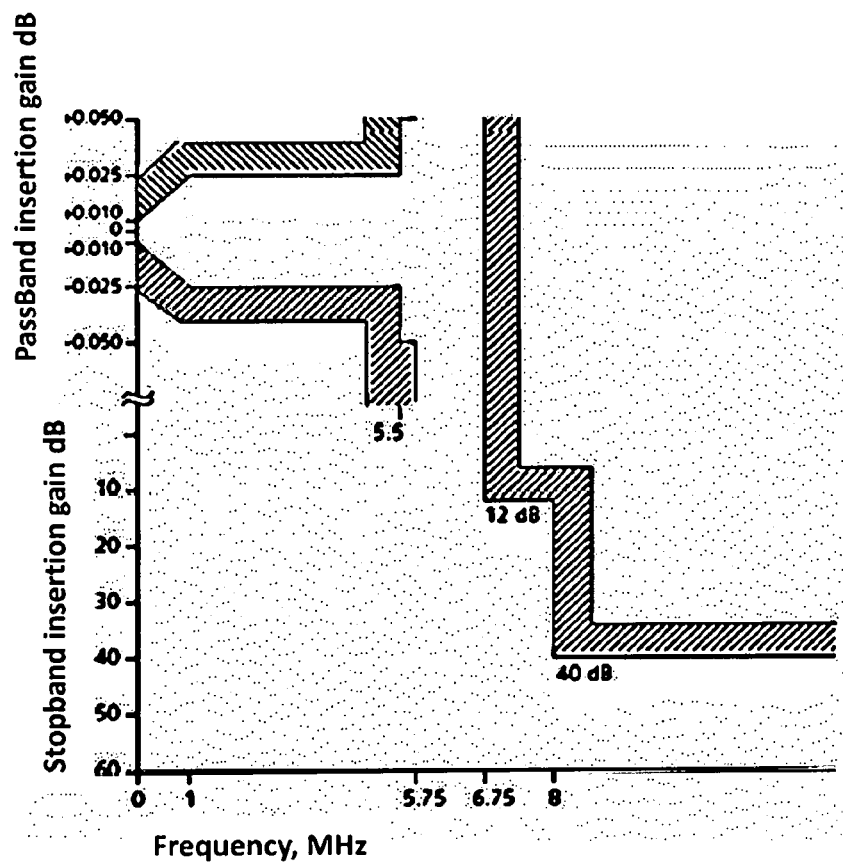
Figure 55:
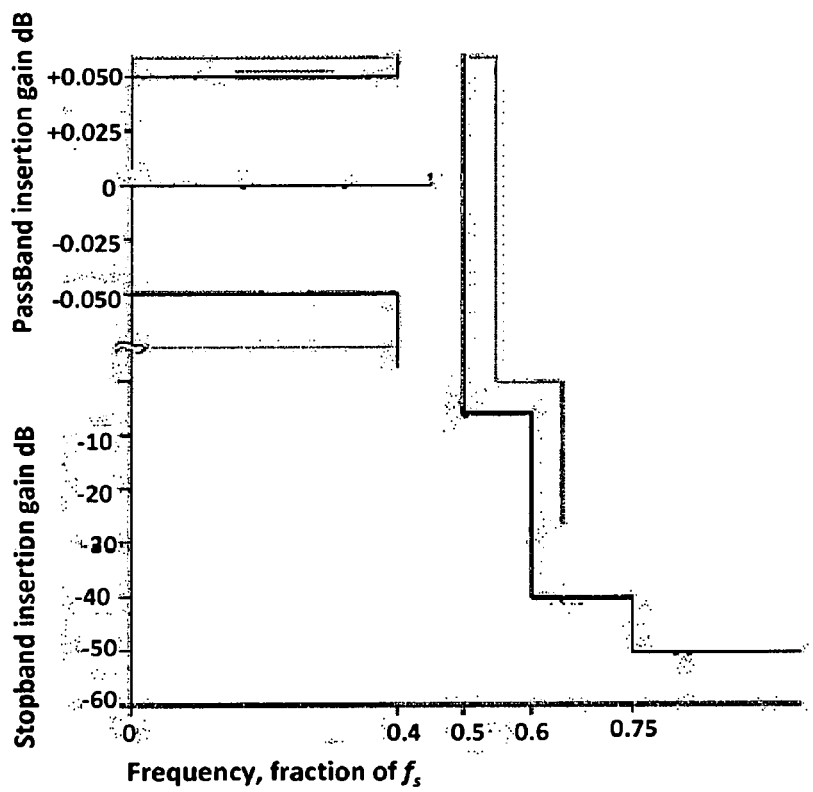

In another aspect of the invention filter quality analysis techniques, in particular based on filtering template specs; are disclosed, which can be used on their own or be used in combination or for the other integration aspects discussed above, as will be described also further. In accordance with aspects of the present invention, the processing blocks may be integrated into a processor or may be provided in a unit such as a controller. Whether or not the differentiators discussed in the prior art section of this document improve image quality depends on the desired filtering characteristics which depend on the video standard among other factors such as perceptual aspects, as mentioned before. The desired post filtering characteristics for the Rec.709 full HDTV video standard are illustrated in FIG. 54. When high definition video signals are processed (for example resized) the visible frequencies up to 80% of the Nyquist frequency should not be attenuated or amplified by more than 0.05 dB, according to the Rec.709 postfiltering spec. Frequencies above 60% of the sample frequency (Fs) need to have a 40 dB attenuation and above 75% of Fs the required suppression is at least 50 dB. Ideally the modulation transfer function of an image processing chain should never cross the spec boundaries indicated by the grey lightly hatched areas above solid lines in FIG. 54. Many practical filters, including the earlier described Rifman cubic convolution, the Catmull-Rom spline and the Lanczos3 windowed sinc do not fulfil this criteria. The MTF (lightly hatched areas below solid curve) of an arbitrary (hypothetical) filter example which violates the Rec.709 filtering specs (areas indicated in boldly hatched areas) is illustrated in FIG. 55. When analyzing FIG. 55 the filter quality loss could be indicated by the combined boldly hatched areas. The total surface marked boldly hatched can be considered as a measure for the image quality loss introduced by the filtering process, which could be caused by any combination of chroma up sampling, resizing and de-interlacing process. Mathematically it makes most sense to analyze the filter quality loss as a root mean square value (RMS) of the entire out-of-spec function, and therefore it is common to define the quality loss by (a variation of) the formula in equation 19 below.

Quality loss definition as $RMS$ value of out-of-spec modulation transfer function  Eq. 19

$$QLoss = \sqrt{\int_{-\infty}^{+\infty}(H(\omega) - M(\omega))^2 \cdot d\omega}$$

where:
$M(\omega)$=Median[$H(\omega)$, $L(\omega)$, $U(\omega)$]

Figure 53:
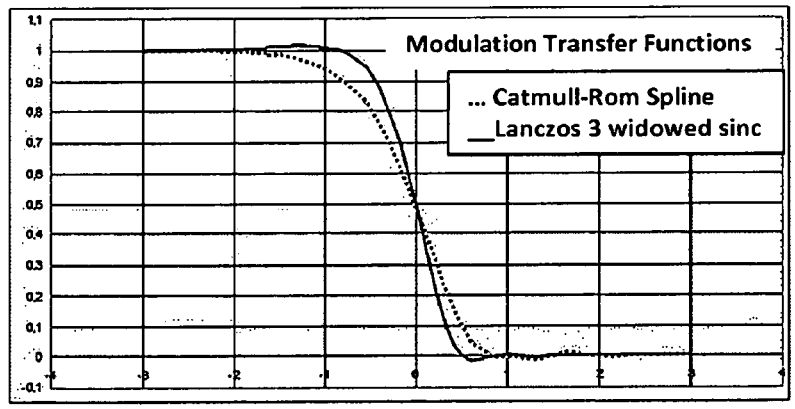
Figure 56:
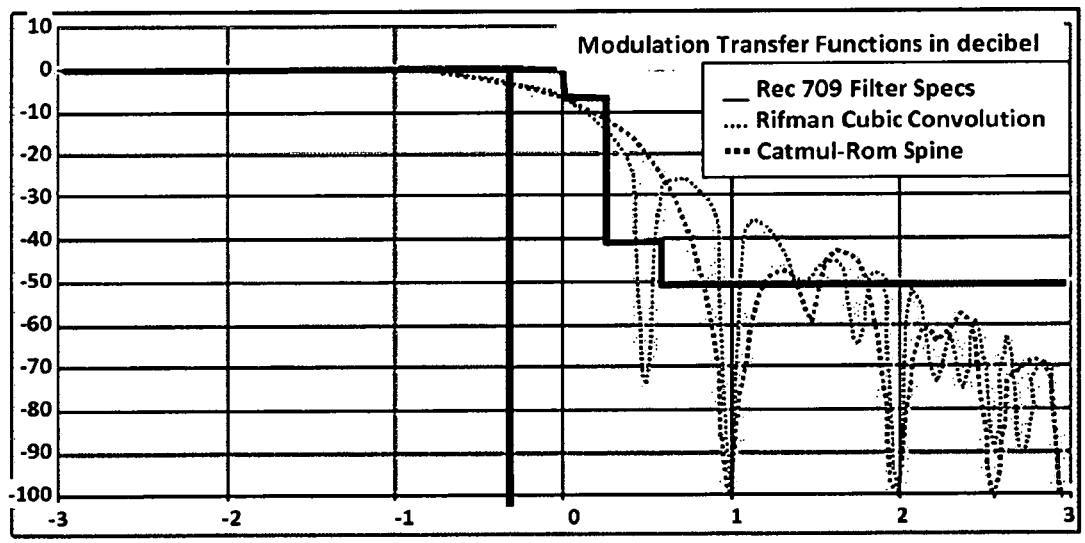
Figure 57:
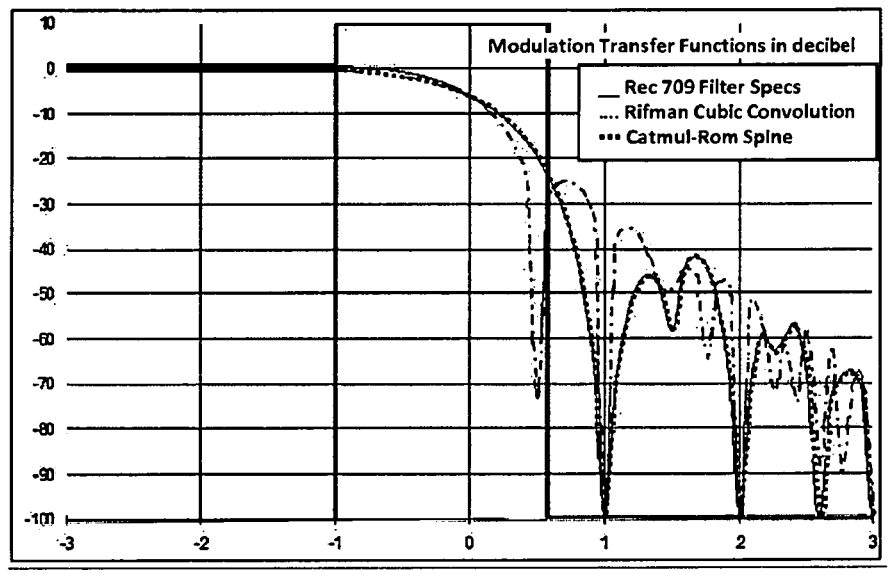

With $H(\omega)$ is the Modulation transfer (or MTF value) as function of the angular frequency $L(\omega)$ is the lower limit (most attenuated value) of the evaluated filtering spec $U(\omega)$ is the upper limit (highest gain value) of the evaluated filtering spec The role of the median operator in eq.19 is to select the appropriate reference when the MTF value is outside the filter spec boundaries and to return no QLoss when the MTF is within the spec. When the MTF value for a given angular frequency is in between the upper and lower limit the median value returns the MTF value which causes the term $H(\omega)-M(\omega)$ to be zero, which indicates the current position in the MTF curve does not contribute to the quality loss (QLoss) value. This is expected as the MTF value is within the valid specified range. When the MTF value for a given angular frequency is below the lower limit the median value returns the lower spec limit which causes the term $H(\omega)-M(\omega)$ to be equal to $H(\omega)-L(\omega)$, which is different from zero and thereby indicating that the current position in the MTF curve contributes to the image quality loss. Similarly when the MTF value for a given angular frequency is above the upper limit the median value returns the upper spec limit which causes the term $H(\omega)-M(\omega)$ to be equal to $H(\omega)-U(\omega)$, which is also different from zero and thereby indicating that the current position in the MTF curve contributes to the image quality loss. By definition the RMS value contains the square value of the above described aberrations which indicates all contributions are positive and therefore multiple quality loss contributions cannot cancel out each other. Note that all values in eq.19 are linear values, although the filter specs in figure are indicated as decibels. For example the upper limit of −6 dB at half the sampling frequency results in a linear value of about 0.5. We can now return to the comparison in FIG. 53 which illustrates the MTF curves of a Catmull-Rom spline (dotted line) and a Rifman convolution (solid line). By comparing these 2 convolution techniques to the Rec.709 filtering specs (as was illustrated for a hypothetical filter in FIG. 55) using the equation in eq.19, one can select the most appropriate filter for the example application, the resizing of HDTV imagery. FIG. 56 shows a chart that includes the data necessary to perform this QLoss (Quality Loss) calculation. The thick solid line in FIG. 56 indicates the same filtering specs as shown in FIG. 54. Note that, since the vertical scale is expressed in decibel values, the figure shows no lower limit in the stop band as the value is minus infinite. In fact an infinite attenuation of frequencies which are impossible to display is even desirable. Note that the tolerated gain fluctuations (only+/−0.05 dB) within the pass band are impossible to visualize decently without breaking up the vertical axis in multiple regions, a process that would destroy the appearance of the MTF curves. As the MTF chart in FIG. 56 suggests, the Catmull-Rom spline represented by the bold dotted curve introduces more quality loss (11.6%) compared to the Rifman cubic convolution (7.1%) shown as a light dotted curve. These quality loss numbers are obtained by normalizing equation 19 in order to produce a 100% quality loss for a simple attenuator which halves the input signal rather than filters it. However, a discussion about how one should normalize the result derived from eq.19 does not influence the comparison results because any normalizing process must be considered as a linear scalar operator, which means the ratio between both calculated numbers (11.6% versus 7.1%) is always maintained. Therefore it is fair to say, regardless of the meaning of the above percentages, that the Rifman convolution is better suited for resizing HDTV signals with general video content than the Catmull-Rom spline, based on the Rec.709 filtering specs, when viewing conditions and corresponding perceptual aspects cannot be considered for general purpose applications. Indeed, the human eye's spatial sensitivity curves suggest one can "weight" different quality loss contributions based on their visible disturbance. However, one needs to have the information of how the pixel resolution corresponds to angular eye resolution. As this depends on the viewing distance and the pixel size, it is impossible to include such parameters and thus any perceptual weighting aspects in a general purpose quality loss analysis. For that purpose this document's scope can be optionally limited to filtering templates such as the Rec.709 spec as illustrated in FIG. 54. Note however that the current invention is not limited to optimizing "objective" filter specs which are independent from the human visual perception. The calculations of the quality loss optimization included within this document are there only for illustrative purposes. Similar to the above quality analysis method one can compare filter spec compliancy for any other standard, such as for standard definition signals, which are defined by the Rec.601 standard. Although a different set of specs defines the Rec.601 standard, one obtains a similar comparison for the 2 algorithms described in the above example as the Catmull-Rom spline introduces more quality loss (15.9%) compared to the Rifman cubic convolution (11.6%) when SD signals are processed, assuming a sampling frequency of 13.5 MHz is used to implement both convolution filters. The desired post filtering characteristics for the Rec.601 full SDTV video standard are illustrated in FIG. 57. If one has to choose between the two filter types in this example, one would make the same decision based on the Rec.601 and the Rec.709 filter spec compliancy analysis. However, when dealing with graphical synthetic content the above described HD and SD filter quality specs are not applicable. Many other alternatives are possible and are included within the scope of this invention, but within the scope of this document a simple filter quality analysis is proposed based on one simple condition as an example: frequencies below a quarter of the sample frequency should not be affected by the filtering operation. This single condition involves to aspects:

Frequencies below ¼*Fs should pass through unaffected (gain=1)

Frequencies above ¾*Fs should be blocked completely (gain=0)

Figure 58:
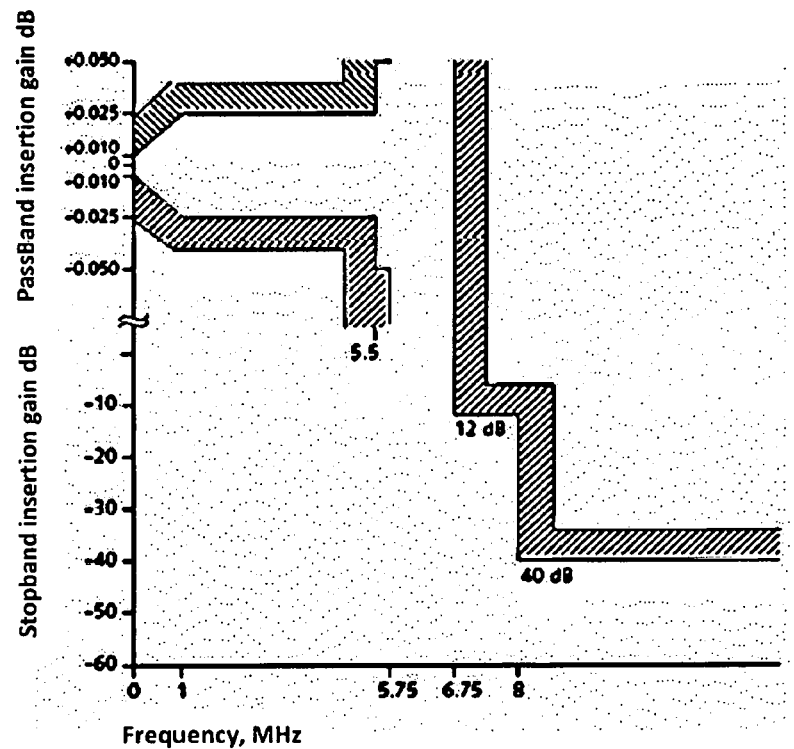

The blocking condition for frequencies above ¾*FS is necessary in order not to disturb frequencies below ¼*Fs as these frequencies are mirrored around ½*Fs. The chart in FIG. 58 visualizes such a simple but yet effective filter specification for graphical synthetic content. The filter spec indicated by the solid line is based on the simple but reasonable assumption that filtering interference artifacts are only visible when the signal frequency is low enough, in this case a quarter of the sampling frequency. Theoretically a filter could be designed which meets these filter specs while having a weird transition from pass band to stop band. However, most practical filters which meet these specs will have a somehow smooth transition when the MTF curve evolves from a pass band gain near to 1 into a stop band attenuation near to 0. The MTF chart in FIG. 58 demonstrates that the Catmull-Rom spline represented by the dotted curve introduces less quality loss (5.3%) compared to the Rifman cubic convolution (10.7%) shown as a dash-dot curve. Similar to the Rec.709 filter compliancy quality analysis, these quality loss numbers are obtained by normalizing equation 19 in order to produce a 100% quality loss for a simple attenuator. Therefore we can conclude that the Catmull-Rom spline is better suited for resizing graphical synthetic content signals with general data content than the Rifman convolution. The two opposite conclusions derived from the above two quality analysis methods demonstrate clearly that the notion of quality cannot be defined by just a single number. Note however that the current invention is not limited to a specific set of filter specs, but in contrary it can be used for any given filter specifications regardless of their origin.

In a further aspect of the invention the optimizing the quality based on filtering template specs is further demonstrated on the integrated methods described before. In accordance with aspects pf the present invention, the processing blocks may be integrated into a processor or may be provided in a unit such as a controller. The current invention includes a method to improve the quality/cost ratio which includes the following steps:

1) determine horizontal and vertical impulse responses for a chosen state-of-the-art reference by convoluting firstly chroma subsampling IR and horizontal resizing IR and secondly by convoluting de-interlacing IR and vertical resizing IR for a set of applicable input source standards and resizing factors (output resolution/input resolution ratio).

2) construct or chose a single combined filter (based on sub pixel data in horizontal dimension, motion adaptive in vertical dimension) and calculate its horizontal and vertical impulse responses for the same set of applicable input source standards and resizing factors.

3) calculate the modulation transfer functions (MTF) for both implementations 4) choose a set of quality analysis specs, such as Rec.709, Rec.601 or a (simplified) alternative such as the one described above for graphical synthetic content or any advanced perceptually weighted quality analysis method.

5) analyze the obtained combination of quality improvements and/or implementation cost savings and, if necessary, reiterate from step 2 by picking another algorithm, adjust some of the available parameters or modify (some of) the functions determining the IR.

Figure 18:
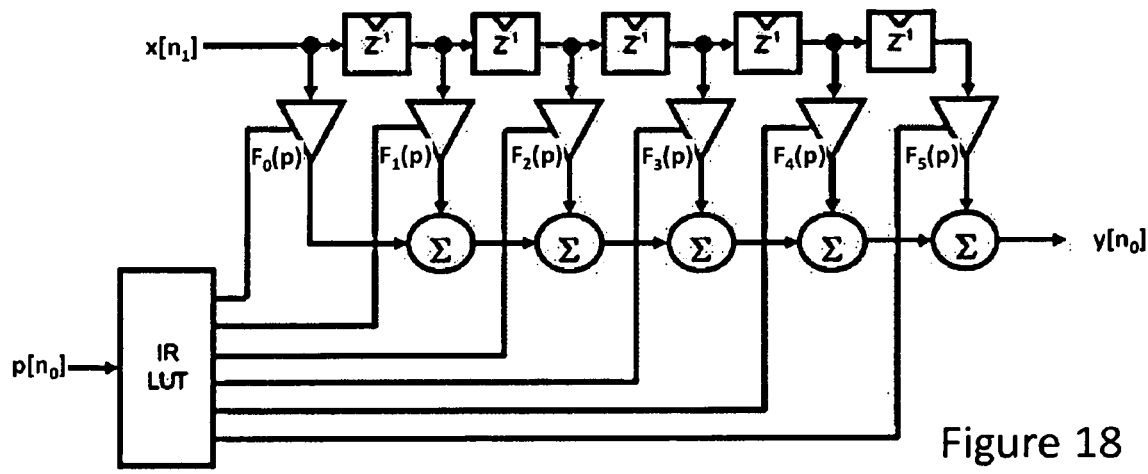
Figure 19:
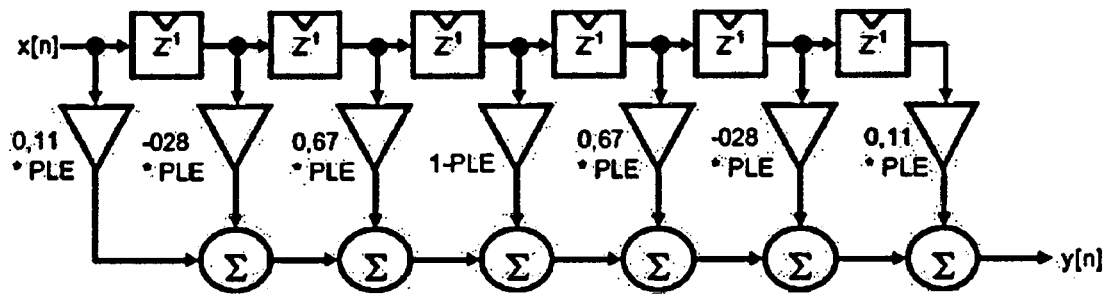
Figure 50:
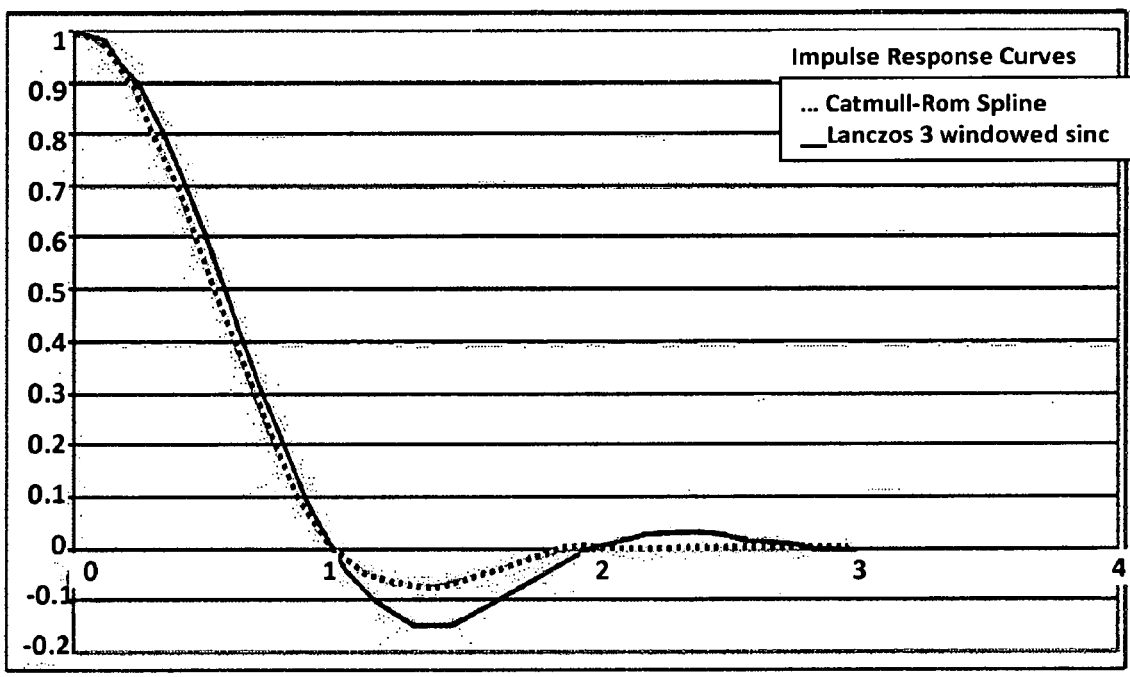
Figure 51:
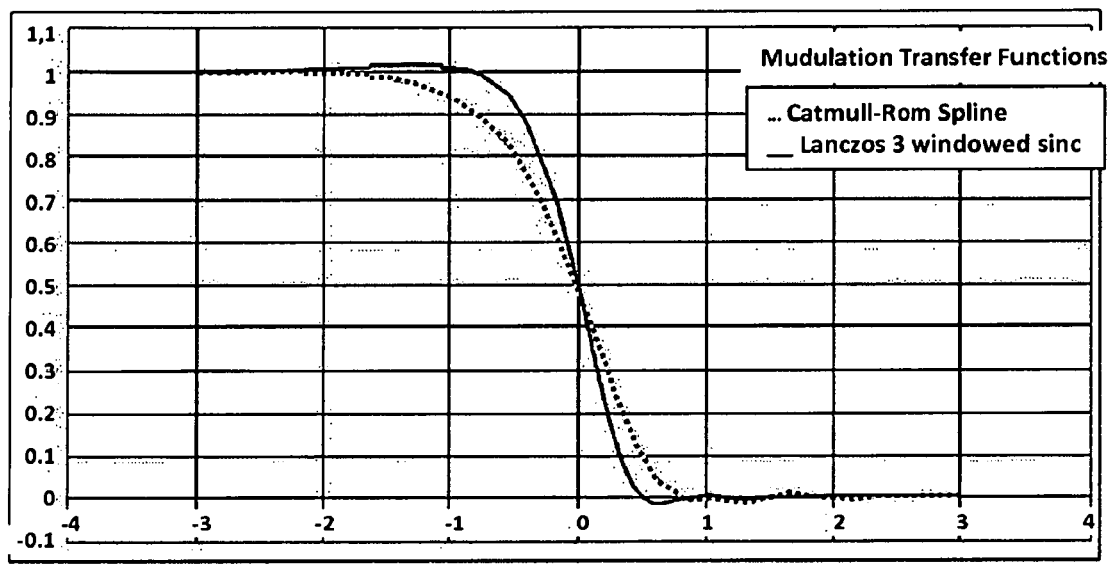
FIG. 51 Modulation Transfer Functions of Catmull-Rom spline and Lanczos3
Figure 52:
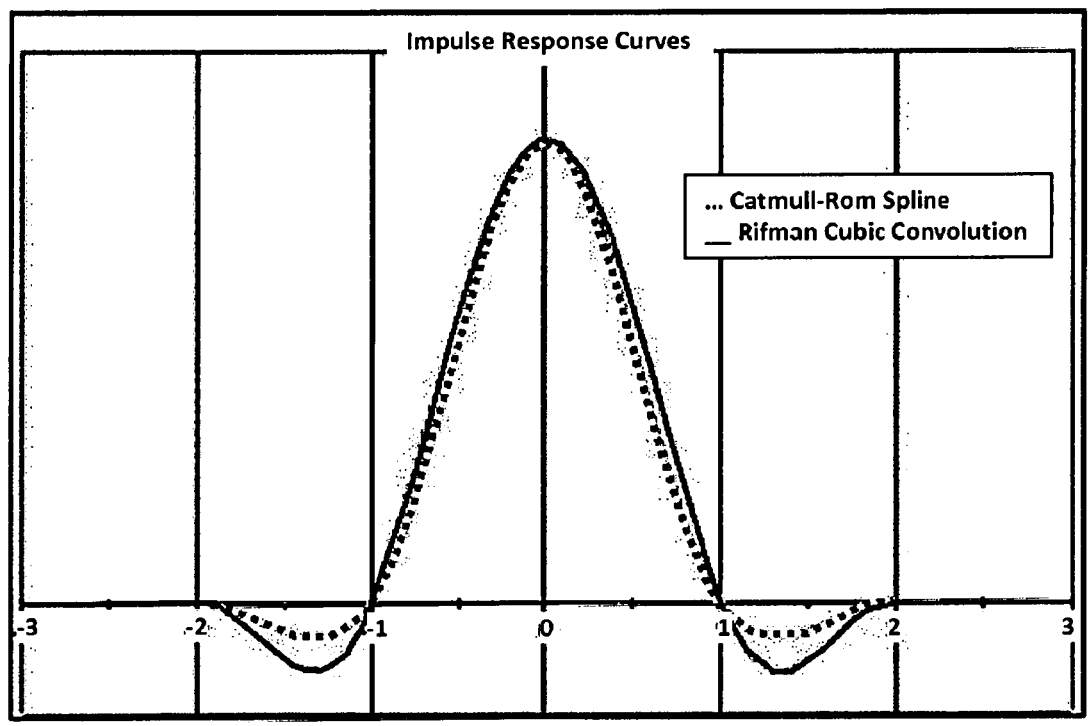
FIG. 52 Impulse response comparison of a Catmull-Rom spline and a Rifman convolution FIG. 53 Modulation transfer functions of a Catmull-Rom spline and a Rifman convolution FIG. 54 Postfiltering specs for R', G', B' and Y' signals in Rec.709 HDTV video standard FIG. 55 Rec.709 Filtering specs violated by a hypothetical filter FIG. 56 Rec.709 filter spec compliancy of Catmull-Rom spline and Rifman convolution FIG. 57 Postfiltering specs for R', G', B' and Y' signals in Rec.601 SDTV video standard FIG. 58 Example graphical synthetic content filter spec compliancy of a Catmull-Rom spline and a Rifman cubic convolution FIG. 59 Example BASIC program snippet calculating several types of cubic convolution FIG. 60 Example BASIC function to calculate sinc(x) =sin(x)/x FIG. 61 Example BASIC program snippet calculating a Lanczos3 windowed sinc IR FIG. 62 Example BASIC program snippet calculating a Hann windowed sinc IR FIG. 63 Example BASIC program snippet calculating the impulse response of a Lanczos based image processing chain of de interlacing and vertical resizing.

The 5 implementations steps mentioned above will be explained in more detail in the following sections step by step by providing some examples illustrated by easily readable BASIC programming code. These coding examples also indicate how the earlier mentioned quality numbers were calculated. First impulse response calculation examples for different filter types are given. The impulse response corresponding to a cubic convolution can be calculated as illustrated in the sample program code in FIG. 59. Lines 0 to 4 in the example program in FIG. 59 set the parameter value (a) which defines the cubic convolution filter type. Here, for simplicity reasons, only the 2 earlier discussed cubic convolution types are included: the Rifman cubic convolution (where a=−1) and the Catmull-Rom spline (where a=−0.5). Lines 5 and 14 contain the syntax to loop the positive integer position values included in the polyphase filter kernel. IR values for negative positions are obtained by a simple mirroring operation of the here obtained results, due to the IR's symmetry. In line 6 the integer position value is converted to a normalized floating point variable value (x) where the value "c_Oversampling" represents the amount of sub-pixel phases to be implemented by the filter and where the value "c_DownScale-Factor" represents the ratio between input pixel and output pixel size. The later value is required because the cubic convolution is defined as a function to reconstruct the source input signal, while the polyphase filter operates in output sample space, which means the phase signal (p, as in FIG. 18) is defined in between output samples. For example, when x=0 the current output sample's position exactly matches the source input sample position, but when x=1 the current output sample's position is displaced by the size of 1 output pixel compared to the source input sample position. Whether the displacement is to the left or to the right, or even the bottom or to the top, does not matter because of the filter's symmetry. Lines 7, 9 and 11 define the areas for the piece wise defined formula implemented in lines 8, 10 and 12. The cubic convolution formula is defined by 2 lobes which each have their own equation. Lines 8 and 10 implement a generic cubic convolution with a single parameter (a) that defines the positive lobe in line 8 and the negative "overshoot" lobe in line 10. Another set of convolution type examples is the family of windowed sinc functions. The sinc function needs to be defined first before these functions can be calculated as illustrated in FIG. 60. The sinc function code is necessary mainly to handle the exception condition when x=0. The sinc function calls used in the example programs illustrated further in this document all refer to the function implemented by the code in FIG. 60. We can distinguish between 2 categories of window types: A first category such as the further described Lanczos3 formula implements a constant IR shape (but scaled) for all resizing factors. This ensures the filtering quality remains constant for all resizing factors which could be desirable in some systems. A second category, such as the example the further described using a Hann window described in eq.20, implements a constant window shape which is fixed based on the FIR kernel size while the basis sinc frequency remains variable depending on the resizing factor. This ensures the optimal, but no longer constant, filtering quality for a given resizing algorithm for all resizing factors, which would be desirable for most systems. Independent from the above described implementation categories, the window function itself can also be categorized in two function types: A first category Such as the already mentioned Hann or Lanczos windows which define a mathematical formula which is exactly zero outside a specified window area. This is illustrated further in the document, as it is the most commonly known approach to limit the required amount of calculation. A second category where a mathematical function is constructed, such as a Gaussian, an exponential function or a product of multiple sinc functions, so that the result can be ignored and considered as zero outside a specified window area. For instance a Gaussian window can be applied for a limited kernel size because quantization of the filter coefficients will result in zeroes outside the required kernel area. The oscillations of a multi-sinc window (a product of sinc functions) will never fade out completely; however their amplitude quickly converges to zero, making a multi-sinc window suitable for implementation in a finite kernel size. The Lanczos3 filter which is has been discussed before is a special case of windowed sinc as illustrated by the program in FIG. 60. The Lanczos3 IR curve was illustrated in FIG. 50 before. The IR shape is independent of the resizing factor, apart from its scale and is also independent of the convolution filter kernel size, which means that the Lanczos3 convolution is performed based on a number of input source pixels determined by the formula itself, not by the filter kernel size. For instance, in order to enlarge an image the Lanczos3 filter requires 6 successive source columns or lines while a compression by a factor of 2 requires 12 (2 times 6) successive source columns or lines. That said, a fixed 12 tap FIR filter can be used to perform Lanczos3 based resizing in a scaling factor range from 2 times downscaling up to an infinite enlargement of the source image. See FIG. 61. Lines 0 and 8 contain the syntax to loop the positive integer position values included in the polyphase filter kernel. Here again IR values for negative positions are obtained by a simple mirroring operation of the here obtained results, due to the IR's symmetry. In line 1 the integer position value is converted to a normalized floating point variable value(x) equivalent to the normalization used in the cubic convolution example. Lines 2 and 4 define the window area. The Lanczos3 convolution formula is defined by a window which covers 3 lobes of the sinc function. Lines 3 and 5 define the window function, which is a three times slower sinc function compared to the basis sinc function. Line 7 implements the IR equation as a product of the basis sinc with the window function defined by the Lanczos3 equation. In a further implementation example a fixed Hann window function, as defined by equation 20, is used. As the window size is fixed in this example, the shape of the impulse response changes with the resizing factor.

Definition of the *Hann* window: a raised cosine which is 1 in its center, 0 at its edge     Eq. 20

$$IR(x) = \begin{cases} (\cos(x/S^*\pi)+1)/2 & \text{when } 0 <= |x| < S \\ 0 & \text{when } S <= |x| \end{cases} \quad \left(\begin{array}{l}\text{where } S \text{ is half}\\ \text{the kernel size}\end{array}\right)$$

Note that the current invention can be used with both windowed sinc approaches, either keeping the quality constant, either maximizing the quality for all resizing factors. The example program snippet in FIG. 62 demonstrates the maximum quality approach for a Hann window which is defined by the simple raised cosine function above in equation 20. Lines 0 and 5 contain the syntax to loop the positive (only due to symmetry) integer position values included in the polyphase filter kernel. In line 1 the integer position value is converted to a normalized floating point variable value (x_win), relative to the window kernel which defines the "c_Half_IR_Size value". Note that this value does not scale with the resizing factor "c_DownScaleFactor" as the window function in this approach is entirely defined by the convolution kernel size. Line 2 implements the Hann window function as described in eq.20. In line 3 the integer position value is converted to a normalized floating point variable value(x) equivalent to the normalization used in the Lanczos3 convolution example. Line 4 implements the IR equation as a product of the basis sinc with the window function defined by the Hann equation. The above BASIC code snippets all model the impulse response of a single convolution step, implemented by the Position loop, which loops the positive half of all positions inside the impulse response. In order to model 2 cascaded convolutions, such as separated de interlacing and vertical resizing, a nested loop structure is necessary. This is illustrated by the program snippet in FIG. 35 which where a Lanczos convolution is applied to perform deinterlacing and vertical resizing. Note that both convolution filters can be different, but the example code is more clarifying when both filter types are equal, at least for now. See FIG. 63. Line 0 of the code snippet in FIG. 63 evaluates the required number of deinterlacing filter taps as a function of the generic Lanczos convolution order. For instance when Lanczos3 is chosen as filter type, the required number of filter taps becomes 6. In Line 1 half the resizer's impulse response size is calculated as a function of the chosen Lanczos filter type and the required down scaling factor. Lines 3 and 7 contain the syntax to loop the filter taps of the deinterlacing convolution filter. In line 4 the integer tap index is converted to a normalized floating point variable value(x) equivalent to the normalization used in the previous resizing code examples. Line 5 implements the IR equation as a product of the basis sinc with the window function for the normalized deinterlacing tap positions as defined by the Lanczos equation. Line 6 accumulates the Sum of all deinterlacing coefficients for all taps, which was initialized at zero in line 2 before. After executing all steps in the loop, the Sum value is used to normalize the deinterlacing impulse response, which is performed in lines 8 to 10. This normalizing step guarantees that the inserted missing lines are a weighted sum of the surrounding lines for which the sum of the weights equals one. This condition ensures that source colors are not changed when the signal is constant within the area of interest or at least the filter kernel size. Lines 11 and 26 contain the syntax to loop the positive (only due to symmetry) integer position values included in the resizing polyphase filter kernel. In line 12 the integer Position index is converted to a normalized floating point variable value(x) equivalent to the normalization used in the Hann window code example. Line 13 initialized the impulse response IR for the current position. This is necessary as due to the double convolution, the impulse response is calculated in multiple portions, each corresponding to a deinterlacing filter tap (see further). Lines 14 and 21 contain the nested loop of the filter taps DI_Tap of the deinterlacing convolution filter outputs per position within the resizer impulse response. In line 15 the normalized inserted position InsertedPos is calculated as function of the deinterlacing filter tap DI_Tap. Line 16 evaluates the condition that the current impulse response value IR (Position) corresponding to a normalized position x is affected by the currently evaluated inserted line at position InsertedPos determined by the deinterlacing filter tap DI_Tap. If this is the case, the code in lines 17-19 is executed, until the end if statement in line 20. Line 17 contains the crucial step of converting the normalized position in the resizing kernel x into the normalized position relative to the position "InsertedPos" of the inserted line by the deinterlacing "xx", given the ratio of output/input pixel size determined by "c_DownScaleFactor", given the fact that after deinterlacing took place the line pace has doubled which explains the factor of 2 in the code. Line 18 implements the IR equation as the product of the basis sinc with the window function as defined by the generic Lanczos equation. In line 19 the contribution of all deinterlacing filtering taps is accumulated in the signal IR (Position) which was initialized at zero in line 13 before. Once the loop in defined in lines 14 and 21 is finished all the contributions from the reconstructed missing lines by the deinterlacing convolution filter are taken into account. The contribution from the original source line is still missing at this point as this is considered later on in line 24. Line 22 evaluates the condition that the current impulse response value IR (Position) corresponding to a normalized position x is affected by the original source line, depending on the impulse response size. If this is the case, the code in lines 23 and 24 is executed, until the end if statement in line 25. Line 23 converts the normalized position in the resizing kernel x into the normalized position relative to the position of the original source line by the deinterlacing xx, an oversampling equation similar to the syntax in line 17. Note that the code snippets in FIGS. 59 to 63 all calculate the impulse responses in floating point format, which corresponds with an infinite precision. However, some IR filter equations even don't produce normalized filter coefficients with infinite precision, causing additional required post processing of the above IR results. FIG. 64 illustrates how these FIR coefficients can be normalized when converted to a practical integer format with limited precision. Line 1 and 14 of the code snippet in FIG. 64 contain the syntax to loop half of the sub pixel phases stored as impulse response within the resizing kernel. Due to its symmetry only half of the impulse response values need to be pre calculated. The other half can be duplicated. Lines 3 and 6 contain the syntax to loop the filter taps of the resizing convolution filter. The purpose of this loop is to calculate the sum of the original floating point filter coefficients as calculated by the code snippets in FIGS. 59 to 63. This sum value Sum_fp is accumulated in line 5 by the floating point impulse response value IR_fp matching the current position half_posit corresponding to the current filter tap and the current sub pixel phase as calculated in line 4. The absolute value is evaluated in line 4, as only the positive half or the impulse response was calculated before, in order to apply the symmetry. The constant oversampling value c_Oversampling corresponds to the desired number of resolvable filter phases which matches the sub pixel positioning accuracy. Lines 8 and 13 contain the syntax to loop the filter taps of the resizing convolution filter again. The purpose of this loop is to normalize the integer filter coefficients for each sub pixel phase individually, in this example using the simplest form of error diffusion. In line 9 the absolute value of the current position half_posit corresponding to the current filter tap tap and the current sub pixel phase phase is calculated for a given oversampling value c_Oversampling. Line 10 first normalizes the originally calculated floating point value for the current position within the impulse response curve IR_fp(half_posit) by dividing it by the sum of the original coefficients Sum_fp for the current phase. This normalized value is multiplied by the integer denominator value c_coef_denominator which determines the desired precision of the eventual integer coefficients as numerator. Finally, in order to obtain the desired target value exact, the diffused error Diffused_Error (which was initialized to a value of 0.5 in line 7) is added to prepare the result for the desired truncation step in line 11, where the actual conversion to the nearest equal or lower integer value is performed by the Int function. The error introduced by the truncation step in line 11 is evaluated in line 12 and updates the diffused error value to be used by truncation process for the next filter tap. This simple implementation of an error diffusion process guarantees that the average truncation error for all filter coefficients is zero, for each filter phase. The sum of the filter coefficients equals the integer value of c_coef_denominator, which means the sum of all numerators divided by denominators remains normalized, even after converting the coefficients to integer values. Note that the current invention can be implemented using floating point number processing (eg. on a GPU) or integer number processing (eg. in a FPGA) by optionally including the step of error diffused truncation as illustrated in FIG. 64, or a similar equivalent processing step. Now that the details about a possible way to calculate the filter coefficients and thus also the impulse response have been clarified, the step of calculation the modulation transfer function can be examined as this MTF is crucial to claim a quality improvement compared to the current state of the art implementations. A simple example to calculate the MTF from the IR is illustrated in FIG. 65. With the constants specified in lines 0 to 2 the program snippet in FIG. 65 calculates the modulation transfer function for an exponentially sweeping frequency starting from 4 octaves below the desired cut off frequency (Fc) as specified by c_start_frequency_APOT (where APOT is an acronym which stands for "as power of two") until from 4 octaves above the Fc as specified by c_end_frequency_APOT for 12 frequencies per octave as specified by c_nFreq_per_Octave. These numbers were chosen because they provide a good balance between accuracy and amount of calculations. For most practical filters the region of interest within the MTF can be limited to 3 or 4 octaves below and above the target cut off frequency, which is the Nyquist frequency determined by the output sample frequency for resizing purposes. An "unweighted" exponential sweep of the frequency domain provides a more efficient representation of the filter behavior compared to a linear sweep which often requires an additional step of "weighting" the frequency domain. Here 12 frequencies per octave was chosen (and not a more obvious arbitrary number such as 10) as this small discrete number of 12 generates a set of interesting harmonic frequencies, including good approximations of the third and fifth harmonic of the cut off frequency. Although this might appear of little importance for most video footage, an accurate analysis of the third and fifth sub harmonics of the Nyquist frequency is important for synthetic graphics or data content as such imagery more often contains patterns or image details with sizes which are discrete multiples of the pixel size. Graphic drawings for instance often contain lines of 1, 2 or 3 pixels width on a background containing small checker board like patterns of 4 by 4 or 5 by 5 pixel squares. With the above described frequency sweeping method the third sub harmonic is approximated by $2^{-19/12}$ with about 0.1% tolerance while the fifth sub harmonic is approximated by $2^{-28/12}$ with less than 0.8% tolerance. The seventh sub harmonic is approximated by $2^{-34/12}$ with about 1.8% tolerance while the ninth sub harmonic is approximated by $2^{-38/12}$ with about than 0.2% tolerance. By increasing every previous frequency by a factor of $2^{1/12}$ only 12 frequencies per octave are calculated, but sampling the MTF at these frequencies captures a lot of valuable information efficiently with a limited amount of calculations. If one would like to sample the third and fifth sub harmonics with improved tolerance, the number of frequencies per octave must be increased from 12 to at least 41, and so does the corresponding computational power. Note that for the same reason this so-called chromatic scale is also used in music to distinguish the pitch between 2 successive notes by $2^{1/12}$, such as a B (si) and C (do), as this enables to produce close to perfect chords such as a major chord requiring a third and a fifth harmonic. Many other interesting properties come with this chromatic scale, many of them also beneficial for music, but a more detailed discussion about the efficiency of this MTF analysis method is outside the scope of this document. However, based on the included code snippet, one is capable to experiment with other discrete sets of numbers and thereby conclude that the above chosen values indeed make sense. In line 3 the number of octaves c_nOctaves to be calculated is derived from the earlier declared constants already discussed. This value is used in line 4 to calculate the number of frequencies to analyze c_nFreqsToAnalyze which is required by the frequency sweep loop in lines 7 and 17 based on the frequency index FreqIndex. Line 5 calculates the linear starting frequency c_start_frequency based on the chosen value for c_start_frequency_APOT and considering the fact that the Nyquist frequency is half of the output sample frequency, this power of two is divided by 2. This starting frequency is used in line 8 to calculate the cycle frequency Frequency per frequency index FreqIndex within its loop. In line 9 this cycle frequency in source pixel space is converted to the desired angular cut off frequency in output pixel space f considering the down scaling factor DownScalefactor. In case the number of output samples is higher than the number of input source samples the DownScalefactor has a value of 1. In case the number of output samples is lower than the number of input source samples the DownScalefactor has a value larger than 1, equal to the ratio of the input sample rate divided by the output sample rate. Lines 11 and 16 contain the syntax to loop all positions within the impulse response. This nested loop is required to accumulate the discrete sum for all positions as defined by the Fourier transform per frequency. This Fourier transform MTF(FreqIndex) is initialized first in line 10 for each frequency and is accumulated for each position in line 15 by the product of phase P and frequency f dependent cosine function Cos(P*f) with the impulse response value IR_Value corresponding to the current position. The phase value P used here was calculated in line 14 before based on the oversampling value c_Oversampling which defines the IR sub pixel positioning precision and the corresponding position half_position within the positive half of the impulse response. The impulse response value for the current position IR (half_position) was normalized in line 13 based on the value of IR_Surface in order to obtain IR_Value. This ensures the magnitude of the calculated MTF values is independent of the 2 parameters affecting the impulse response precision: the chosen oversampling value c_Oversampling and the integer coefficient value precision c_coef_denominator, as defined by line 6. As only the positive half of the impulse response was calculated before, the position index position must be converted to a positive value half_position considering the impulse response size IR_Size as done in line 12. In order to calculate the quality loss for a specific resizing convolution filter for a given filtering spec template the above described MTF curve needs to be compared to the filter template boundaries. As this process requires comparing MTF values with these boundaries (upper and lower attenuation limit) per frequency, it is useful to split the above described code snippet from FIG. 65 into two separate procedures:

a) a first procedure that calculates the frequency value per frequency index based on a desired sweeping method for the desired frequency range and frequency precision.

b) a second procedure which used the predefined frequencies to calculate MTF values for all target frequencies.

The result of both procedures will be used to calculate the quality loss as described further on in this document. The procedure which calculates the frequency value per frequency index is illustrated in FIG. 66. The code in FIG. 66 above needs almost no further clarification as the code snippet is a subset from FIG. 65 which was clarified earlier. The only major difference is the fact the frequency value per frequency index is pre calculated and thus stored in an array Frequency (FreqIndex). The same remark is valid for FIG. 67 which uses this pre calculated array Frequency (FreqIndex) to derive the cycle frequency used by the Fourier transform.

Now the aspect of defining an efficient filter spec based on the above discussed quality metric is disclosed. Now that a) the MTF curve has been well defined for a given discrete step frequency sweep as illustrated in FIG. 67, b) the filter spec templates have been defined (see for instance FIG. 54 for Rec.709 HD filtering specs) and c) a quality loss metric has been defined as illustrated in equation 19, it is possible to define a procedure to calculate the quality loss for a given convolution filter for a given video standard. However, this requires a variation of equation 19 to be implemented which requires some modifications to the representation. First the integral in equation 19 is replaced by a discrete sum in equation 21 below.

Initial Discrete Quality loss definition  Eq. 21

$$QLoss = \sqrt{\sum_{\omega=-\infty}^{\omega=+\infty} (H(\omega) - \text{Median}(U(\omega), H(\omega), L(\omega)))^2}$$

With $H(\omega)$ is the Modulation transfer (or MTF value) as function of the angular frequency $L(\omega)$ is the lower limit (most attenuated value) of the evaluated filtering spec $U(\omega)$ is the upper limit (highest gain value) of the evaluated filtering spec $\omega$ is some discrete representation of the angular frequency In order to obtain the same discrete frequencies defined by the frequency sweep in FIG. 66, eq. 21 can be rewritten as illustrated in eq.11.

Discrete Quality loss definition as *RMS* value of *MTF* spec tolerances  Eq. 11

$$QLoss = \sqrt{\sum_{i=-R.D}^{i=+R.D} \left(H\left(2^{\frac{i}{D}}\omega_c\right) - \text{Median}\left(U\left(2^{\frac{i}{D}}\omega_c\right), H\left(2^{\frac{i}{D}}\omega_c\right), L\left(2^{\frac{i}{D}}\omega_c\right)\right)\right)^2}$$

With $\omega_c$ is the target angular cut off frequency i is the integer frequency index R is the number of octave analyzed above and below the target filter cut off frequency D is the number of frequencies analyzed per octave or the "Density" parameter As described before, a good choice for the range parameter R in eq.11 is 3 or 4 as this frequency range should cover the entire transition from pass band to stop band for a decent filter. This implicates that when the value of R is chosen large enough (for instance 4) a larger value of R hardly affects the QLoss value. An efficient choice for the density D is 12. Note that the larger the value of D, the larger the value of QLoss becomes. This is because the band width per frequency index is not considered within the equation. Although equation 11 provides an efficient quality analysis method to compare different resizing algorithms, the absolute values provided by the formula don't provide a physical meaning. As discussed earlier in this document, such a feature requires some form of normalization within the formula. Although the best filter choice is independent from this physical interpretability provided by such normalization, it is a desirable feature to clarify the meaning of the analyzed quality metric. Therefore, although not strictly necessary, two normalization methods will be briefly clarified below and included as an extension of the formula found in equation 11. A first concern is that the result of equation 11 depends on the choice for the parameter D. Ideally the result for the quality loss should converge to a certain value when D goes to infinite value, but as D goes up, so does the number of terms which is accumulated. This can be overcome by dividing the summation by D as illustrated in equation 12.

Normalized quality loss definition as *RMS* value of *MTF* spec tolerances  Eq. 12

$$QLoss = \sqrt{\frac{\sum_{i=-R.D}^{i=+R.D} \left(H\left(2^{\frac{i}{D}}\omega_c\right) - \text{Median}\left(U\left(2^{\frac{i}{D}}\omega_c\right), H\left(2^{\frac{i}{D}}\omega_c\right), L\left(2^{\frac{i}{D}}\omega_c\right)\right)\right)^2}{D}}$$

Equation 12 provides a quality loss result independent of D for large values of D. When D is chosen, as earlier described, to be a low efficient value such as 12, the result obtained approximates the value very well when D is infinite. This is a useful normalization procedure particularly when the spec foresees a target value (T) rather than an upper and lower limit (U and L) determined by pass band and stop band ripple tolerances. In this case a variation of equation 12 can be defined as illustrated in equation 13 below.

Normalized quality loss definition as *RMS* value of *MTF* target spec  Eq. 13

$$QLoss = \sqrt{\frac{\sum_{i=-R.D}^{i=+R.D} \left(H\left(2^{\frac{i}{D}}\omega_c\right) - T\left(2^{\frac{i}{D}}\omega_c\right)\right)^2}{D}}$$

Equation 13 can be considered as an exponentially swept variation of the classic RMS error definition in which the error is considered as the difference between the actual MTF value (H) and the target MTF value (T). In case the filter spec template provides a valid range of MTF values in between the upper and lower limit, as for instance determined by tolerated ripple in the pass band filter spec for HD Rec.709 video, the equations 12 and 13 both fail to describe how critical this QLoss value is, which inevitably leads to a second concern. Assume a practical filter would introduce a pass band ripple much higher than the tolerated (for instance 0.05 dB) ripple by the filter spec. In such a case subtracting the obtained MTF value (H) from the target value (T) or the upper and lower limit values (U and L) would produce virtually identical results as H-T results in far higher values than U-L. This leads to the conclusion that the quality loss obtained by the above equations becomes virtually independent of the tolerated "area" by the filter spec. To overcome this oddity a second normalization technique is proposed which is used further in this document to indicate quality loss results based on the tolerated MTF range by a given filter spec template. This spec tolerance can be expressed as the difference between the upper and lower boundaries provided by the filter spec template (U-L) per frequency. The RMS value corresponding to the frequency range of interest can be calculated similarly to the quality loss metric as illustrated by the equation 14 below.

Normalized tolerated $RMS$ variation as defined by MTF filter spec template — Eq. 14

$$SpecTolerance = \sqrt{\frac{\sum_{i=-R.D}^{i=+R.D}\left(U\left(2^{\frac{i}{D}}\omega_c\right)-L\left(2^{\frac{i}{D}}\omega_c\right)\right)^2}{D}}$$

In case the filter spec template does not provide a tolerance value it is still possible to define a meaningful valid modulation transfer range as the upper limit (U) and lower limit (L) can be chosen based on the quantizing error as defined by the implementation. For example, when the filter coefficients are rounded to 8 bit values the signal to noise ratio is limited to 8 times about 6 dB resulting in a value of 48 dB. In this case U=+48 dB and L=−48 dB could be a good choice for the stop band to analyze quality losses on top of those introduced by the quantization process. The tolerated ripple in the pass band is given by the quantization errors around the unity gain: U=1+$\frac{1}{256}^{th}$ and L=1−$\frac{1}{256}^{th}$ yielding a tolerated ripple of about U=0.034 dB and L=−0.034 dB, which is obtained by calculating 20*Log(1+−$\frac{1}{256}^{th}$). Note that these values are in the same order of magnitude as the tolerances specified by the Rec.709 filter template, which is not such a coincidence as obviously there's a reason why 8 bit per video color component is a popular choice for many video processing applications. The result of equation 14 can be considered as an RMS value of the legal MTF area defined by the filter spec. This is illustrated by the hatched area in FIG. 68. While equation 12 provides a metric for the RMS value of the grey filled areas, equation 14 provides the same result for the hatched area. Note that compared to the original spec a small reasonable extension of the spec was necessary to define the hatched area. As the Rec.709 standard provides no upper and lower limit values for the transition band between 0.4 and 0.5 times the target cut off frequency, these values were "borrowed" from neighboring regions. The upper limit value is borrowed from the pass band while the lower limit value defined between 0.5 and 0.6 times half the new sampling frequency is duplicated. Assuming a filter spec template is defined in a way the hatched area in FIG. 68 corresponds to how critical a filter spec is in order not to introduce perceivable artifacts such as sharpness loss are aliasing, its RMS value is a good reference to interpret the RMS value obtained for the grey filled area. The ratio between both RMS values (in eq. 12 and 14) effectively provides a second, often more meaningful normalization technique for the quality loss value. This finally brings us to an even more meaningful normalized quality metric as defined by equation 15.

Normalized $RMS$ quality loss definition considering the tolerances as defined by the filter spec template — Eq. 15

$QLoss =$ $$\sqrt{\frac{\sum_{i=-R.D}^{i=+R.D}\left(H\left(2^{\frac{i}{D}}\omega_c\right)-\text{Median}\left(U\left(2^{\frac{i}{D}}\omega_c\right),H\left(2^{\frac{i}{D}}\omega_c\right),L\left(2^{\frac{i}{D}}\omega_c\right)\right)\right)^2}{\sum_{i=-R.D}^{i=+R.D}\left(U\left(2^{\frac{i}{D}}\omega_c\right)-L\left(2^{\frac{i}{D}}\omega_c\right)\right)^2}}$$

With
i is the integer summation index
R is the number of octaves above and below the target cut off frequency (set to 3 or 4)
D is the integer number of frequencies per octave (set to 12 in the code snippets)
$\omega_c$ is the target angular cut off frequency equal to half the output sample frequency
H( . . . ) is the MTF value for the current frequency
U and L represent the upper and lower limits provided by the filter spec As equation 15 effectively defines a ratio of RMS values, its result can be expressed as a percentage. For instance, a QLoss value of 15% would indicate that the RMS violation of the filter spec is 15% of the filter spec tolerance. In case the tolerated ripple specified by the filter specs in this example is halved, the obtained QLoss value increases to at least 30%, as expected by such a tighter filter spec. A QLoss value of 0% would indicate that the entire MTF curve complies with the filter spec tolerances. Note that in most cases filtering specs are defined in decibels (dB). For instance the Rec.709 HD spec specifies 0.05 dB of tolerated ripple in the pass band. In order to use these specified values directly in a code snippet to calculate the quality loss, the values expressed in dB must be converted to linear gain values as illustrated in FIG. 69. The function in FIG. 69 simply implements the mathematical definition of the decibel representation. The function is used by the code snippet in FIG. 70, which shows a straight forward code implementation and calculation of the quality loss as was illustrated in FIG. 68, based on a pre-calculated exponential frequency as described earlier in FIG. 66 for limited number of discrete frequencies. Line 0 initializes the non-normalized QualityLoss value at 0 which represents the numerator in equation 15, while line 1 initializes the non-normalized SpecTolerance_Rec709 value at 0 which represent the denominator in equation 15. Lines 2 and 22 contain a loop to step through all FreqIndex values which represent the index (i) in equation 15. Lines 3, 6, 9, 12 and 15 evaluate the pre calculated frequency value as function of the frequency index Frequency (FreqIndex) (as was illustrated in FIG. 66) to determine the frequency band specified by the Rec.709 filtering template. Once the band is determined the value UpperValueLimit is defined in lines 4, 7, 101 13 or 16, while the value LowerValueLimit is defined in lines 5, 8, 11, 14 or 17. Line 19 calculates the median value ValueLimit as found in equation 15 based on the previously calculated upper and lower spec boundaries and the earlier calculated MTF value (as illustrated in FIG. 67). This result is used in line 20 to accumulate the sum of squared values as a deviation of the current (MTF (FreqIndex) value from the closest valid value within spec tolerance ValueLimit. The calculated value QualityLoss represents the numerator in equation 15. The denominator in that equation SpecTolerance_Rec709 is calculated in line 21 based on the accumulated squared values of valid Rec.709 spec MTF intervals. Eventually line 23 calculates the RMS value of the ratio between the above defined values, as specified by equation 15.

The invention claimed is:

1. A method of video processing comprising:
receiving an input image including pixels and three color components; and
generating an output image by performing processing on the pixels of the input image, the processing on the pixels of the input image comprising:
for each of the pixels of the input image:
a first color component is received and written into a filter kernel buffer; and
a second color component and a third color component are alternatively received and written into the filter kernel buffer, such that either the second color component or the third color component are received and written into the filter kernel buffer;
performing a single combined filter operation for sequential execution of one or a plurality of image processing steps on the pixels of said input image to generate said output image;
wherein the filter kernel buffer is a pixel buffer having a fixed location per pixel and the second color component or the third color component missing for each of the pixels is identified as corrupt content in the filter kernel buffer;
wherein a particular image processing step of said one or a plurality of image processing steps simultaneously achieves the combined effect for a combination selected from:
vertical chroma up-sampling, de-interlacing, and vertical resizing;
de-interlacing and vertical scaling;
horizontal chroma-upsampling and horizontal scaling; or
vertical chroma-upsampling and vertical scaling;
wherein the particular image processing step is performed using one poly phase filter path per dimension, each polyphase filter path comprising:
a number of parallel convolution filters, one per color component; or
a single poly phase filter, one per color component.

2. The method of claim 1, wherein: a second particular image processing step includes filtering that improves any one of output image quality, latency, execution cost of the method and/or the performance of the method, and
the particular image processing step achieves the combined effect of vertical chroma up-sampling, vertical resizing and de-interlacing, and
a third image processing step achieves the combined effect of chroma up-sampling, resizing, de-interlacing and packet loss reconstruction.

3. The method of claim 1, wherein the particular image processing step achieves the combined effect for the combination of de-interlacing and vertical resizing by using an adaptive diagonal filtering method and/or based on methods only using linear operators.

4. The method of claim 1, wherein the particular image processing step is performed using one poly phase filter path per dimension, each polyphase filter path comprising a number of parallel convolution filters, one per color component.

5. A video processor configured to generate an output image by performing processing on pixels of an input image having three color components, the processing on the pixels of the input image comprising:
performing a single combined filter operation for sequential execution of one or a plurality of image processing steps on the pixels of said input image to generate said output image;
wherein for each of the pixels of the input image:
a first color component is received and written into a filter kernel buffer; and
a second color component and a third color component are alternatively received and written into the filter kernel buffer, such that either the second color component or the third color component are received and written into the filter kernel buffer;
wherein the filter kernel buffer is a pixel buffer having a fixed location per pixel and the second color component or the third color component missing for each of the pixels is identified as corrupt content in the filter kernel buffer;
wherein a particular image processing step of said one or a plurality of image processing steps simultaneously achieves the combined effect for a combination selected from:
vertical chroma up-sampling, de-interlacing, and a vertical resizing;
de-interlacing and vertical scaling;
horizontal chroma-upsampling and horizontal scaling; or
vertical chroma-upsampling and vertical scaling;
wherein the particular image processing step is performed using one poly phase filter path per dimension, each polyphase filter path comprising:
a number of parallel convolution filters, one per color component; or
a single poly phase filter, one per color component.

6. The video processor of claim 5, adapted so that said particular image processing step achieve the combined effect of vertical chroma upsampling, vertical resizing and de-interlacing and is implemented as two poly phase filter paths, each comprising a number of parallel convolution filters, one per color component or alternatively with a single poly phase filter, one per color component.

7. The video processor of claim 5, adapted so that one of said image processing steps achieves the combined effect of chroma upsampling, resizing, de-interlacing and packet loss reconstruction, wherein equal kernel sizes are used for two or more or all of the underlying image processing steps.

8. The video processor of claim 5, adapted so that one or more of said image processing steps is implemented as a filter, wherein at least part of the filter coefficients are stored in a Look Up Table.

9. The video processor of claim 5, adapted so that:
one of said image process steps achieves the combined effect of chroma up-sampling and horizontal resizing; and/or
another of said image process steps achieves the combined effect of de-interlacing and vertical resizing.

10. The video processor of claim 9, adapted so that the one of said image processing steps achieves the combined effect of chroma up-sampling and horizontal resizing and so that the one of said image processing steps is implemented as a number of parallel convolution filters, one per color component.

11. The video processor of claim 9, adapted so that the another of said image processing steps achieves the combined effect of de-interlacing and vertical resizing and so that the another of said image processing steps is implemented with two parallel resizing filters or alternatively with a single motion detector modulated resizing filter.

12. The video processor of claim 5, adapted so that one or more of said image process steps is selected as a convolution based filtering.

13. The video processor of claim 5, adapted so that the particular image processing step achieves the combined effect for the combination of de-interlacing and vertical resizing by using an adaptive diagonal filtering method and/or based on methods only using linear operators.

14. The video processor of claim 5, adapted so that one of the image processing steps includes achieving the effect of packet loss reconstruction using a packet reconstruction (filtering) method.

15. The video processor of claim 5, wherein the processor comprises a processing engine and said one or more of said image process steps is adapted for execution on a processing engine.

16. The video processor of claim 5, wherein the particular image processing step is performed using one poly phase filter path per dimension, each polyphase filter path comprising a number of parallel convolution filters, one per color component.

17. A controller for a video processor configured to generate an output image by performing processing on pixels of an input image having three color components, the processing on the pixels of the input image comprising:
  performing a single combined filter operation for sequential execution of one or a plurality of image processing steps on the pixels of said input image to generate said output image;
  wherein for each of the pixels of the input image:
    a first color component is received and written into a filter kernel buffer; and
    a second color component and a third color component are alternatively received and written into the filter kernel buffer, such that either the second color component or the third color component are received and written into the filter kernel buffer:
  wherein the filter kernel buffer is a pixel buffer having a fixed location per pixel and the second color component or the third color component missing for each of the pixels is identified as corrupt content in the filter kernel buffer;
  wherein a particular image processing step of said one or a plurality of image processing steps simultaneously achieves the combined effect for a combination selected from:
    vertical chroma up-sampling, deinterlacing, and a vertical resizing;
    de-interlacing and vertical scaling;
    horizontal chroma-upsampling and horizontal scaling; or
    vertical chroma-upsampling and vertical scaling;
  wherein the particular image processing step is performed using one poly phase filter path per dimension, each polyphase filter path comprising:
    a number of parallel convolution filters, one per color component; or
    a single poly phase filter, one per color component.

18. The controller of claim 17, wherein the particular image processing step is performed using one poly phase filter path per dimension, each polyphase filter path comprising a number of parallel convolution filters, one per color component.

* * * * *